(12) United States Patent
Sakoh et al.

(10) Patent No.: US 8,079,029 B2
(45) Date of Patent: Dec. 13, 2011

(54) CONTENT ACQUISITION METHOD, CONTENT ACQUISITION DEVICE, AND CONTENT ACQUISITION PROGRAM

(75) Inventors: Noriyuki Sakoh, Kanagawa (JP); Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1428 days.

(21) Appl. No.: 11/596,588

(22) PCT Filed: May 19, 2005

(86) PCT No.: PCT/JP2005/009599
§ 371 (c)(1),
(2), (4) Date: Nov. 15, 2006

(87) PCT Pub. No.: WO2005/011827
PCT Pub. Date: Nov. 24, 2005

(65) Prior Publication Data
US 2008/0046544 A1  Feb. 21, 2008

(30) Foreign Application Priority Data
May 19, 2004  (JP) ................................. 2004-149503

(51) Int. Cl.
*G06F 9/445* (2006.01)
*G06F 20/11* (2006.01)

(52) U.S. Cl. ........................................ 717/178; 705/51

(58) Field of Classification Search .......... 717/168–178; 713/193, 155; 380/233; 705/51, 52; 707/999.009; 709/217, 240
See application file for complete search history.

(56) References Cited

U.S. PATENT DOCUMENTS

| 5,910,987 | A  | * | 6/1999 | Ginter et al. .................... 705/52 |
| 6,226,618 | B1 | * | 5/2001 | Downs et al. .................. 705/51 |
| 7,433,930 | B2 | * | 10/2008 | Fenizia et al. ................. 709/217 |

FOREIGN PATENT DOCUMENTS

| JP | 11 85637 | 3/1999 |
| JP | 2000 207219 | 7/2000 |
| JP | 2002 135350 | 5/2002 |

* cited by examiner

*Primary Examiner* — Tuan Anh Vu
(74) *Attorney, Agent, or Firm* — Oblon, Spivak, McClelland, Maier & Neustadt, L.L.P.

(57) ABSTRACT

The present invention allows for the acquisition of content data. The present invention temporarily stores the first and second process progress information in the storage medium, and, when the requested content data and license data 301 are registered in the database after being downloaded and temporarily stored in the storage medium, removes the first and second process progress information, and, if there are the first and/or second process progress information are left when the stopped content acquisition process restarts, retries to acquire data after removing the content data and license data 301 corresponding to the second process progress information. This prevents, when the data acquisition is retried, the same content data and license data from being stored in the storage medium again. This allows efficient use of the storage space, and therefore the content data is acquired without fail.

6 Claims, 28 Drawing Sheets

| | ACQUISITION PROCESS TYPE INFORMATION | |
|---|---|---|
| FIRST LOG | FEE-CHARGING STATUS NOTIFICATION REQUEST INFORMATION | PURCHASE IDENTIFICATION INFORMATION<br>RETRY URL INFORMATION<br>POST DATA<br>REQUEST CODE |
| SECOND LOG | TRACK FILE NAME<br>LICENSE FILE NAME | |
| THIRD LOG | ALBUM IDENTIFICATION INFORMATION | |

FIG. 24

CONTENT ACQUISITION METHOD, CONTENT ACQUISITION DEVICE, AND CONTENT ACQUISITION PROGRAM

TECHNICAL FIELD

The present invention relates to a content acquisition method, content acquisition apparatus and content acquisition program, and is preferably applied to a case in which a client terminal acquires music data, as content data, from servers on a network, for example.

BACKGROUND ART

In a conventional data delivery system, a delivery device divides content data to be delivered into blocks each of which is a predetermined size. The delivery device sequentially transfers each unit data of one block of the content data to a communication terminal. The communication terminal sequentially receives the unit data, which is one block, from the delivery device. The communication terminal then memorizes a block ID which has been associated with the received unit data.

By the way, in a case in which the communication between the communication terminal and the delivery device is broken before the whole content data is delivered and the delivery was stopped, the communication terminal notifies, after the communication is recovered, the delivery device of the block IDs of the unit data that the communication terminal has already received.

And then, the delivery device recognizes, based on the block IDs, the already-delivered blocks and still-not-delivered blocks of the content data, and then transmits the unit data including the still-not-delivered blocks to the communication terminal. This prevents the delivery device from transmitting the same blocks to the communication terminal. And that allows the delivery device to transmit the still-not-delivered part of the content data to the communication terminal (see Patent Document 1, for example).

Patent Document 1: Japanese Patent Publication No. 2002-135350 (Pages 1, 6, and 11, and FIGS. 1 and 17)

DISCLOSURE OF THE INVENTION

However, in the data delivery system with the above configuration, in a case in which the communication is broken at the time when the communication terminal has just stored part of one unit data in a storage medium while receiving the unit data from the delivery device, the communication terminal does not memorize the block ID of the unit data because this unit data has not been received completely.

Accordingly, the delivery device determines that, when the communication between the delivery device and the communication terminal is recovered, the unit data, a part of which has been already stored in the communication terminal, is the still-not-delivered block. The delivery device therefore restarts delivering the content data from the unit data determined as the still-not-delivered block.

However, if the delivery device restarts delivering the content data from the unit data determined as the still-not-delivered block, the communication terminal, which has already stored the part of the unit data in the storage medium, stores the same data. That wastes the storage space of the storage medium.

Accordingly, the communication terminal may run out of the storage space of the storage medium while sequentially receiving the unit data of the content data delivered again and storing them in the storage medium.

Accordingly, when the delivery of content data is started again, there is possibility that the communication terminal may fail to receive the content data.

The present invention has been made in view of the above points and is intended to provide a content acquisition method, content acquisition apparatus and content acquisition program capable of acquiring content data without fail.

To solve the above problem, a content acquisition method according to the present invention includes: an operation page information reception step of receiving operation page information from external apparatus, the operation page information being operated to request acquisition of the content data; a first process progress information temporal storage step of detecting operation of the operation page information received by the operation page information reception step for requesting the acquisition, and, in response to the detection of the operation for requesting the acquisition, temporarily storing, in a storage medium, address information on a network that is to be accessed when data acquisition is retried during a content acquisition process, as first process progress information indicating progress of the content acquisition process; a file acquisition step of acquiring, from the external apparatus, an acquisition usage file to be used to acquire the content data that is requested by the operation of the operation page information and usage allowance data that makes the content data available; a second process progress information temporal storage step of temporarily storing, in the storage medium, content identification information that corresponds to the requested content data and usage allowance data identification information that corresponds to the usage allowance data that makes the content data available, as second process progress information indicating progress of the content acquisition process; a data download step of downloading, in accordance with contents of the acquisition usage file acquired by the file acquisition step, the requested content data from the external apparatus and temporarily storing the content data in the storage medium, and also downloading the usage allowance data that makes the content data available and temporarily storing the usage allowance data in the storage medium; a content data status change step of registering the downloaded content data and the usage allowance data that makes the content data available in a database in the storage medium to make the content data available based on the usage allowance data; a process progress information removal step of removing, after all the requested content data and the corresponding usage allowance data that make the content data available have been registered in the database, the first and second process progress information from the storage medium; and a data acquisition retry step of removing, if it is detected that the first and/or second process progress information are left on the storage medium when the stopped content acquisition process restarts, the content identification information that is equivalent to the second process progress information, the content data corresponding to the usage allowance data identification information and the usage allowance data from the storage medium, and then retrying to acquire data by accessing the address information.

In this manner, the content acquisition method according to the present invention removes, when the stopped content acquisition process restarts, all the content data and usage allowance data that had been already stored in the storage medium by the stopped content acquisition process. This prevents, when the data acquisition is retried, the same content data and license data from being stored in the storage medium again. This allows efficient use of the storage space.

In addition, a content acquisition apparatus according to the present invention includes: operation page information reception means for receiving operation page information from external apparatus, the operation page information being operated to request acquisition of the content data; first process progress information temporal storage means for detecting operation of the operation page information received by the operation page information reception means for requesting the acquisition, and, in response to the detection of the operation for requesting the acquisition, temporarily storing, in a storage medium, address information on a network that is to be accessed when data acquisition is retried during a content acquisition process, as first process progress information indicating progress of the content acquisition process; file acquisition means for acquiring, from the external apparatus, an acquisition usage file to be used to acquire the content data that is requested by the operation of the operation page information and usage allowance data that makes the content data available; second process progress information temporal storage means for temporarily storing, in the storage medium, content identification information that corresponds to the requested content data and usage allowance data identification information that corresponds to the usage allowance data that makes the content data available, as second process progress information indicating progress of the content acquisition process; data download means for downloading, in accordance with contents of the acquisition usage file acquired by the file acquisition means, the requested content data from the external apparatus and temporarily storing the content data in the storage medium, and also downloading the usage allowance data that makes the content data available and temporarily storing the usage allowance data in the storage medium; content data status change means for registering the downloaded content data and the usage allowance data that makes the content data available in a database in the storage medium to make the content data available based on the usage allowance data; process progress information removal means for removing, after all the requested content data and the corresponding usage allowance data that make the content data available have been registered in the database, the first and second process progress information from the storage medium; and data acquisition retry means for removing, if it is detected that the first and/or second process progress information are left on the storage medium when the stopped content acquisition process restarts, the content identification information that is equivalent to the second process progress information, the content data corresponding to the usage allowance data identification information and the usage allowance data from the storage medium, and then retrying to acquire data by accessing the address information.

In this manner, the content acquisition apparatus according to the present invention removes, when the stopped content acquisition process restarts, all the content data and usage allowance data that had been already stored in the storage medium by the stopped content acquisition process. This prevents, when the data acquisition is retried, the same content data and license data from being stored in the storage medium again. This allows efficient use of the storage space.

Furthermore, a content acquisition program according to the present invention causes an information processing apparatus to execute: an operation page information reception step of receiving operation page information from external apparatus, the operation page information being operated to request acquisition of the content data; a first process progress information temporal storage step of detecting operation of the operation page information received by the operation page information reception step for requesting the acquisition, and, in response to the detection of the operation for requesting the acquisition, temporarily storing, in a storage medium, address information on a network that is to be accessed when data acquisition is retried during a content acquisition process, as first process progress information indicating progress of the content acquisition process; a file acquisition step of acquiring, from the external apparatus, an acquisition usage file to be used to acquire the content data that is requested by the operation of the operation page information and usage allowance data that makes the content data available; a second process progress information temporal storage step of temporarily storing, in the storage medium, content identification information that corresponds to the requested content data and usage allowance data identification information that corresponds to the usage allowance data that makes the content data available, as second process progress information indicating progress of the content acquisition process; a data download step of downloading, in accordance with contents of the acquisition usage file acquired by the file acquisition step, the requested content data from the external apparatus and temporarily storing the content data in the storage medium, and also downloading the usage allowance data that makes the content data available and temporarily storing the usage allowance data in the storage medium; a content data status change step of registering the downloaded content data and the usage allowance data that makes the content data available in a database in the storage medium to make the content data available based on the usage allowance data; a process progress information removal step of removing, after all the requested content data and the corresponding usage allowance data that make the content data available have been registered in the database, the first and second process progress information from the storage medium; and a data acquisition retry step of removing, if it is detected that the first and/or second process progress information are left on the storage medium when the stopped content acquisition process restarts, the content identification information that is equivalent to the second process progress information, the content data corresponding to the usage allowance data identification information and the usage allowance data from the storage medium, and then retrying to acquire data by accessing the address information.

In this manner, the content acquisition program according to the present invention removes, when the stopped content acquisition process restarts, all the content data and usage allowance data that had been already stored in the storage medium by the stopped content acquisition process. This prevents, when the data acquisition is retried, the same content data and license data from being stored in the storage medium again. This allows efficient use of the storage space.

The present invention makes this possible: this temporarily stores, in response to the detection of the operation of the operation page information received from the external apparatus for requesting the acquisition, the address information on a network that is to be accessed when data acquisition is retried during the content acquisition process in the storage medium as first process progress information indicating progress of the content acquisition process; this subsequently acquires, from the external apparatus, the acquisition usage file to be used to acquire the requested content data and the usage allowance data that makes the content data available; this subsequently temporarily stores, in the storage medium, the content identification information that corresponds to the requested content data and the usage allowance data identification information that corresponds to the usage allowance data that makes the content data available as second process progress information indicating progress of the content acquisition process; this then downloads, in accordance with contents of the acquisition usage file, the requested content data from the external apparatus and temporarily stores the content data in the storage medium, and also downloads the usage allowance data that makes the content data available and temporarily stores the usage allowance data in the storage medium; this subsequently registers the downloaded content data and the usage allowance data in the database in the storage medium to make the content data available based on the usage allowance data; this subsequently removes, after all the requested content data and usage allowance data have been registered, the first and second process progress information from the storage medium; and then this removes, if it is detected that the first and/or second process progress information are left on the storage medium when the stopped content acquisition process restarts, the content identification information that is equivalent to the second process progress information, the content data corresponding to the usage allowance data identification information and the usage allowance data from the storage medium, and then retrying to acquire data by accessing the address information. In this manner, this removes, when the stopped content acquisition process restarts, all the content data and usage allowance data that had been already stored in the storage medium by the stopped content acquisition process. This prevents, when the data acquisition is retried, the same content data and license data from being stored in the storage medium again. This allows efficient use of the storage space. Thus, the content acquisition method, the content acquisition apparatus and the content acquisition program can acquire content data without fail.

BRIEF DESCRIPTION OF THE DRAWINGS

FIG. 24 is a schematic diagram illustrating a log showing the progress of a music data acquisition process.

BEST MODE FOR CARRYING OUT THE INVENTION

An embodiment of the present invention will be described in detail with reference to the accompanying drawings.

Figure 1:
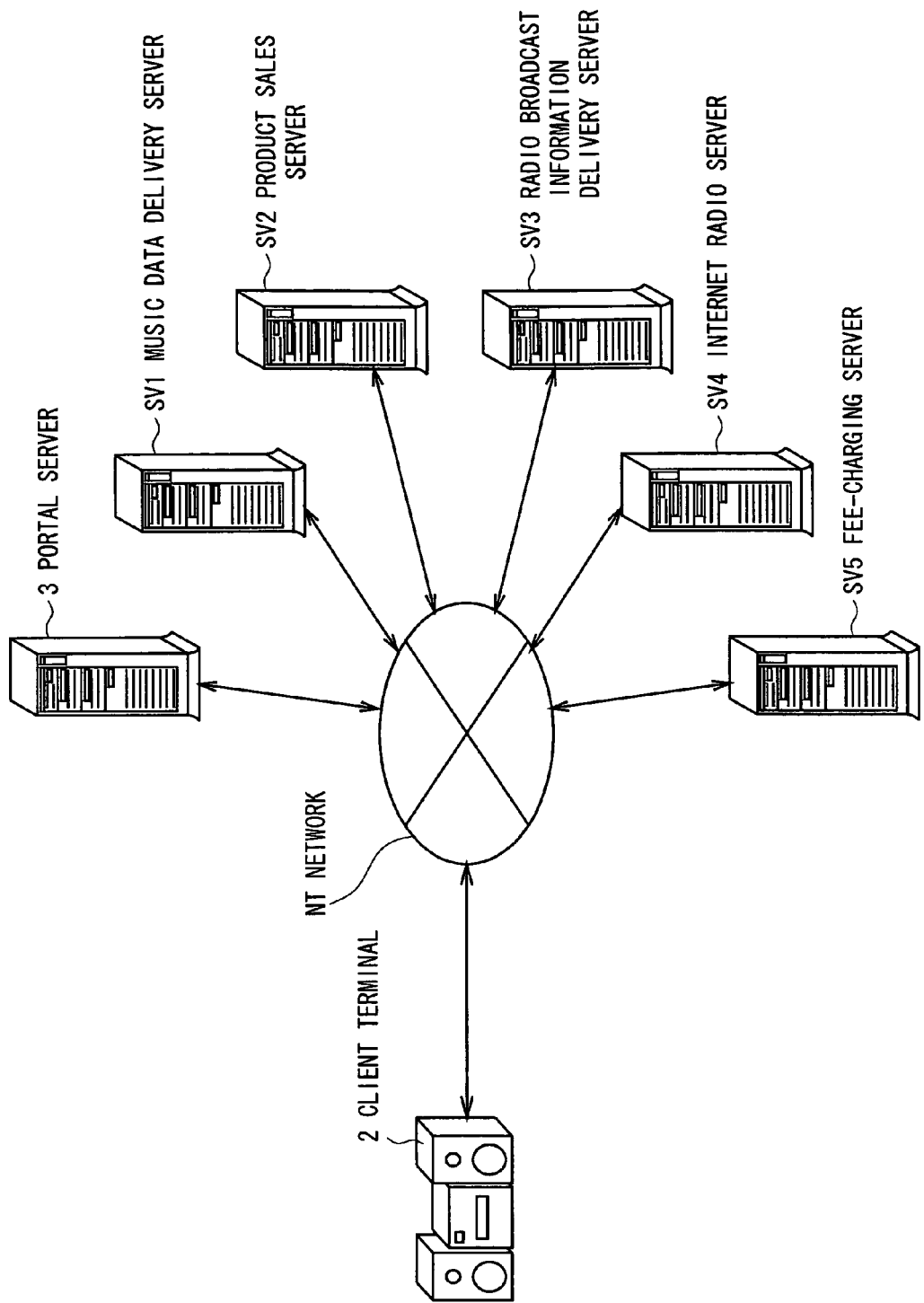
FIG. 1 is a schematic diagram showing the overall configuration of a music related service provision system in accordance with a first embodiment of the present invention.

[1] First Embodiment (1) Music Related Service Provision System
(1-1) Configuration of the System Referring to FIG. 1, the reference numeral 1 represents a music related service provision system as a whole. The music related service provision system 1 includes a client terminal 2 whose user has contracted with a company operating the music related service provision system 1; a portal server 3, which controls the client terminal 2; and a plurality of servers SV1 through SV5, which provides the client terminal 2 with various services related to music.

In this embodiment, the music data delivery server SV1 provides a music data distribution service of distributing music data to the client terminal 2. The music data has been converted into a format such as ATRAC3 (Adaptive Transform Acoustic Coding 3), AAC (Advanced Audio Coding), WMA (Windows (Registered Trademark) Media Audio), Real-AUDIO G2 Music Codec, MP3 (MPEG Audio Layer-3), and the like.

A product sales server SV2 provides a sales service of selling CDs (Compact Discs), DVDs (Digital Versatile Discs), and the like to users through the client terminal 2.

A radio broadcast information delivery server SV3 provides a radio broadcast information distribution service of distributing to the client terminal 2 radio broadcast information related to music and radio programs broadcast by radio stations.

An Internet radio server SV4 provides an Internet radio broadcast service. In the Internet radio broadcast services, the Internet radio server SV4 supplies radio broadcast data in streaming format to the client terminal 2 via a network NT. In this case, the network NT is equivalent to the Internet.

A fee-charging server SV5 performs a fee-charging process to charge users various fees in response to requests from the portal server 3 and the like.

(1-2) Configuration of Client Terminal 2

(1-2-1) Functional Circuit Block Configuration of Client Terminal 2

Figure 2:
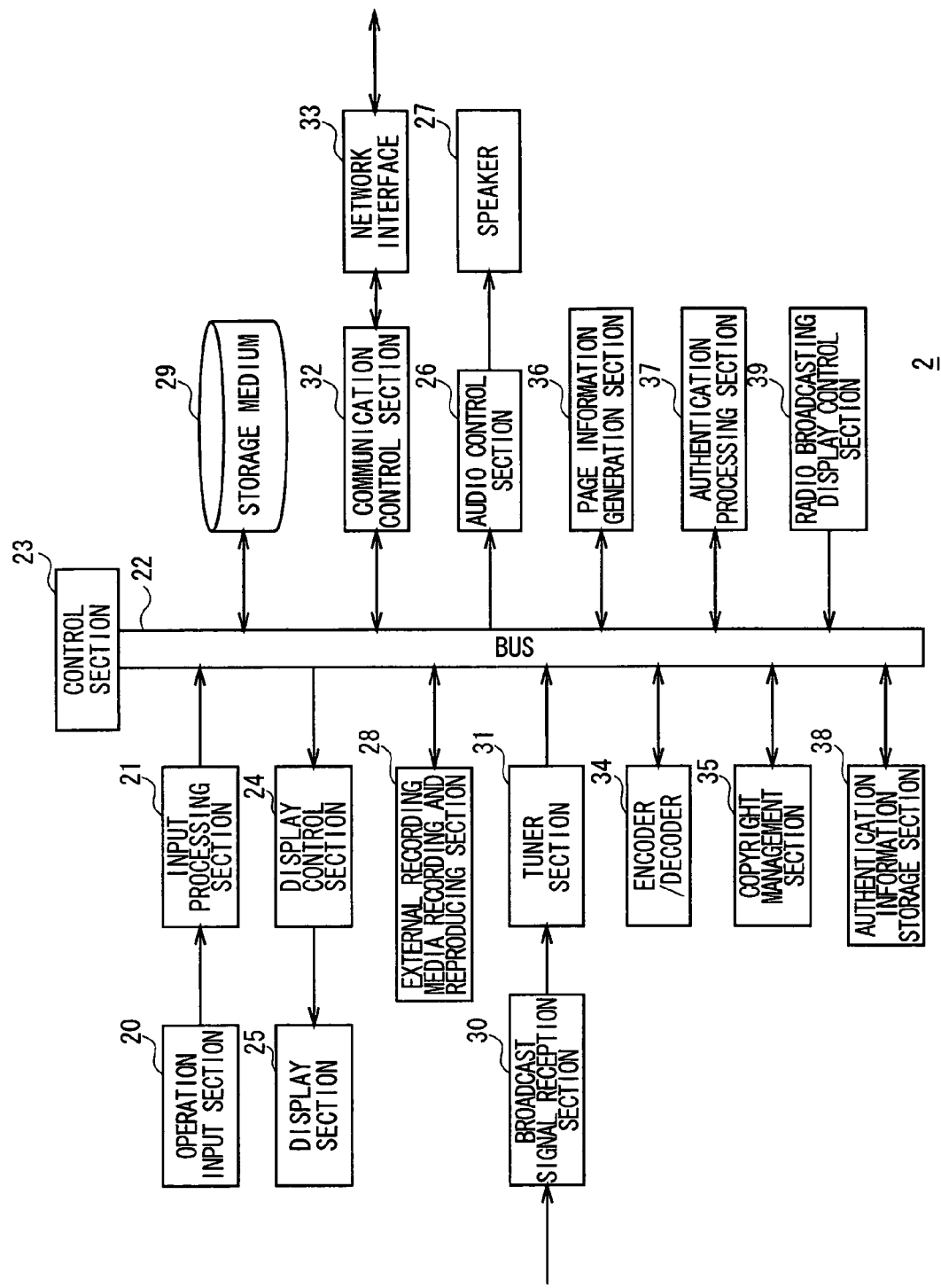
FIG. 2 is a block diagram showing the hardware configuration of a client terminal using functional circuit blocks.

The following describes the hardware configuration of the client terminal 2 using functional circuit blocks. As shown in FIG. 2, the client terminal 2 has an operation input section 20 including various kinds of buttons. The operation input section 20 is disposed on a housing of the client terminal 2 or remote control (not shown). If a user operates the operation input section 20, the operation input section 20 detects the operation, and then supplies an operation input signal corresponding to the operation to an input processing section 21.

The input processing section 21 transforms the operation input signal from the operation input section 20 into a specific operation command, and then transmits the operation command to a control section 23 through a bus 22.

The control section 23 has been connected to each circuit via the bus 22. The control section 23 controls operation of each circuit based on the operation command and a control signal supplied from the circuits.

A display control section 24 receives video data through the bus 22, and then performs digital-to-analog conversion to the video data to generate an analog video signal. The display control section 24 subsequently supplies the analog video signal to a display section 25.

The display section 25, which is for example a display device such as a liquid crystal display, may be disposed on the housing directly or externally.

The display section 25 receives the analog video signal from the display control section 24, and then displays an image based on the analog video signal. The analog video signal includes a result of processing by the control section 23 or various video data.

An audio control section 26 receives audio data via the bus 22, and then performs digital-to-analog conversion to the audio data to generate an analog audio signal. The audio control section 26 then transmits the analog audio signal to a speaker 27 which then outputs audio based on the analog audio signal supplied from the audio control section 26.

External storage media such as CDs and "MEMORY STICK (Registered Trademark of Sony Corporation)" for example store content data. The "MEMORY STICK (Registered Trademark of Sony Corporation)" includes a flash memory covered with an exterior case. An external recording media recording and reproducing section 28 reads content data from external storage media, and then plays back them. Alternatively, the external recording media recording and reproducing section 28 records content data, which is to be recorded, on external storage media.

When the external recording media recording and reproducing section 28 acquires content data such as video data from an external storage medium, the external recording media recording and reproducing section 28 then transmits the video data to the display control section 24 through the bus 22.

The display control section 24 transforms the video data, which are read out from the external storage medium as content data by the external recording media recording and reproducing section 28, into an analog video signal, and then transmits the analog video signal to the display section 25.

When the external recording media recording and reproducing section 28 acquires content data such as audio data from an external storage medium, the external recording media recording and reproducing section 28 then transmits the audio data to the audio control section 26 via the bus 22.

The audio control section 26 transforms the audio data, which are read from the external storage medium as content data by the external recording media recording and reproducing section 28, into an analog audio signal, and then transmits the analog audio signal to the speaker 27.

The control section 23 supplies the content data read from external storage media by the external recording media recording and reproducing section 28 through the bus 22 to a storage medium 29 in the client terminal 2 to store the content data in the storage medium 29 (storing content data in the storage medium 29 as described above is referred to as ripping).

When the control section 23 acquires content data such as video data from the storage medium 29, the control section 23 then supplies the video data to the display control section 24 through the bus 22. The video data are for example equivalent to image data.

When the control section 23 acquires content data such as audio data from the storage medium 29, the control section 23 then supplies the audio data to the audio control section 26 via the bus 22.

The control section 23 also reads music data from the storage medium 29, and then supplies the music data to the external recording media recording and reproducing section 28 to records the music data on the external storage media.

A broadcast signal reception section 30 receives radio waves from each broadcast station, and then transmits the radio waves to a tuner section 31.

In a case in which a user operates the operation input section 20 to specify a certain radio station, the tuner section 31 under the control of the control section 23 extracts a radio broadcast signal of frequency corresponding to the station specified from the radio waves received by the broadcast signal reception section 30. The tuner section 31 then performs a prescribed reception process to generate audio data, and then supplies the audio data to the audio control section 26 via the bus 22.

The audio control section 26 receives the audio data from the tuner section 31, and then transforms the audio data into an analog audio signal. The audio control section 26 subsequently transmits the analog audio signal to the speaker 27 which then outputs audio of a radio program broadcast from a radio station. Thus, a user can listen to audio of a radio program.

The control section 23 supplies the audio data from the tuner section 31 to the storage medium 29 which then stores the audio data. In this manner, the control section 23 can record audio of a radio program.

The control section 23 also connects to the network NT through a communication control section 32 and a network interface 33. The control section 23 therefore can access the portal server 3 and other servers SV1 through SV5 on the network NT. The control section 23 interchanges various information and data with the portal server 3 and other servers SV1 through SV5.

An encoder/decoder section 34 decodes compressed-coded content data, and then transmits the compressed-coded content data to the display control section 24 or the audio control section 26. The compressed-coded content data is for example obtained from the network NT through the network interface 33 and the communication control section 32. Alternatively, the compressed-coded content data is for example obtained from the storage medium 29 or external storage media.

The encoder/decoder section 34 performs a compression encoding process to generate compressed-coded content data, and then supplies the compressed-coded content data to the storage medium 29. In this case, the content data from external storage media, which is neither compressed nor encoded, the audio data from the tuner section 31, and the like are compressed and encoded by the encoder/decoder section 34.

Accordingly, the content data compressed and encoded by the encoder/decoder section 34 is stored in the storage medium 29 under the control of the control section 23.

The copyright management section 35 generates copyright management information about the content data downloaded from the network NT through the network interface 33 and the communication control section 32. The copyright management section 35 also generates copyright management information about the content data read from external storage media by the external recording media recording and reproducing section 28.

The copyright management information generated by the copyright management section 35 is associated with corresponding content data, and then stored in the storage medium 29 under the control of the control section 23.

The copyright management section 35 properly updates copyright management information associated with content data, when a check-out process of content data between the storage medium 29 and a specific external storage medium is performed, or when a check-in process of content data between the storage medium 29 and a specific external storage medium is performed. In this manner, the copyright management section 35 protects copyright of the content data.

A page information generation section 36 interprets page information, which includes XML (eXtensible Markup Language) files or HTML (Hyper Text Markup Language) files obtained from the network NT via the network interface 33 and the communication control section 32, to generate the video data to be displayed on the display section 25. The page information generation section 36 then supplies the video data to the display control section 24.

An authentication processing section 37 connects to the portal server 3 and other servers SV1 through SV4 on the network NT through the network interface 33. The authentication processing section 37 performs an authentication process such as transmitting authentication information to the portal server 3 and other servers SV1 through SV4 through the communication control section 32 and the network interface 33.

An authentication information storage section 38 stores the authentication information the authentication processing section 37 uses to access the portal server 3 and other servers SV1 through SV4.

A radio broadcasting display control section 39 currently receiving a radio program which a user listens to transmits a request signal, which requests radio broadcast information about the radio program, to the radio broadcast information delivery server SV3, which corresponds to a radio station currently broadcasting the radio program, through the communication control section 32 and the network interface 33.

As a result, the radio broadcasting display control section 39 receives the radio broadcast information from the radio information delivery server SV3 on the network NT via the network interface 33 and the communication control section 32, and then supplies the radio broadcast information to the display control section 24. The display control section 24 displays on the display section 25 the radio broadcast information including a title of the radio program being received, a title of the music being received, an artist name of the music, and the like.

(1-2-2) Directory Management

Figure 3:
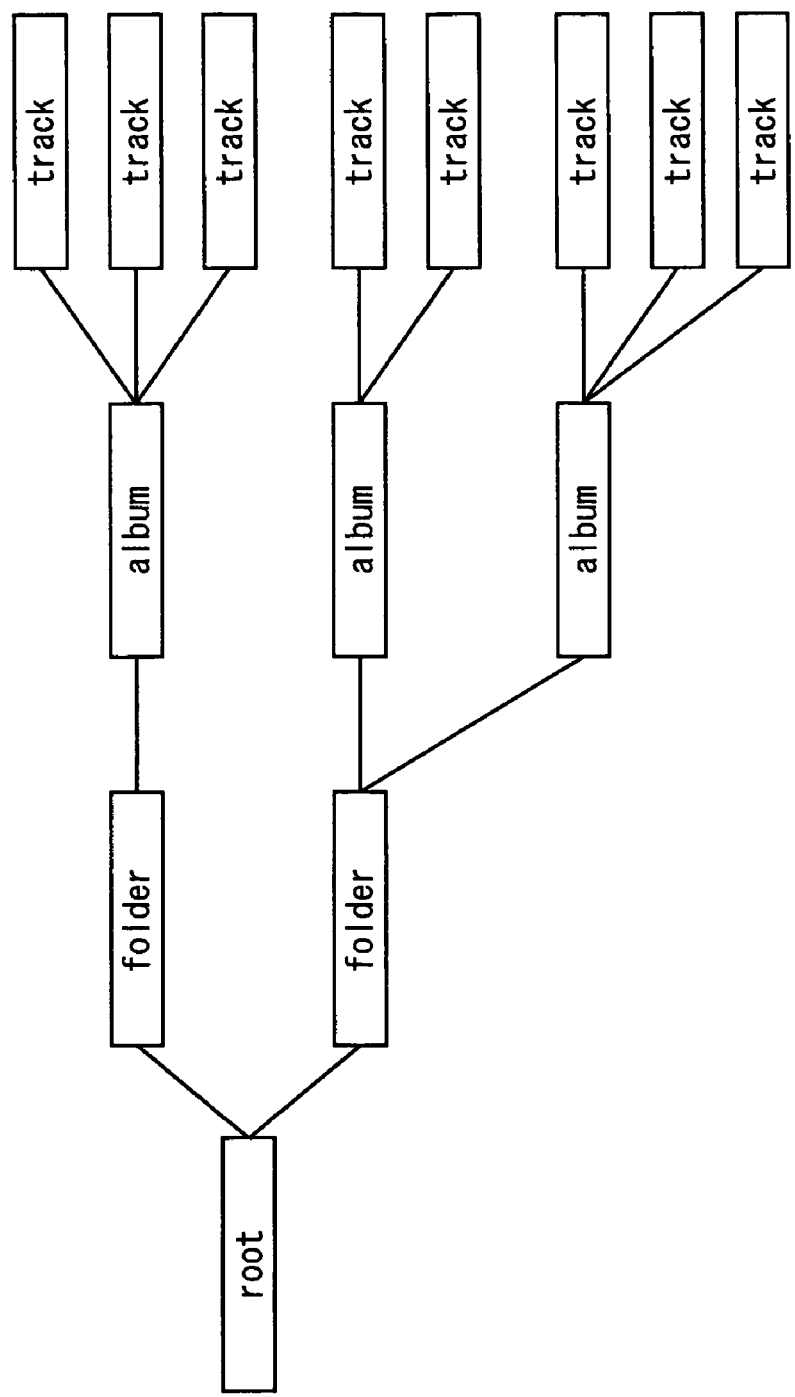
FIG. 3 is a schematic diagram showing a directory structure.

The control section 23 of the client terminal 2 manages content data stored in the storage medium 29 using a directory structure as shown in FIG. 3. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title. One or more "track" files are disposed under an "album" directory, so as to belong to the "album". Each "track" file corresponds to a piece of music, i.e., a content data.

The directory management of content data is performed based on data base files stored in the storage medium 29.

(1-3) Functional Circuit Block Configuration of Portal Server 3

Figure 4:
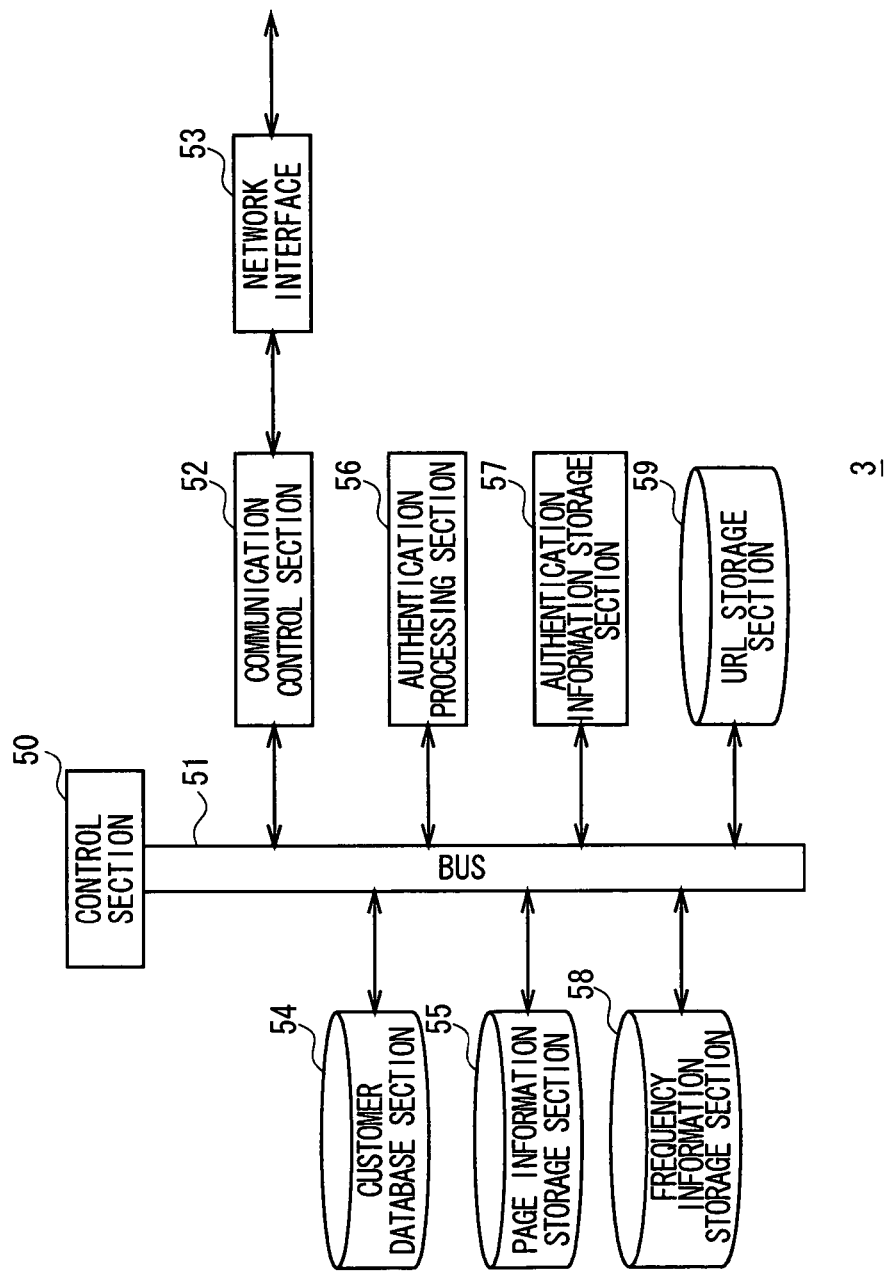
FIG. 4 is a block diagram showing the hardware configuration of a portal server using functional circuit blocks.

With reference to FIG. 4, the hardware configuration of the portal server 3 will be described using functional circuit blocks. The control section 50 of the portal server 3 controls operation of each circuit connected via a bus 51.

A communication control section 52 under the control of the control section 50 interchanges various kinds of information with the client terminal 2 and other servers SV1 through SV6 via a network interface 53.

A customer database section 54 stores a user ID (Identification) of a user who has contracted with a company operating the music related service provision system 1, along with its password information as customer information.

A page information storage section 55 stores page information and the like. The page information is being managed by the company operating the music related service provision system 1.

By the way, the page information is described in XML language or the like. The page information includes URL (Uniform Resource Locator) information to be used to access the music data delivery server SV1, the product sales server SV2, the radio broadcast information delivery server SV3, the Internet radio server SV4 and the like.

An authentication processing section 56 receives the user ID information and password information from the client terminal 2 through the network interface 53 and the communication control section 52, and then performs a user authentication process. In the processes of user authentication, the authentication processing section 56 checks whether or not the received user ID information and password information have been registered in the customer database section 54 as customer information.

After completing the user authentication processes, the authentication processing section 56 issues "portal authentication result information (equivalent to "authentication session ID information" described below)" showing a result of the user authentication process. The authentication processing section 56 then temporarily stores the portal authentication result information in an authentication information storage section 57.

If the result of the user authentication processes by the authentication processing section 56 indicates a fact that the user is legitimate, the control section 50 transmits contractor's page information and portal authentication result information to the client terminal 2 via the communication control section 52 and the network interface 53. The contractor's page information has been stored in a page information storage section 55.

If the result of the user authentication processes by the authentication processing section 56 indicates a fact that the user is not legitimate, the control section 50 may transmit authentication error information and authentication failure notification page information to the client terminal 2 via the communication control section 52 and the network interface 53. In this case, the authentication failure notification page information showing a failure of authentication has been stored in the page information storage section 55.

The client terminal 2 may obtain "portal authentication result information (equivalent to "authentication ticket" described below)" from the music data delivery server SV1, the product sales server SV2 or the radio broadcast information delivery server SV3, after the music data delivery server SV1, the product sales server SV2 or the radio broadcast information delivery server SV3 performs an authentication process of a user. In this case, the authentication processing section 56 receives the portal authentication result information from the user's client terminal 2 via the network interface 53 and the communication control section 52, and then compares the portal authentication result information with the one which corresponds to the user and is temporarily stored in the authentication information storage section 57.

The authentication processing section 56 performs an authentication process to the portal authentication result information that the client terminal 2 received from the music data delivery server SV1, the product sales server SV2 or the radio broadcast information delivery server SV3. In the authentication processes, the authentication processing section 56 performs a check process to check whether or not the received portal authentication result information is legitimate, and then transmits check result information showing a result of the check through the communication control section 52 and the network interface 53 to the music data delivery server SV1, the product sales server SV2 or the radio broadcast information delivery server SV3.

A frequency information storage section 58 associates the following items together to memorize: a regional code identifying a region, such as a postal code; frequency information showing a radio broadcast frequency receivable in the region; a name of a radio station (which is also referred to as "radio station name") which broadcasts radio programs; and a call sign, which is identification information unique to each radio station.

A URL storage section 59 associates call signs of radio stations with corresponding URL information to stores them. The call sign is unique to each radio station which broadcasts radio programs. The URL information is utilized to acquire radio broadcast information. The radio broadcast information includes information about a radio program currently broadcast from a radio station which corresponds to the call sign associated. The radio broadcast information, which is also referred to as "now-on-air information", for example includes a title of a radio program, and a title of music currently played in the radio program.

(1-4) Functional Circuit Block Configuration of Music Data Delivery Server SV1

Figure 5:
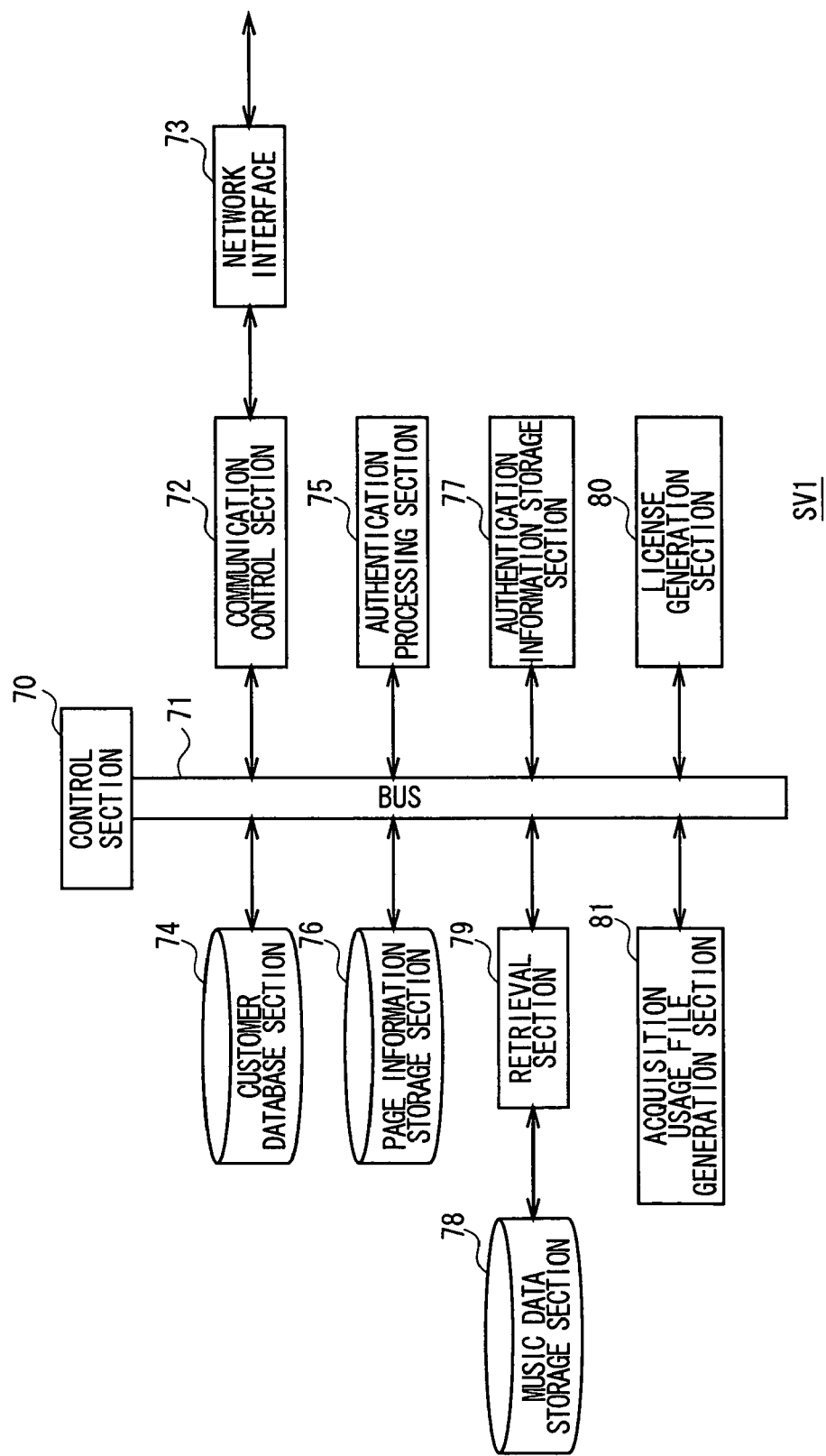
FIG. 5 is a block diagram showing the hardware configuration of a music data delivery server using functional circuit blocks.

With reference to FIG. 5, the configuration of the music data delivery server SV1 will be described using functional circuit blocks. The control section 70 of the music data delivery server SV1 controls operation of each circuit connected via a bus 71.

A communication control section 72 under the control of the control section 70 interchanges various kinds of information and various kinds of data such as content data with the client terminal 2, the portal server 3, and the like via a network interface 73.

A customer database section 74 stores user ID information of a user who has contracted with a company operating the music data delivery server SV1, along with its password information as customer information. By the way, an authentication processing section 75 may have capabilities to authenticate a user based on portal authentication result information (this portal authentication result information is issued by the portal server 3 to the client terminal 2 and transmitted from the client terminal 2 to the music data delivery server SV1). In this case, the customer database section 74 can be omitted.

A page information storage section 76 stores page information, which is utilized for distribution of music data and presenting downloadable music data (this page information is also referred to as "music-data-distribution page information"), and the like. The page information is managed by the music data delivery server SV1.

The music-data-distribution page information, described in the XML language or the like, has a structure through which a user of the client terminal 2 can select the music data he/she wants to download.

When the client terminal 2 transmits a page information acquisition request signal, which requests the music-data-distribution page information, the control section 70 receives the page information acquisition request signal via the network interface 73 and the communication control section 72. The control section 70 then transmits, in response to the page information acquisition request signal, the music-data-distribution page information stored in the page information storage section 76 to the client terminal 2 via the communication control section 72 and the network interface 73.

When the client terminal 2 transmits the user's user ID information and the password information, the authentication processing section 75 receives the user ID information and the password information via the network interface 73 and the communication control section 72. The authentication processing section 75 then performs a user authentication process. In the user authentication process, the authentication processing section 75 checks whether or not the user ID information and password information received has been registered in the customer database section 74 as customer information.

The authentication processing section 75 may perform another user authentication process, which is different from the one which uses the user ID information and the password information. In this case, the client terminal 2 supplies portal authentication result information (equivalent to an "authentication ticket" described below) issued by the portal server 3.

The authentication processing section 75 receives the portal authentication result information via the network interface 73 and the communication control section 72, and then supplies the portal authentication result information to the portal server 3 via the communication control section 72 and the network interface 73.

In this manner, the portal authentication result information is supplied from the authentication processing section 75 to the portal server 3. The portal server 3 then performs an authentication process to the portal authentication result information (i.e. the check process described above), and then supplies the check results information. The authentication processing section 75 receives the check results information via the network interface 73 and the communication control section 72, and then checks whether or not the user is legitimate based on the check results information. In this case, a legitimate user is the one who has contracted with a company operating the music related service provision system 1.

After completing the user authentication process, the authentication processing section 75 issues server authentication result information (equivalent to a "service session ID information" described below). The server authentication result information shows a result of the user authentication process.

If the result of the user authentication process by the authentication processing section 75 indicates a fact that the user is legitimate, the control section 70 transmits the music-data-distribution page information and the server authentication result information to the client terminal 2 via the communication control section 72 and the network interface 73. The music-data-distribution page information for contractors has been stored in the page information storage section 76.

By contrast, when the result of the user authentication process by the authentication processing section 75 shows a fact that the user is not legitimate, the control section 70 transmits authentication error information and authentication failure notification page information to the client terminal 2 via the communication control section 72 and the network interface 73. In this case, the authentication failure notification page information showing a failure of authentication has been stored in the page information storage section 76.

By the way, an authentication information storage section 77 temporarily stores the server authentication result information issued by the authentication processing section 75. The authentication information storage section 77 also stores other authentication information which is necessary for the authentication processing section 75 to authenticate a user of the client terminal 2.

A music data storage section 78 has stored compressed-coded music data associated with corresponding retrieval keys. The music data has been compressed and encoded in ATRAC3 format, MP3 format, or the like. The retrieval key is equivalent to content ID information and the like.

By the way, after the music-data-distribution page information is transmitted to the client terminal 2, the client terminal 2 may transmit a download request signal. The download request signal requests download of music data which a user wants to download, and includes a retrieval key for searching the music data. A retrieval section 79 receives the download request signal via the network interface 73 and the communication control section 72, and then obtains the retrieval key from the download request signal.

The retrieval section 79 then searches a plurality of music data stored in the music data storage section 78 for the music data which meets a retrieval condition indicated by the retrieval key. That is to say, the retrieval section 79 searches for the music data which a user wants to download.

As a result, the control section 70 transmits the searched music data (which a user wants to download) to the client terminal 2 via the communication control section 72 and the network interface 73.

A license generation section 80 generates a usage allowance data (also refereed to as license data) to make downloadable music data available by changing its attribute of playback and the like.

An acquisition usage file generation section 81 generates, when a user of the client terminal 2 requests to purchase music, an acquisition usage file to be used to acquire the requested music data and the license data that makes the music data available.

Accordingly, before downloading the music data to the client terminal 2 whose user has requested to purchase the music, the control section 70 actually transmits the acquisition usage file to the client terminal 2 via the communication control section 72 and the network interface 73.

The control section 70 then allows the client terminal 2 to download the music data in accordance with the description in the acquisition usage file, along with the license data that makes the music data available.

Accordingly, the control section 70 allows the client terminal 2 to play back the music data or the like in accordance with the contents of the license data.

In this manner, the control section 70 provides the acquisition usage file. This prevents third parties from improperly downloading and using only the music data stored in the music data storage section 78.

In addition, the control section 70 provides this situation: the client terminal 2 or the like, which downloads the music data, cannot use the music data unless it has got both the music data and the corresponding license data. This prevents third parties from improperly using the music data.

In addition to that, when the client terminal 2 has downloaded the music data and the license data, the control section 70 transmits fee-charging information, which is to be used to charge the user a fee for downloading, to the fee-charging server SV5 via the communication control section 72 and the network interface 73. The fee-charging server SV5 performs fee-charging process to charge the user a fee for the downloading of the music data and the license data.

(1-5) Functional Circuit Block Configuration of Product Sales Server SV2

Figure 6:
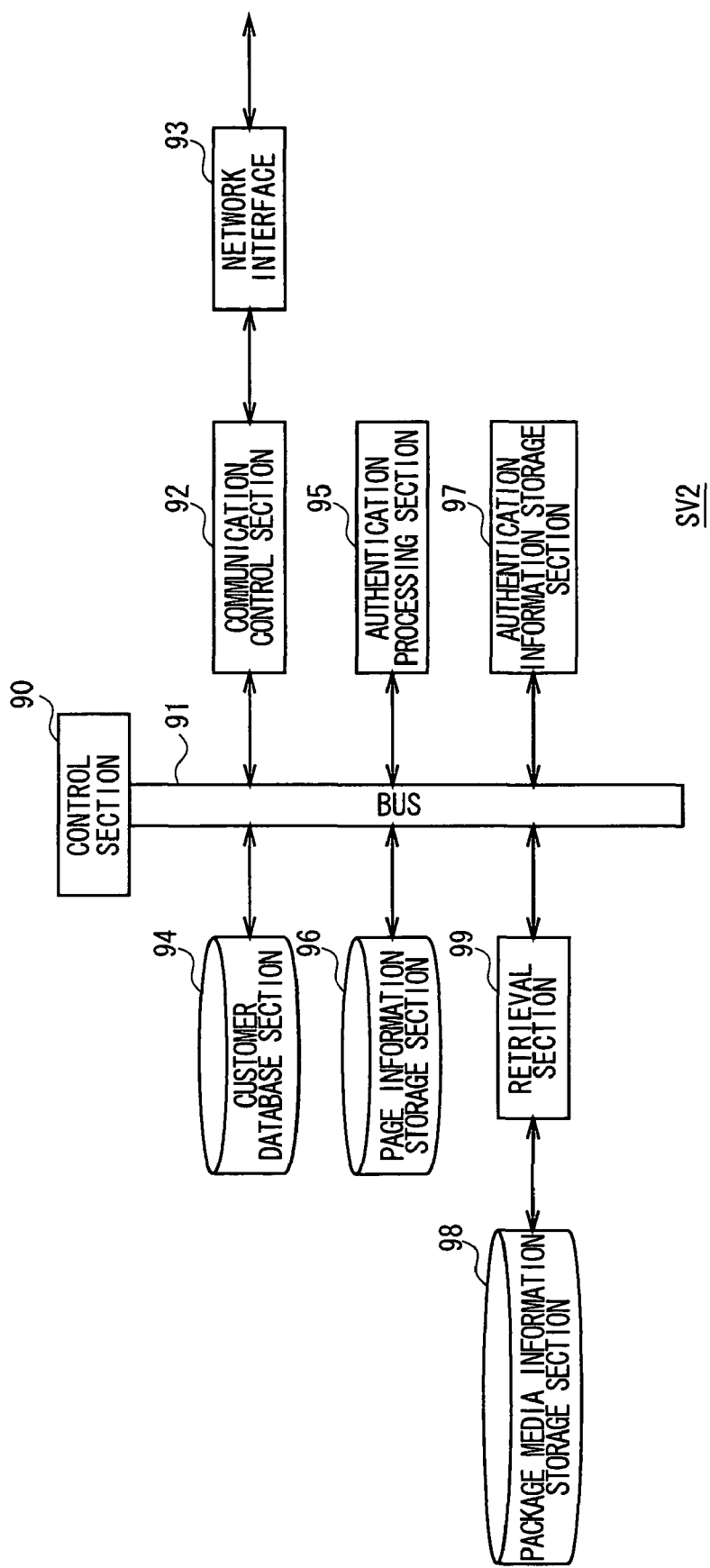
FIG. 6 is a block diagram showing the hardware configuration of a product sales server using functional circuit blocks.

With reference to FIG. 6, the hardware configuration of the product sales server SV2 will be described using functional circuit blocks. A control section 90 of the product sales server SV2 controls operation of each circuit connected via a bus 91.

A communication control section 92 under the control of the control section 90 interchanges various kinds of information with the client terminal 2, the portal server 3, and the like via a network interface 93.

A customer database section 94 stores user ID information of a user who has contracted with a company operating the product sales server SV2, along with its password information, as customer information. By the way, an authentication processing section 95 may have capabilities to authenticate a user based on portal authentication result information (this portal authentication result information is issued by the portal server 3 to the client terminal 2 and transmitted from the client terminal 2 to the product sales server SV2). In this case, the customer database section 94 can be omitted.

A page information storage section 96 stores page information, which is utilized for sales of package media and presenting package media such as CDs and DVDs for sale (this page information is also referred to as "package-mediasales page information"), and the like. The page information is managed by the product sales server SV2.

The package-media-sales page information, described in the XML language or the like, has a structure through which a user of the client terminal 2 can select package media such as CDs and DVDs which the user wants to buy.

When the client terminal 2 transmits a page information acquisition request signal, which requests the package-media-sales page information, the control section 90 receives the page information acquisition request signal via the network interface 93 and the communication control section 92. The control section 90 then transmits, in response to the page information acquisition request signal, the package-media-sales page information stored in the page information storage section 96 to the client terminal 2 via the communication control section 92 and the network interface 93.

When the client terminal 2 transmits the user's user ID information and the password information, the authentication processing section 95 receives the user ID information and the password information via the network interface 93 and the communication control section 92. The authentication processing section 95 then performs a user authentication process. In the user authentication process, the authentication processing section 95 checks whether or not the user ID information and password information received has been registered in the customer database section 94 as customer information.

The authentication processing section 95 may perform another user authentication process, which is different from the one that uses the user ID information and the password information. In this case, the client terminal 2 transmits portal authentication result information (equivalent to an "authentication ticket" described below) issued by the portal server 3. The authentication processing section 95 receives the portal authentication result information via the network interface 93 and the communication control section 92, and then transmits the portal authentication result information to the portal server 3 via the communication control section 92 and the network interface 93.

In this manner, the portal authentication result information is transmitted from the authentication processing section 95 to the portal server 3. The portal server 3 then performs an authentication process to the portal authentication result information (i.e. the check process described above), and then transmits check results information. The authentication processing section 95 receives the check results information via the network interface 93 and the communication control section 92, and then checks whether or not the user is legitimate based on the check results information. In this case, a legitimate user is the one who has contracted with a company operating the music related service provision system 1.

After completing the user authentication process, the authentication processing section 95 issues server authentication result information (equivalent to a "service session ID information" described below). The server authentication result information shows a result of the user authentication process.

When the result of the user authentication process by the authentication processing section 95 indicates a fact that the user is legitimate, the control section 90 transmits the package-media-sales page information and the server authentication result information to the client terminal 2 via the communication control section 92 and the network interface 93. The package-media-sales page information for contractors has been stored in the page information storage section 96.

Whereas when the result of the user authentication process by the authentication processing section 95 shows a fact that the user is not legitimate, the control section 90 transmits authentication error information and authentication failure notification information to the client terminal 2 via the communication control section 92 and the network interface 93. In this case, the authentication failure notification information showing a failure of authentication has been stored in the page information storage section 96.

An authentication information storage section 97 temporarily stores the server authentication result information issued by the authentication processing section 95. The authentication information storage section 97 also stores other authentication information which is necessary for the authentication processing section 95 to authenticate a user of the client terminal 2.

A package media information storage section 98 has stored a plurality of pieces of package media information associated with corresponding retrieval keys. Each piece of package media information relates to a package medium such as CD and DVD for sale. The retrieval key is equivalent to package medium ID information and the like.

By the way, after the package-media-sales page information is transmitted to the client terminal 2, the client terminal 2 may transmits a media information request signal. The media information request signal requests package media information about package media such as CDs and DVDs. A retrieval section 99 receives the media information request signal via the network interface 93 and the communication control section 92, and then obtains a retrieval key from the media information request signal. The retrieval key is used to retrieve a specific package medium.

The retrieval section 99 then searches a plurality of piece of package media information stored in the package media information storage section 98 for a piece of package media information which meets a retrieval condition indicated by the retrieval key.

As a result, the control section 90 transmits the searched package media information to the client terminal 2 via the communication control section 92 and the network interface 93, and therefore shows a user the package media information about the specific package medium.

When the client terminal 2 transmits a purchase request signal, which requests a purchase of the package medium, the control section 90 receives the purchase request signal via the network interface 93 and the communication control section 92, and then performs a sale process. In the sale processes, the control section 90 for example performs a shipping procedure to ship the package medium to the user of the client terminal 2.

At this time, the control section 90 transmits fee-charging information to the fee-charging server SV5 via the communication control section 92 and the network interface 93. The fee-charging information is used to charge a user a fee for the purchased package medium. The fee-charging server SV5 performs fee-charging processes to charge the user a fee for the purchased package medium.

After the fee-charging server SV5 completes the fee-charging processes for the user, the control section 90 subsequently transmits sale completion page information to the client terminal 2 via the communication control section 92 and the network interface 93. The sale completion page information shows a fact that the sale process of the package medium has been completed.

(1-6) Functional Circuit Block Configuration of Radio Broadcast Information Delivery Server SV3

Figure 7:
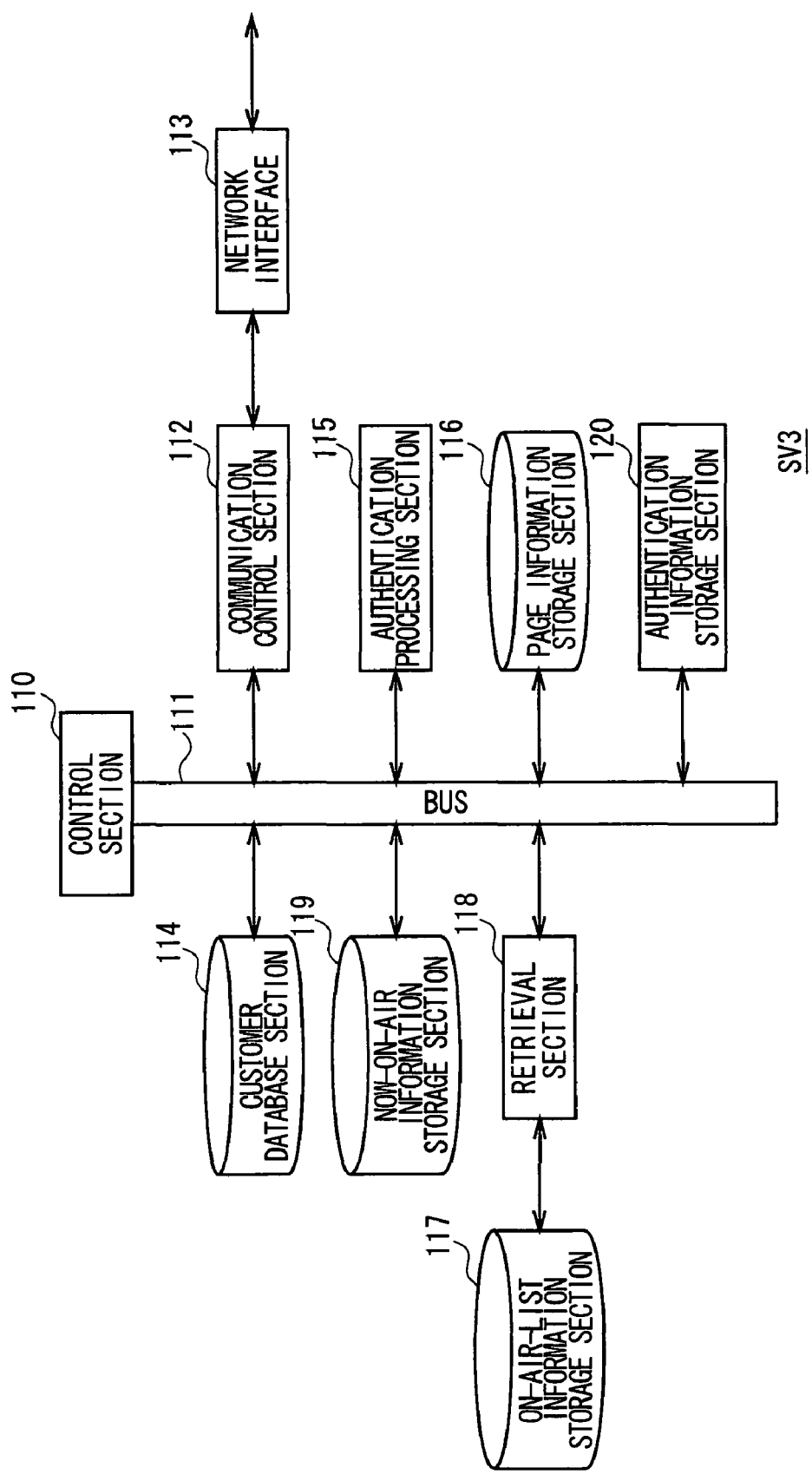
FIG. 7 is a block diagram showing the hardware configuration of a radio broadcast information delivery server using functional circuit blocks.

With reference to FIG. 7, the hardware configuration of the radio broadcast information delivery server SV3 will be described using functional circuit blocks. A control section 110 of the radio broadcast information delivery server SV3 controls operation of each circuit connected via a bus 111.

A communication control section 112 under the control of the control section 110 interchanges various kinds of information with the client terminal 2, the portal server 3, and the like via a network interface 113.

A customer database section 114 stores user ID information of a user who has contracted with a company operating the radio broadcast information delivery server SV3, along with its password information as customer information. By the way, an authentication processing section 115 may have capabilities to authenticate a user based on portal authentication result information (this portal authentication result information is issued by the portal server 3 to the client terminal 2 and transmitted from the client terminal 2 to the radio broadcast information delivery server SV3). In this case, the customer database section 114 can be omitted.

A page information storage section 116 stores page information which is used for acquisition of radio broadcast information, and the like. In this case, the radio broadcast information relates to radio programs which have already been broadcast from a radio station corresponding to the radio broadcast information delivery server SV3. The radio broadcast information is also referred to as "on-air-list information", and the page information used for acquisition of on-air-list information is also referred to as "on-air-list-information-distribution page information". The page information is managed by the radio broadcast information delivery server SV3.

The on-air-list-information-distribution page information, described in the XML language or the like, provides an input box and the like through which a user of the client terminal 2 can input retrieval keys of the on-air-list information which he/she wants to obtain. A radio program title, a date and time of broadcast of a radio program, and the like could be the retrieval key.

An on-air-list information storage section 117 stores on-air-list information. The on-air-list information is generated by listing the following information: a title of a radio program which has already been broadcast from a radio station corresponding to the radio broadcast information delivery server SV3; a start and end time of broadcast of the program; an artist name and title of music played in the program; the start time of broadcast of the music, and the like.

When the client terminal 2 transmits a page information acquisition request signal which requests on-air-list-information-distribution page information, the control section 110 receives the page information acquisition request signal via the network interface 113 and the communication control section 112. The control section 110 then transmits, in response to the page information acquisition request signal, the on-air-list-information-distribution page information which has been stored in the page information storage section 116 to the client terminal 2 via the communication control section 112 and the network interface 113.

When a user inputs a retrieval key of on-air-list information the user wants to obtain through the on-air-list-information-distribution page information, the client terminal 2 transmits an on-air-list information request signal including the retrieval key. The on-air-list information request signal requests download of the on-air-list information. A retrieval section 118 receives the on-air-list information request signal via the network interface 113 and the communication control section 112, and then obtains the retrieval key from the on-air-list information request signal.

The retrieval section 118 then searches, based on the retrieval key, the whole on-air-list information stored in the on-air-list information storage section 117 to extract part of the on-air-list information which meets a retrieval condition indicated by the retrieval key. In this manner, part of on-air-list information the user wants to acquire is obtained.

The control section 110 subsequently transmits the obtained on-air-list information to the client terminal 2 via the communication control section 112 and the network interface 113.

A now-on-air information storage section 119 stores now-on-air information. The now-on-air information is made up of the following items: a title of a radio program currently being broadcast from a radio station corresponding to the radio broadcast information delivery server SV3; a start and end time of broadcast of the program; an artist name and title of music currently being played in the program; a start time of broadcast of the music, and the like.

When the client terminal 2 transmits the user's user ID information and the password information with a now-on-air information request signal which requests now-on-air information, the authentication processing section 115 receives the user ID information and the password information via the network interface 113 and the communication control section 112. The authentication processing section 115 then performs a user authentication process. In the user authentication process, the authentication processing section 115 checks whether or not the user ID information and password information received has been registered in the customer database section 114 as customer information.

The authentication processing section 115 may perform another user authentication process. This user authentication process is different from the one which uses the user ID information and the password information. In this case, the client terminal 2 transmits portal authentication result information (equivalent to an "authentication ticket" described below) issued by the portal server 3. The authentication processing section 115 receives the portal authentication result information via the network interface 113 and the communication control section 112, and then transmits the portal authentication result information to the portal server 3 via the communication control section 112 and the network interface 113.

In this manner, the portal authentication result information is transmitted from the authentication processing section 115 to the portal server 3. The portal server 3 then performs an authentication process to the portal authentication result information (i.e. the check process described above), and then transmits check results information. The authentication processing section 115 receives the check results information via the network interface 113 and the communication control section 112, and then checks whether or not the user is legitimate based on the check results information. In this case, a legitimate user is the one who has contracted with a company operating the music related service provision system 1.

When completing the user authentication process, the authentication processing section 115 issues server authentication result information (equivalent to a "service session ID information" described below). The server authentication result information shows a result of the user authentication process.

When the result of the user authentication process by the authentication processing section 115 shows a fact that the user is legitimate, the control section 110 transmits the server authentication result information and the now-on-air information stored in the now-on-air information storage section 119 to the client terminal 2 via the communication control section 112 and the network interface 113.

Whereas when the result of the user authentication process by the authentication processing section 115 shows a fact that the user is not legitimate, the control section 110 transmits authentication error information and authentication failure notification page information to the client terminal 2 via the communication control section 112 and the network interface 113. In this case, the authentication failure notification page information showing a failure of authentication has been stored in the page information storage section 116.

As described above, when the control section 110 receives a request for now-on-air information from a user, the control section 110 supplies the now-on-air information, if the authentication result shows a fact that the user is legitimate. Whereas if the authentication result shows a fact that the user is not legitimate, the control section 110 does not provide a radio broadcast information delivery service. That is to say, the control section 110 does not supply the now-on-air information. The radio broadcast information delivery service is a service provided by the radio broadcast information delivery server SV3.

An authentication information storage section 120 temporarily stores the server authentication result information issued by the authentication processing section 115. The authentication information storage section 120 also stores other authentication information which is necessary for the authentication processing section 115 to authenticate a user of the client terminal 2.

(1-7) Brief Overview of Processes of Each Server

With reference to sequence charts shown in FIGS. 8 through 13, brief overview of processes between the client terminal 2 and the portal server 3 will be described. Also, brief overview of processes between the client terminal 2 and other servers such as the music data delivery server SV1, the product sales server SV2, and the radio broadcast information delivery server SV3 will be described.

(1-7-1) User Authentication Process Between Client Terminal 2 and Portal Server 3

Figure 8:
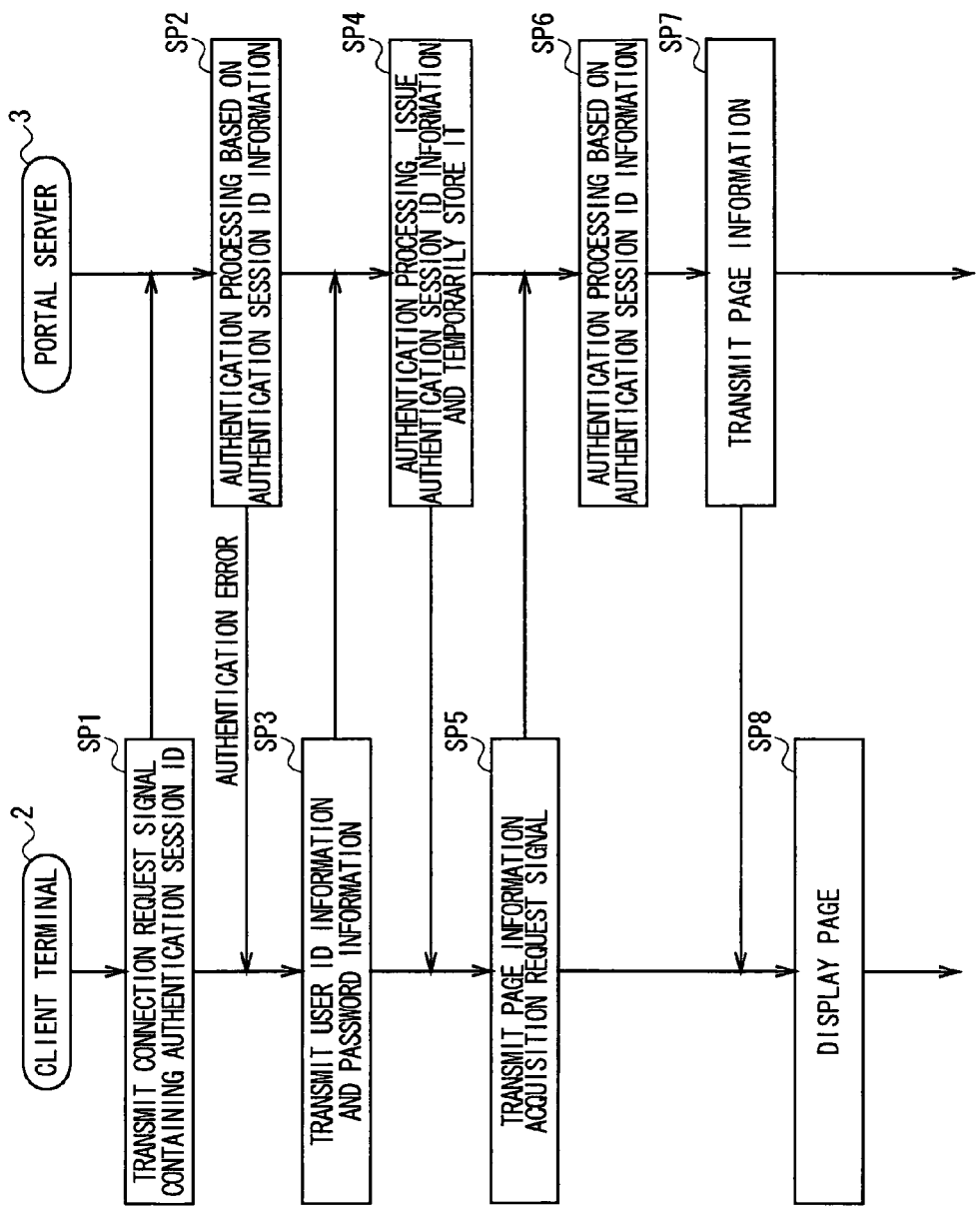
FIG. 8 is a sequence chart showing a user authentication process between the client terminal and the portal server.

Referring to FIG. 8, a user authentication process between the client terminal 2 and the portal server 3 will be described.

When a user who has contracted with a company operating the music related service provision system 1 operates the client terminal 2 to turn the client terminal 2 on, the operation input section 20 of the client terminal 2 detects an operation input signal. Alternatively, when a user pushes a particular operation button of the operation input section 20, the operation input section 20 detects an operation input signal. The input processing section 21 transforms the operation input signal into an operation command, and supplies the operation command to the control section 23. The control section 23 therefore starts an authentication request process.

At step SP1, after the control section 23 of the client terminal 2 starts an authentication request process, the control section 23 of the client terminal 2 generates a connection request signal, and then transmits the connection request signal to the portal server 3 via the communication control section 32 and the network interface 33. The connection request signal includes authentication session ID information, which has been temporarily stored in the authentication information storage section 38, and the like.

The authentication session ID information is issued by the portal server 3 each time when a communication connection between the client terminal 2 and the portal server 3 is established to perform various processes such as a user authentication process. The authentication session ID information identifies each communication connection state (i.e., session).

The authentication session ID information has a certain period of validity for a user authentication process and the like. The period of validity starts when the portal server 3 issues it. The period of validity for example is one minute.

In a case in which the client terminal 2 that has already obtained the authentication session ID information from the portal server 3 can not submit the authentication session ID information to the portal server 3 within the period of validity, the portal server 3 determines that the communication connection identified by the authentication session ID information has been broken.

In this manner, the portal server 3 prevents the issued authentication session ID information from being used improperly by someone who has not contracted with a company operating the music related service provision system 1 for the purpose of a user authentication process or the like.

In this case, the authentication information storage section 38 temporarily stores the authentication session ID information, which was issued by the portal server 3 when the communication connection between the client terminal 2 and the portal server 3 was established for the purpose of user authentication process or the like at a time in the past.

When the client terminal 2 transmits a connection request signal, the control section 50 of the portal server 3 at step SP2 receives the connection request signal via the network interface 53 and the communication control section 52. The control section 50 then transmits the authentication session ID information and the like in the connection request signal to the authentication processing section 56.

The authentication processing section 56 under the control of the control section 50 performs, based on the authentication session ID information and the like, an authentication process. This authentication session ID information was received as the connection request signal from the client terminal 2.

As a result, when the authentication processing section 56 determines that a user of the client terminal 2 is not legitimate, the control section 50 transmits authentication error information showing authentication error to the client terminal 2 via the communication control section 52 and the network interface 53. In this case, the authentication processing section 56 determines that the user is not legitimate, when the authentication session ID information and the like received from the client terminal 2 have expired, or when there are other reasons.

At step SP3, the control section 23 of the client terminal 2 receives the authentication error information from the portal server 3 via the network interface 33 and the communication control section 32. The control section 23 subsequently obtains user ID information, password information, and the like from the authentication information storage section 38, and then transmits the user ID information, the password information, and the like to the portal server 3 via the communication control section 32 and the network interface 33.

At step SP4, the control section 50 of the portal server 3 receives the user ID information, the password information, and the like from the client terminal 2 via the network interface 53 and the communication control section 52, and then supplies the user ID information, the password information, and the like to the authentication processing section 56.

The authentication processing section 56 under the control of the control section 50 performs a user authentication process. In the user authentication process, the authentication processing section 56 checks whether or not the user ID information, the password information, and the like from the client terminal 2 exist in the customer information registered in the customer database section 54.

As a result, when the authentication processing section 56 determines that a user of the client terminal 2 is legitimate, the authentication processing section 56 under the control of the control section 50 issues portal authentication result information for the client terminal 2. In this case, the portal authentication result information is equivalent to authentication session ID information which identifies the communication connection being maintained between the client terminal 2 and the portal server 3, and the like. The authentication processing section 56 then temporarily stores the authentication session ID information issued and the like in the authentication information storage section 57.

The control section 50 subsequently transmits the authentication session ID information and the like to the client terminal 2 via the communication control section 52 and the network interface 53. The authentication session ID information and the like were issued by the authentication processing section 56 to the client terminal 2.

At step SP5, the control section 23 of the client terminal 2 receives the authentication session ID information and the like from the portal server 3 via the network interface 33 and the communication control section 32, and then supplies the authentication session ID information and the like to the authentication processing section 37.

The authentication processing section 37 under the control of the control section 23 temporarily stores the authentication session ID information and the like received from the portal server 3 in the authentication information storage section 38.

The control section 23 subsequently transmits a page information acquisition request signal along with the authentication session ID information and the like (which were received from the portal server 3 and temporarily stored in the authentication information storage section 38) to the portal server 3 via the communication control section 32 and the network interface 33. The page information acquisition request signal requests the page information from the portal server 3.

At step SP6, the control section 50 of the portal server 3 receives the page information acquisition request signal, the authentication session ID information, and the like from the client terminal 2 via the network interface 53 and the communication control section 52, and then supplies the authentication session ID information, and the like to the authentication processing section 56.

The authentication processing section 56 under the control of the control section 50 then performs a user authentication process. In the user authentication process, the authentication processing section 56 compares the authentication session ID information and the like from the client terminal 2 with the ones temporarily stored in the authentication information storage section 57. The information temporarily stored in the authentication information storage section 57 was issued to the client terminal 2 at step SP4.

At step SP7, when a result of the authentication indicates a fact that a user of the client terminal 2 is legitimate, the authentication processing section 56 determines that the request for page information from the client terminal 2 is legitimate. The authentication processing section 56 then extends the period of validity of the authentication session ID information and the like.

Therefore, the control section 50 reads the page information requested by the user from the page information storage section 55, and transmits the page information, the authentication session ID information, and the like to the client terminal 2 via the communication control section 52 and the network interface 53. The authentication session ID information and the like have their period of validity extended through the authentication processing section 56.

At step SP8, the control section 23 of the client terminal 2 receives the page information, the authentication session ID information and the like from the portal server 3 via the network interface 33 and the communication control section 32. The authentication session ID information and the like have their period of validity extended. The control section 23 of the client terminal 2 then supplies the page information to the page information generation section 36. The control section 23 of the client terminal 2 also supplies the authentication session ID information and the like to the authentication processing section 37.

The page information generation section 36 generates, based on the page information from the control section 23, video data of a page containing links to the music data delivery server SV1, the product sales server SV2, and the radio broadcast information delivery server SV3. The page information generation section 36 subsequently supplies the video data to the display control section 24.

The display control section 24 performs digital-to-analog conversion to the video data from the page information generation section 36 to generate an analog video signal. The display control section 24 subsequently supplies the analog video signal to the display section 25 which then displays, based on the analog video signal, an image of a page of the portal server 3.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have their period of validity extended. In this manner, the authentication session ID information and the like temporarily stored at above step SP5 are updated to the ones having their period of validity extended.

(1-7-2) Procedure of User Authentication Process Between Client Terminal 2 and Servers SV1 Through SV3

Figure 9:
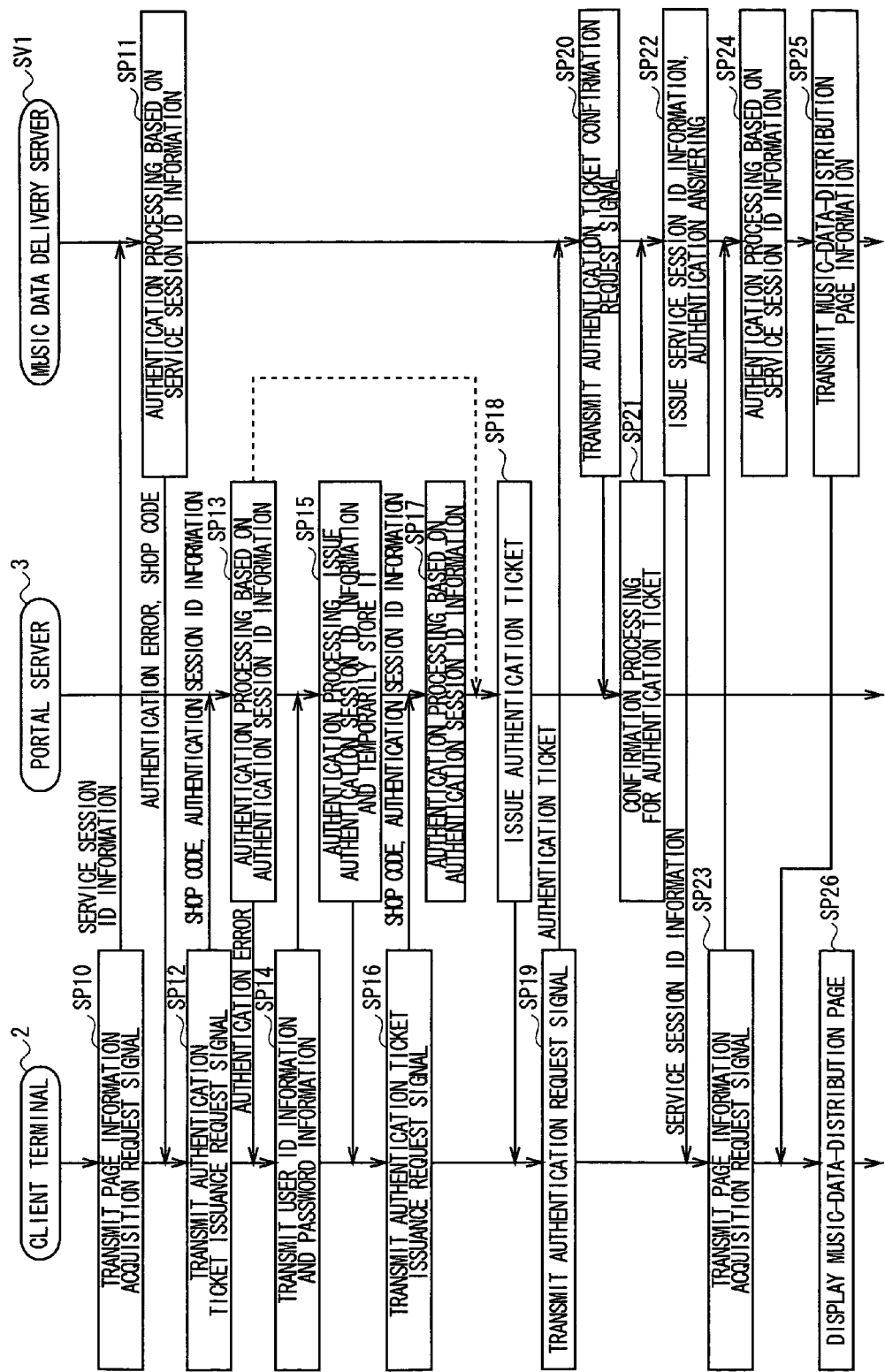
FIG. 9 is a sequence chart showing a user authentication process between the client terminal and the music data delivery server.

Referring to FIG. 9, a user authentication process will be described. The user authentication process is executed between the client terminal 2 and the music data delivery server SV1, the product sales server SV2 and the radio broadcast information delivery server SV3.

In this case, when the client terminal 2 accesses, after acquiring page information from the portal server 3 as described above (FIG. 8), the music data delivery server SV1, the product sales server SV2 and the radio broadcast information delivery server SV3 based on links embedded in the page information, the user authentication process is executed. This user authentication process is also referred to as an "indirect access authentication process".

In addition, when the client terminal 2 directly accesses the music data delivery server SV1, the product sales server SV2 and the radio broadcast information delivery server SV3 based on the URL information and the like previously bookmarked without obtaining page information from the portal server 3, the user authentication process is executed. This user authentication process is also referred to as a "direct access authentication process".

The indirect access authentication process can be performed in any combination of the following: the client terminal 2 and the music data delivery server SV1; the client terminal 2 and the product sales server SV2; and, the client terminal 2 and the radio broadcast information delivery server SV3.

The direct access authentication process also can be performed in any combination of the following: the client terminal 2 and the music data delivery server SV1; the client terminal 2 and the product sales server SV2; and, the client terminal 2 and the radio broadcast information delivery server SV3.

A difference between the indirect access authentication process and the direct access authentication process is a way of acquiring URL information which the client terminal 2 uses to access the music data delivery server SV1, the product sales server SV2 and the radio broadcast information delivery server SV3. The indirect access authentication process and the direct access authentication process perform the same procedure after obtaining the URL information.

Accordingly, for ease of explanation, the following description uses the music data delivery server SV1 which the client terminal 2 accesses. Both the indirect access authentication process and the direct access authentication process will be collectively described as a user authentication process.

At step SP10, the control section 23 of the client terminal 2 transmits a page information acquisition request signal, the service session ID information read from the authentication information storage section 38, and the like to the music data delivery server SV1 through the communication control section 32 and the network interface 33. At this time, the control section 23 of the client terminal 2 uses the URL information that has been embedded in the page information as links, or has been previously bookmarked. The page information acquisition request signal requests the music-data-distribution page information (if the client terminal 2 accesses the product sales server SV2 or the radio broadcast information delivery server SV3, the page information acquisition request signal requests the package-media-sales page information or the on-air-list-information-distribution page information).

Each time when the communication connection between the client terminal 2 and the music data delivery server SV1, the client terminal 2 and the product sales server SV2, or the client terminal 2 and the radio broadcast information delivery server SV3 is established to perform various processes such as the user authentication process, the service session ID information is issued by the connected server SV1, SV2 or SV3. The service session ID information identifies each communication connection state (i.e., session).

The service session ID information has a certain period of validity of the user authentication processes and the like, in the same way as the above-noted authentication session ID information. The period of validity starts when the music data delivery server SV1, the product sales server SV2 or the radio broadcast information delivery server SV3 issues it. The period of validity for example is one minute.

In a case in which the client terminal 2 that already has the service session ID information issued by the server SV1, SV2 or SV3 can not submit the service session ID information to the issued server SV1, SV2 or SV3 within the period of validity, the issued server SV1, SV2 or SV3 determines that the communication connection identified by the service session ID information has been broken.

In this manner, the music data delivery server SV1, the product sales server SV2 or the radio broadcast information delivery server SV3 prevents the issued authentication session ID information from being used improperly by someone who has not contracted with a company operating the music related service provision system 1 for the purpose of the user authentication process or the like.

In this case, the service session ID information, which is temporarily stored in the authentication information storage section 38, was issued by the music data delivery server SV1, the product sales server SV2 or the radio broadcast information delivery server SV3 when the communication connection between the client terminal 2 and the server SV1, the client terminal 2 and the server SV2 or the client terminal 2 and the server SV3 was established for the purpose of the user authentication process or the like at a time in the past.

At step SP11, the control section 70 of the music data delivery server SV1 receives the page information acquisition request signal, the service session ID information, and the like from the client terminal 2 via the network interface 73 and the communication control section 72. The control section 70 of the music data delivery server SV1 then supplies the service session ID information and the like to the authentication processing section 75.

The authentication processing section 75 under the control of the control section 70 performs the user authentication process. In the user authentication process, the authentication processing section 75 compares the service session ID information and the like from client terminal 2 with those temporarily stored in the authentication information storage section 77.

As a result, if a result of the authentication shows a fact that a user of the client terminal 2 is not legitimate, the authentication processing section 75 determines that the request for music-data-distribution page information from the client terminal 2 is not legitimate. For example, when the service session ID information from the client terminal 2 has expired, the authentication result shows a fact that a user of the client terminal 2 is not legitimate.

The control section 70 subsequently transmits authentication error information showing authentication error, and a shop code identifying the music data delivery server SV1 to the client terminal 2 via the communication control section 72 and the network interface 73, because the authentication processing section 75 determines that a user of the client terminal 2 is not legitimate.

At step SP12, the control section 23 of the client terminal 2 receives the authentication error information and the shop code from the music data delivery server SV1 via the network interface 33 and the communication control section 32. The control section 23 of the client terminal 2 subsequently recognizes that the user is not authenticated as a legitimate user based on the authentication error information, and then temporarily stores the shop code from the music data delivery server SV1 in the authentication information storage section 38.

The control section 23 subsequently generates an authentication ticket issuance request signal. The authentication ticket issuance request signal requests an issue of an authentication ticket to be used to access the music data delivery server SV1. The control section 23 then transmits the authentication ticket issuance request signal, the shop code of the music data delivery server SV1, the authentication session ID information, which was temporarily stored in the authentication information storage section 38, and the like to the portal server 3 via the communication control section 32 and the network interface 33.

At step SP13, the control section 50 of the portal server 3 receives the authentication ticket issuance request signal, the shop code, the authentication session ID information, and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

As a result, if a result of the authentication shows a fact that a user of the client terminal 2 is not legitimate, the authentication processing section 56 determines that the request for authentication ticket from the client terminal 2 is not legitimate. For example, when the authentication session ID information from the client terminal 2 has expired, the result of authentication shows that a user of the client terminal 2 is not legitimate.

The control section 50 subsequently transmits authentication error information showing authentication error to the client terminal 2 via the communication control section 52 and the network interface 53 because the authentication processing section 56 determines that a user of the client terminal 2 is not legitimate.

Whereas if the result of the authentication shows a fact that a user of the client terminal 2 is legitimate, the authentication processing section 56 determines that the request for authentication ticket from the client terminal 2 is legitimate. For example, when the authentication session ID information from the client terminal 2 has not expired, the result of the authentication shows a fact that a user of the client terminal 2 is legitimate.

In a case in which the result of the authentication from the authentication processing section 56 shows a fact that a user of the client terminal 2 is legitimate, the control section 50 proceeds to step SP18 as described below.

At step SP14, the control section 23 of the client terminal 2 receives the authentication error information from the portal server 3 via the network interface 33 and the communication control section 32. The control section 23 of the client terminal 2 subsequently reads the user ID information, the password information and the like from the authentication information storage section 38, and then transmits the user ID information, the password information and the like to the portal server 3 via the communication control section 32 and the network interface 33.

At step SP15, the control section 50 of the portal server 3 receives the user ID information, the password information and the like from the client terminal 2 via the network interface 53 and the communication control section 52, and then supplies the user ID information, the password information and the like to the authentication processing section 56.

Therefore, the authentication processing section 56 under the control of the control section 50 performs a user authentication process. In the user authentication process, the authentication processing section 56 checks whether or not the user ID information, the password information and the like from the client terminal 2 exists in the customer information registered in the customer database section 54.

As a result, if a result of the authentication shows that a user of the client terminal 2 is legitimate, the authentication processing section 56 under the control of the control section 50 issues authentication session ID information (portal authentication result information) for the communication connection currently maintained between the client terminal 2 and the portal server 3, and the like. The authentication processing section 56 then temporarily stores the authentication session ID information and the like issued to the client terminal 2 in the authentication information storage section 57.

The control section 50 subsequently transmits the authentication session ID information and the like, which were issued to the client terminal 2 by the authentication processing section 56, to the client terminal 2 via the communication control section 52 and the network interface 53.

At step SP16, the control section 23 of the client terminal 2 receives the authentication session ID information and the like from the portal server 3 via the network interface 33 and the communication control section 32, and then temporarily stores the authentication session ID information and the like in the authentication information storage section 38 through the authentication processing section 37.

The control section 23 then regenerates an authentication ticket issuance request signal which requests an issue of an authentication ticket. The control section 23 subsequently transmits the authentication ticket issuance request signal, the shop code, which was temporarily stored in the authentication information storage section 38, the authentication session ID information, which was temporarily stored at that time, and the like, to the portal server 3 via the communication control section 32 and the network interface 33.

In this embodiment, the client terminal 2 temporarily stores the shop code in the authentication information storage section 38. However, this invention is not limited to this. The client terminal 2 may interchange again the shop code with the portal server 3 while performing the processes of steps SP12 through SP16. This allows the client terminal 2 to transmit the shop code to the portal server 3 at step SP16 without temporarily storing it in the authentication information storage section 38.

At step SP17, the control section 50 of the portal server 3 receives the authentication ticket issuance request signal, the shop code, the authentication session ID information and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

If a result of the authentication shows a fact that a user of the client terminal 2 is legitimate, the authentication processing section 56 determines that the request for authentication tickets from the client terminal 2 is legitimate. For example, in a case in which the authentication session ID information and the like from the client terminal 2 have not expired yet, the authentication result shows a fact that a user of the client terminal 2 is legitimate.

Then, the control section 50 proceeds to step SP18, as a user of the client terminal 2 is authenticated as a legitimate user by the authentication processing section 56.

At step SP18, the authentication processing section 56 under the control of the control section 50 issues an authentication ticket (i.e. the portal authentication result information) and the like based on the shop code and the authentication ticket issuance request signal received from the client terminal 2 by the process of step SP17 described above. The authentication ticket allows the client terminal 2 to access the music data delivery server SV1 corresponding to the shop code.

The authentication processing section 56 under the control of the control section 50 temporarily stores the issued authentication ticket and the like in the authentication information storage section 57, and then extends the period of validity of the authentication session ID information and the like issued to the client terminal 2.

The control section 50 then transmits the authentication ticket, the authentication session ID information having its period of validity extended by the authentication processing section 56, and the like to the client terminal 2 via the communication control section 52 and the network interface 53.

At step SP19, the control section 23 of the client terminal 2 receives the authentication ticket, the authentication session ID information having its period of validity extended, and the like from the portal server 3 via the network interface 33 and the communication control section 32, and then supplies the authentication session ID information to the authentication processing section 37.

The control section 23 transmits the authentication ticket which was received from the portal server 3, an authentication request signal, and the like to the music data delivery server SV1 via the communication control section 32 and the network interface 33.

At this time, the authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored at above-noted step SP16 are updated to those having their period of validity extended.

At step SP20, the control section 70 of the music data delivery server SV1 receives the authentication request signal, the authentication ticket and the like from the client terminal 2 via the network interface 73 and the communication control section 72.

The control section 70 then transmits the authentication ticket, which was received from the client terminal 2, an authentication ticket confirmation request signal, which requests a confirmation of the authentication ticket, and the like to the portal server 3 via the communication control section 72 and the network interface 73.

At step SP21, the control section 50 of the portal server 3 receives the authentication ticket confirmation request signal, the authentication ticket, and the like from the music data delivery server SV1 via the network interface 53 and the communication control section 52. The control section 50 of the portal server 3 then supplies the authentication ticket confirmation request signal, the authentication ticket, and the like to the authentication processing section 56.

In response to the authentication ticket confirmation request signal, the authentication processing section 56 under the control of the control section 50 performs a confirmation process to confirm the authentication ticket received from the music data delivery server SV1. In the confirmation process, the authentication processing section 56 compares the authentication ticket and the like from the music data delivery server SV1 with those temporarily stored in the authentication information storage section 57.

If a result of the confirmation by the authentication processing section 56 shows a fact that the authentication ticket and the like from the music data delivery server SV1 are legitimate, the control section 50 transmits confirmation result information to the music data delivery server SV1 via the communication control section 52 and the network interface 53. In this case, the confirmation result information shows that the authentication ticket and the like are legitimate.

At step SP22, the control section 70 of the music data delivery server SV1 receives the confirmation result information from the portal server 3 via the network interface 73 and the communication control section 72, and then supplies the confirmation result information to the authentication processing section 75.

In response to the confirmation result information, the authentication processing section 75 under the control of the control section 70 issues the service session ID information (i.e. the server authentication result information) for the communication connection currently maintained between the client terminal 2 and the music data delivery server SV1, and the like. The authentication processing section 75 then temporarily stores the issued service session ID information and the like in the authentication information storage section 77.

The control section 70 transmits the service session ID information and the like issued to the client terminal 2 by the authentication processing section 75 to the client terminal 2 via the communication control section 72 and the network interface 73.

At step SP23, the control section 23 of the client terminal 2 receives the service session ID information and the like from the music data delivery server SV1 via the network interface 33 and the communication control section 32, and then temporarily stores the service session ID information and the like in the authentication information storage section 38 using the authentication processing section 37.

Therefore, the control section 23 transmits a page information acquisition request signal, which requests the music-data-distribution page information, the service session ID information and the like to the music data delivery server SV1 via the communication control section 32 and the network interface 33. The service session ID information was received from the music data delivery server SV1 and then temporarily stored in the authentication information storage section 38.

At step SP24, the control section 70 of the music data delivery server SV1 receives the page information acquisition request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77. The information temporarily stored in the authentication information storage section 77 was issued to the client terminal 2 by the process of step SP22 described above.

If a result of the authentication shows a fact that a user of the client terminal 2 is legitimate, the authentication processing section 75 determines that the request for music-data-distribution page information from the client terminal 2 is legitimate. For example, when the service session ID information and the like from the client terminal 2 have not expired yet, the result of the authentication shows the fact that a user of the client terminal 2 is legitimate.

Then, the control section 70 proceeds to step SP25, as a user of the client terminal 2 is authenticated as a legitimate user by the authentication processing section 75.

At step SP25, the control section 70 reads out the music-data-distribution page information, which is requested by a user, from the page information storage section 76. The control section 70 also extends the period of validity of the service session ID information and the like issued to the client terminal 2 through the authentication processing section 75.

The control section 70 subsequently transmits the music-data-distribution page information read from the page information storage section 76, the service session ID information having its period of validity extended by the authentication processing section 75, and the like to the client terminal 2 via the communication control section 72 and the network interface 73.

At step SP26, the control section 23 of the client terminal 2 receives the music-data-distribution page information, the service session ID information having its period of validity extended, and the like from the music data delivery server SV1 via the network interface 33 and the communication control section 32. The control section 23 of the client terminal 2 then supplies the music-data-distribution page information to the page information generation section 36. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their periods of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored by the process of above-noted step SP23 are updated to those having their period of validity extended.

The page information generation section 36 generates video data based on the music-data-distribution page information, and then supplies the video data to the display control section 24.

The display control section 24 performs digital-to-analog conversion to the video data supplied from the page information generation section 36 to generate an analog video signal. The display control section 24 then supplies the analog video signal to the display section 25. The display section 25 displays an image of the music-data-distribution page based on the analog video signal.

(1-7-3) Music Related Service Provision Processes

After completing the user authentication process (FIG. 9) between the client terminal 2 and the music data delivery server SV1, the client terminal 2 and the product sales server SV2, or the client terminal 2 and the radio broadcast information delivery server SV3, the music related service provision process is executed. With reference to FIG. 10 through FIG. 13, the music related service provision process will be described in the following situation: the client terminal 2 receives a music data distribution service through the music-data-distribution page information obtained during the user authentication process from the music data delivery server SV1; the client terminal 2 receives a sales service through the package-media-sales page information obtained during the user authentication process from the product sales server SV2; and the client terminal 2 receives a radio broadcast information distribution service through the on-air-list-information-distribution page information obtained during the user authentication process from the radio broadcast information delivery server SV3.

(1-7-3-1) Music Data Distribution Service Provision Process

Figure 10:
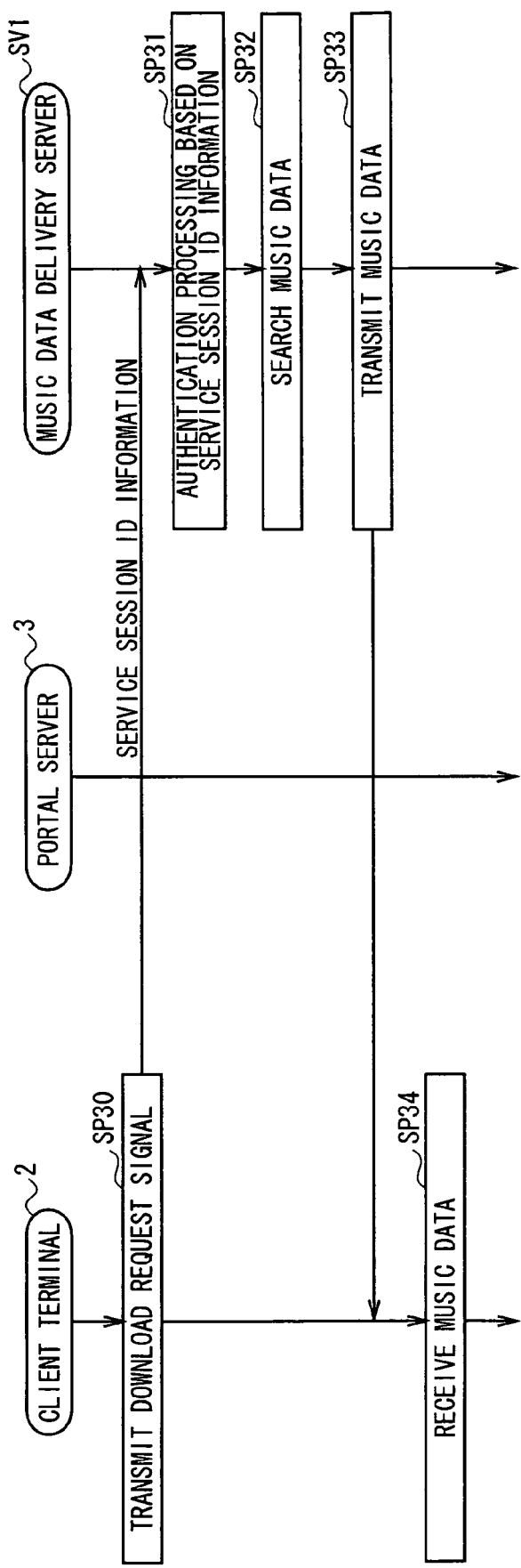
FIG. 10 is a sequence chart showing a music data distribution service provision process.

Referring to FIG. 10, the music data distribution service provision process will be described. In the music data distribution service provision process, the client terminal 2 receives the music data distribution service from the music data delivery server SV1.

At step SP30, if a control command which selects part of the music-data-distribution page displayed as images on the display section 25 is input through the input processing section 21, the control section 23 of the client terminal 2 generates a download request signal, which requests a download of music data a user wants to download.

The control section 23 then transmits the download request signal, the service session ID information, and the like to the music data delivery server SV1 via the communication control section 32 and the network interface 33. The service session ID information was issued by the music data delivery server SV1 and then temporarily stored in the authentication information storage section 38.

At step SP31, the control section 70 of the music data delivery server SV1 receives the download request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77.

If the authentication processing section 75 authenticates a user as a legitimate user, the control section 70 proceeds to step SP32. In this case, the user has requested a download of music data through the client terminal 2.

At step SP32, the retrieval section 79 performs a search process based on a retrieval key in the download request signal. In the search process, the retrieval section 79 searches a plurality of music data stored in the music data storage section 78 for the music data which corresponds to a retrieval condition indicated by the retrieval key and is the one the user wants to download.

When the retrieval section 79 has the music data found, the control section 70 extends the period of validity of the service session ID information and the like issued to the client terminal 2 using the authentication processing section 75, and then proceeds to step SP33.

At step SP33, the control section 70 reads the music data, which the user wants to download and is found by the retrieval section 79, from the music data storage section 78. The control section 70 then transmits the music data, the service session ID information having its period of validity extended by the authentication processing section 75, and the like to the client terminal 2 via the communication control section 72 and the network interface 73.

At step SP34, the control section 23 of the client terminal 2 receives the music data, which the user wants to download, the service session ID information having its period of validity extended, and the like from the music data delivery server SV1 via the network interface 33 and the communication control section 32. The control section 23 of the client terminal 2 then stores the music data in the storage medium 29. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their period of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

As described above, the client terminal 2 is capable of downloading the music data, which a user wants to acquire, using the music data distribution service provided by the music data delivery server SV1.

(1-7-3-2) Product Sales Service Provision Process

Figure 11:
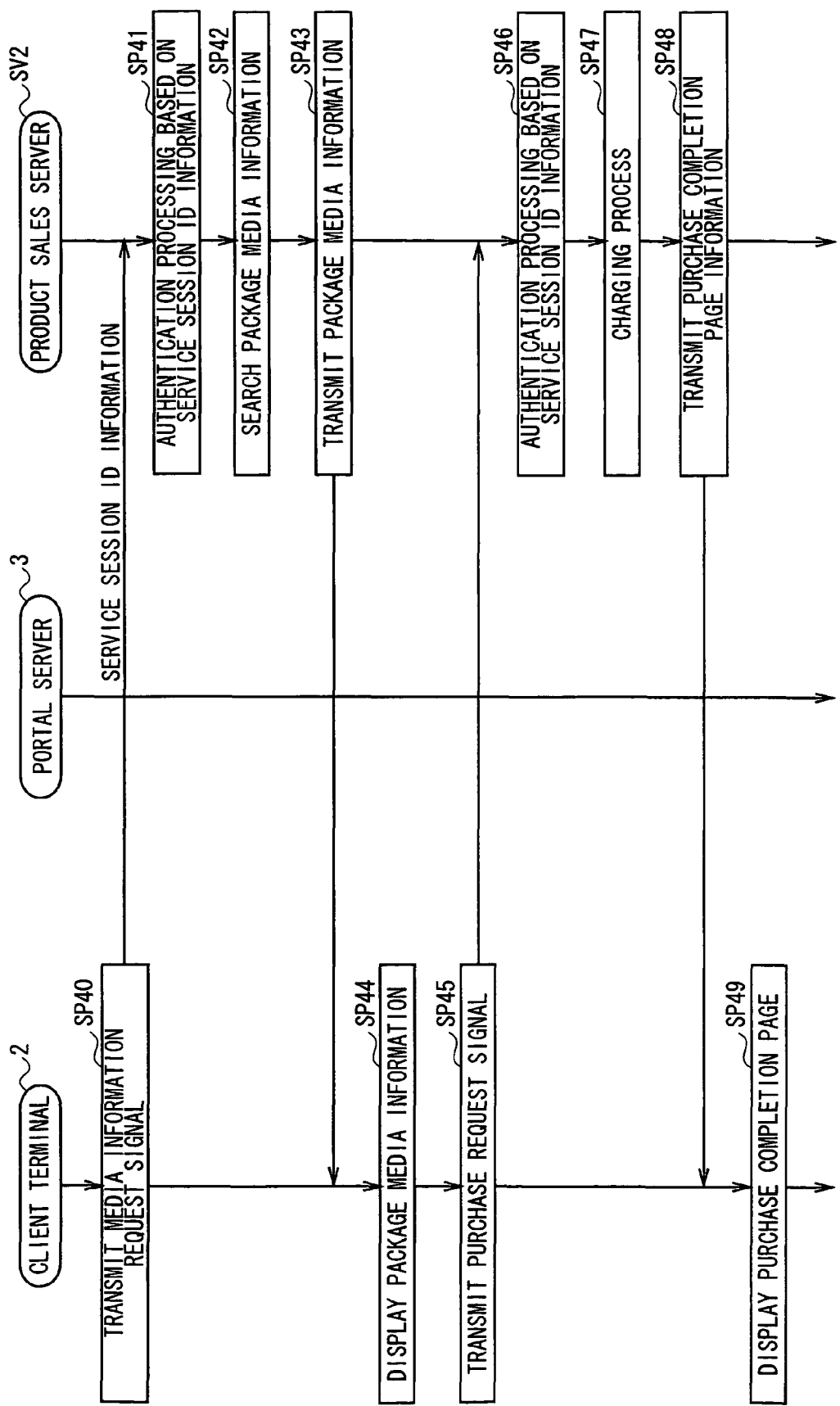
FIG. 11 is a sequence chart showing a product sales service provision process.

Referring to FIG. 11, the product sales service provision process will be described. In the product sales service provision process, the client terminal 2 receives a product sales service from the product sales server SV2.

At step SP40, if a control command which selects part of the package-media-sales page information displayed as an image on the display section 25 is input through the input processing section 21, the control section 23 of the client terminal 2 generates a media information request signal. The media information request signal requests package media information relating to a specific package media corresponding to the control command.

The control section 23 then transmits the media information request signal, the service session ID information and the like to the product sales server SV2 via the communication control section 32 and the network interface 33. The service session ID information was issued by the product sales server SV2 and then temporarily stored in the authentication information storage section 38.

At step SP41, the control section 90 of the product sales server SV2 receives the media information request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

If the authentication processing section 95 authenticates a user as a legitimate user, the control section 90 proceeds to step SP42. In this case, the user has requested the package media information relating to the package media using the client terminal 2.

At step SP42, the retrieval section 99 performs, based on a retrieval key in the media information request signal, a search process. In the search process, the retrieval section 99 searches a plurality of pieces of package media information stored in the package media information storage section 98 for a certain piece of package media information corresponding to a retrieval condition indicated by the retrieval key.

When the retrieval section 99 has the piece of package media information found, the control section 90 extends the period of validity of the service session ID information and the like issued to the client terminal 2 through the authentication processing section 95, and then proceeds to step SP43.

At step SP43, the control section 90 reads out the package media information, which was found by the retrieval section 99, from the package media information storage section 98. The control section 90 then transmits the package media information, the service session ID information having its period of validity extended by the authentication processing section 95, and the like to the client terminal 2 via the communication control section 92 and the network interface 93.

At step SP44, the control section 23 of the client terminal 2 receives the package media information, the service session ID information having its period of validity extended, and the like from the product sales server SV2 via the network interface 33 and the communication control section 32, and then supplies the package media information to the page information generation section 36. The control section 23 of the client terminal 2 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the package media information supplied from the control section 23, video data. The page information generation section 36 then transforms the video data into an analog video signal through the display control section 24, and then supplies the analog video signal to the display section 25.

After the display section 25 starts to display an image of the package media information based on the analog video signal, the control section 23 proceeds to step SP45.

At step SP45, if a control command that requests a purchase of the package media corresponding to the package media information displayed as an image on the display section 25 is input through the input processing section 21, the control section 23 generates, in response to the control command, a purchase request signal which requests the purchase of the package media.

The control section 23 then transmits the purchase request signal, the service session ID information having its period of validity extended, and the like to the product sales server SV2 via the communication control section 32 and the network interface 33. The service session ID information was received from the product sales server SV2 and then temporarily stored in the authentication information storage section 38.

At step SP46, the control section 90 of the product sales server SV2 receives the purchase request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

As a result, if the authentication processing section 95 authenticates the user, who requests the purchase of the package media through the client terminal 2, as a legitimate user, the control section 90 proceeds to step SP47.

At step SP47, the control section 90 performs a product sales process. In the product sales process, the control section 90 executes a procedure to deliver the requested package media to the user of the client terminal 2. The control section 90 also transmits fee-charging information to the fee-charging server SV5 via the communication control section 92 and the network interface 93. The fee-charging information is used to charge the user a fee for the purchased package media. Therefore, the fee-charging server SV5 performs a fee-charging process to charge the user a fee for the purchased package media.

The control section 90 also extends the period of validity of service session ID information and the like issued to the client terminal 2 using the authentication processing section 95.

At step SP48, after completing the fee-charging process, the control section 90 transmits purchase completion page information showing a completion of the purchase of package media, the service session ID information having its period of validity extended by the authentication processing section 95, and the like to the client terminal 2 via the communication control section 92 and the network interface 93.

At step SP49, the control section 23 of the client terminal 2 receives the purchase completion page information, the service session ID information having its period of validity extended, and the like from the product sales server SV2 via the network interface 33 and the communication control section 32, and then supplies the purchase completion page information to the page information generation section 36. The control section 23 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the purchase completion page information supplied from the control section 23, video data. The page information generation section 36 subsequently transforms the video data into an analog video signal through the display control section 24, and then supplies the analog video signal to the display section 25.

Therefore, the control section 23 can display, based on the analog video signal, an image of the purchase completion page on the display section 25.

As described above, the client terminal 2 allows a user to purchase the package media he/she wants using the sales services provided by the product sales server SV2.

(1-7-3-3) On-Air-List Information Distribution Service Provision Process

Figure 12:
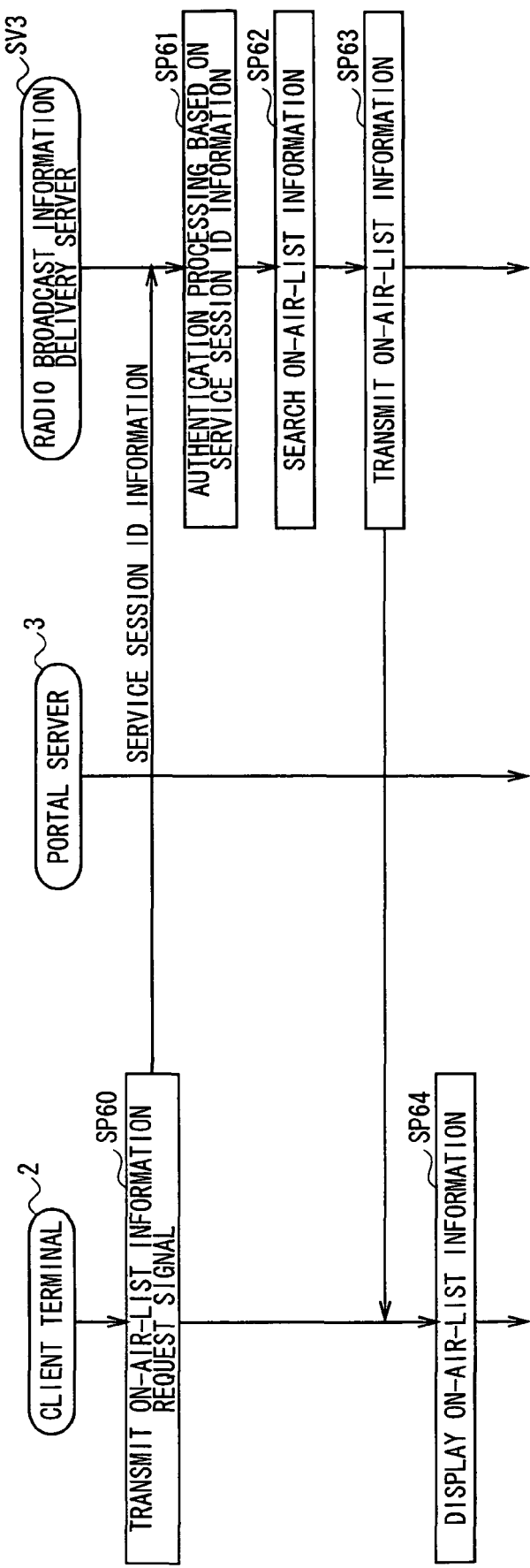
FIG. 12 is a sequence chart showing a radio broadcast information (on-air list information) distribution service provision process (1).

With reference to FIG. 12, a radio broadcast information distribution service provision process will be described. In the radio broadcast information distribution service provision process, the client terminal 2 receives especially an on-air-list information distribution service as the radio broadcast information distribution service from the radio broadcast information delivery server SV3.

At step SP60, a user input a retrieval key in an input box disposed on the on-air-list-information-distribution page displayed as an image on the display section 25. The retrieval key, which is used to retrieve the on-air-list information, is a character string corresponding to the on-air-list information the user wants to obtain. At this time, a control command corresponding to the character string is input through the input processing section 21. The control section 23 of the client terminal 2 generates, based on the control command input, an on-air-list information request signal which requests a download of the on-air-list information the user wants to obtain.

The control section 23 then transmits the on-air-list information request signal, the service session ID information temporarily stored in the authentication information storage section 38, and the like to the radio broadcast information delivery server SV3 via the communication control section 32 and the network interface 33. The service session ID information was issued by the radio broadcast information delivery server SV3.

At step SP61, the control section 110 of the radio broadcast information delivery server SV3 receives the on-air-list information request signal, the service session ID information and the like from the client terminal 2 via the network interface 113 and the communication control section 112, and then supplies the service session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120.

As a result, if the authentication processing section 115 authenticates the user, who requests the on-air-list information using the client terminal 2, as a legitimate user, the control section 110 proceeds to step SP62.

At step SP62, the retrieval section 118 performs, based on the retrieval key in the on-air-list information request signal, a search process in which the retrieval section 118 searches the whole on-air-list information in the on-air-list information storage section 117 for a certain part of the on-air-list information which meets a retrieval condition indicated by the retrieval key to obtain the desired on-air-list information.

When the retrieval section 118 has the on-air-list information found, the control section 110 extends the period of validity of the service session ID information and the like issued to the client terminal 2 through the authentication processing section 115. The control section 110 then proceeds to step SP63.

At step SP63, the control section 110 reads out the on-air-list information, which was found by the retrieval section 118, from the on-air-list information storage section 117. The control section 110 then transmits the on-air-list information, the service session ID information having its period of validity extended by the authentication processing section 115, and the like to the client terminal 2 via the communication control section 112 and the network interface 113.

At step SP64, the control section 23 of the client terminal 2 receives the on-air-list information, the service session ID information having its period of validity extended, and the like from the radio broadcast information delivery server SV3 via the network interface 33 and the communication control section 32, and then supplies the on-air-list information to the page information generation section 36. The control section 23 of the client terminal 2 also supplies the service session ID information and the like received from the radio broadcast information delivery server SV3 to the authentication processing section 37.

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the on-air-list information supplied from the control section 23, video data. The page information generation section 36 then transforms the video data into an analog video signal through the display control section 24, and then supplies the analog video signal to the display section 25. The display section 25 therefore displays, based on the analog video signal, an image or the on-air-list information.

As described above, the client terminal 2 allows a user to obtain the desired on-air-list information using the radio broadcast information distribution service provided by the radio broadcast information delivery server SV3.

(1-7-3-4) Now-On-Air Information Distribution Service Provision Process

Figure 13:
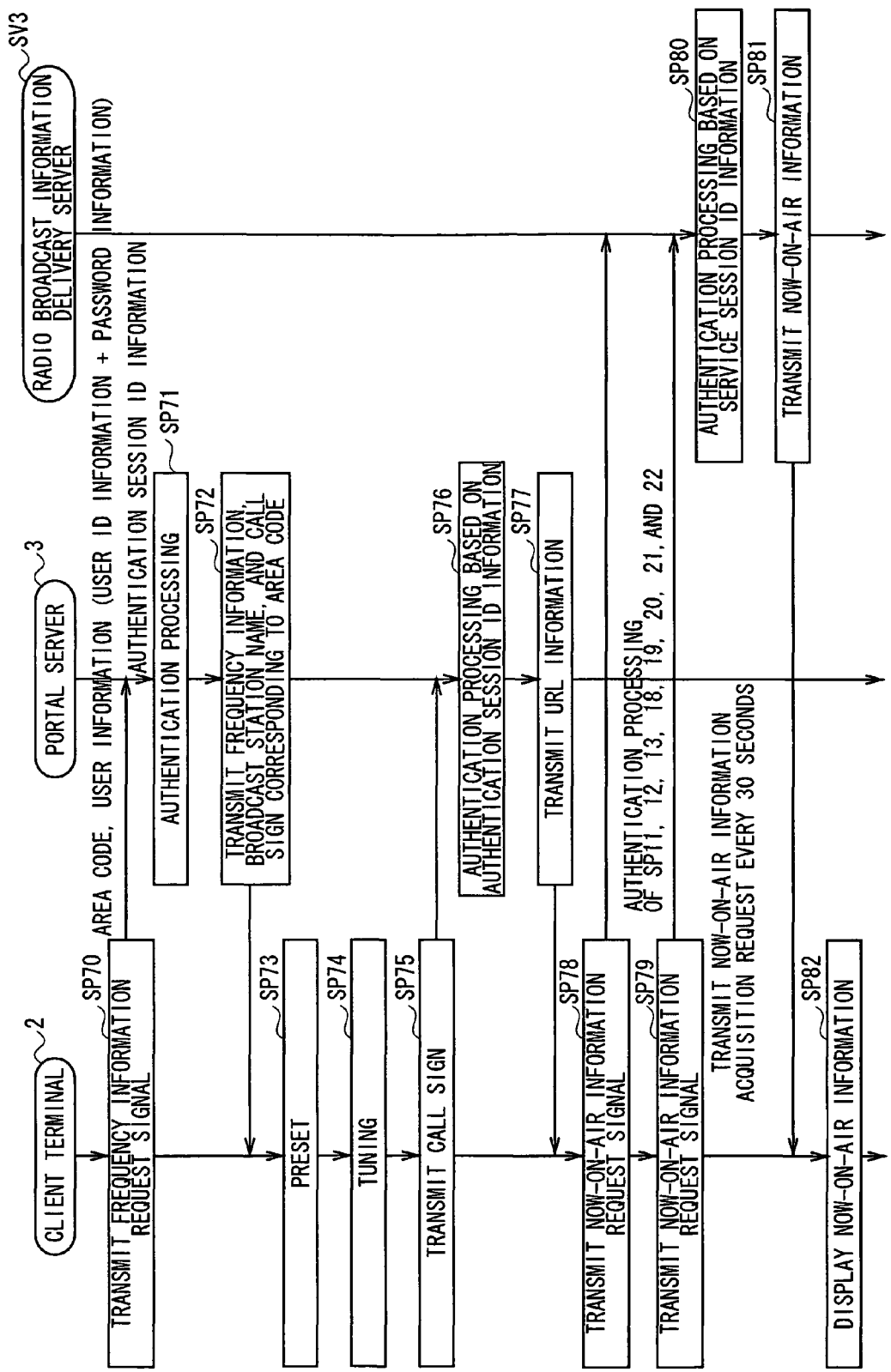
FIG. 13 is a sequence chart showing a radio broadcast information (now-on-air information) distribution service provision process (2).

Referring to FIG. 13, the radio broadcast information distribution service provision process will be described. In the radio broadcast information distribution service provision process, the client terminal 2 receives especially the now-on-air information distribution service as the radio broadcast information distribution service from the radio broadcast information delivery server SV3.

There is a plurality of radio broadcast information delivery servers SV3 providing the now-on-air information, each of which corresponds to a different radio station (call sign).

At initial state, the client terminal 2 may not store the URL information of those radio broadcast information delivery servers SV3 corresponding to radio stations.

With the radio broadcast information distribution service provision process described below, the following describes a situation in which the portal server 3 manages the URL information of each radio broadcast information delivery server SV3. Specifically, in this case, the portal server 3 manages a plurality of pieces of URL information, each of which corresponds to a call sign of a radio station.

In addition, with the radio broadcast information distribution service provision process described below, the client terminal 2 does not have the authentication session ID information and the like temporarily stored in the authentication information storage section 38, when requesting frequency information from the portal server 3 to automatically preset broadcast frequencies of radio stations. The frequency information includes the broadcast frequencies. In this case, first of all the client terminal 2 transmits the user ID information, the password information, and the like to the portal server 3.

At step SP70, if an operation command which requests an auto-preset of broadcast frequencies of radio stations is input through the input processing section 21, the control section 23 of the client terminal 2 transmits a frequency information request signal, an area code input by a user, the user ID information and password information stored in the authentication information storage section 38, and the like to the portal server 3 via the communication control section 32 and the network interface 33. The frequency information request signal requests the frequency information about broadcast frequencies of radio stations from which the client terminal 2 can receive their broadcasts.

At step SP71, the control section 50 of the portal server 3 receives the frequency information request signal, the area code, the user ID information, the password information and the like from the client terminal 2 via the network interface 53 and the communication control section 52, and then supplies the user ID information and the password information received from the client terminal 2 to the authentication processing section 56.

The authentication processing section 56 under the control of the control section 50 performs a user authentication process. In the user authentication process, the authentication processing section 56 compares the user ID information, the password information and the like received from the client terminal 2 with the customer information registered in the customer database section 54.

As a result, if the authentication processing section 56 authenticates a user of the client terminal 2 as a legitimate user, the authentication processing section 56 determines that the request for frequency information from the client terminal 2 is legitimate. Therefore, the authentication processing section 56 under the control of the control section 50 issues authentication session ID information and the like. The authentication session ID information identifies the communication connection currently maintained between the client terminal 2 and the portal server 3. The authentication processing section 56 then temporarily stores the authentication session ID information and the like in the authentication information storage section 57.

The control section 50 subsequently proceeds to step SP72, as the authentication processing section 56 authenticates the user as a legitimate user.

At step SP72, the control section 50 retrieves, based on the area code from the client terminal 2, the frequency information, radio station names and call signs corresponding to the area code from a list which is stored in the frequency information storage section 58 and includes a plurality of pieces of frequency information, radio station names and call signs. The control section 50 then reads out the retrieved frequency information, radio station names and call signs in list format.

The control section 50 subsequently transmits the frequency information, radio station names and call signs read from the frequency information storage section 58 in list format, along with the authentication session ID information and the like, to the client terminal 2 via the communication control section 52 and the network interface 53. The authentication session ID information was issued to the client terminal 2 by the authentication processing section 56 at above-noted step SP71.

At step SP73, the control section 23 of the client terminal 2 receives the list, which includes the frequency information, the radio station names and the call signs, from the portal server 3 via the network interface 33 and the communication control section 32. The control section 23 of the client terminal 2 also receives the authentication session ID information and the like from the portal server 3 via the network interface 33 and the communication control section 32. The control section 23 of the client terminal 2 then supplies the authentication session ID information and the like received from the portal server 3 to the authentication processing section 37. The control section 23 of the client terminal 2 also supplies the list, which includes the frequency information, the radio station names and the call signs, to the display control section 24.

The authentication processing section 37 under the control of the control section 23 temporarily stores the authentication session ID information and the like received from the portal server 3 in the authentication information storage section 38.

The display control section 24 supplies the list, which includes the frequency information, the radio station names and the call signs, to the display section 25. The display section 25 therefore displays the list.

At this time, based a selection command input through the input processing section 21, the control section 23 stores the selected frequency information, radio station name and call sign in the storage medium 29 as a preset, and then proceeds to step SP74.

At step SP74, in response to a tuning control command input through the input processing section 21, the control section 23 controls, based on the tuning control command input, the tuner section 31 to extract, from radio waves, a radio broadcast signal of a radio broadcast transmitted in a broadcast frequency corresponding to the tuning control command.

The tuner section 31 therefore extracts the radio broadcast signal in the broadcast frequency from the radio waves received by the broadcast signal reception section 30. The tuner section 31 then performs a prescribed reception process such as decoding to generate audio data, and then supplies the audio data to the audio control section 26.

The audio control section 26 therefore transforms the audio data supplied from the tuner section 31 into an analog audio signal, and supplies the analog audio signal to the speaker 27 which then outputs audio of the selected radio program.

At step SP75, the radio broadcasting display control section 39 under the control of the control section 23 reads a call sign from the storage medium 29. In this case, the call sign stored in the storage medium 29 has been associated with the frequency information showing the broadcast frequency corresponding to the above-noted tuning control command. The radio broadcasting display control section 39 then transmits the call sign, the authentication session ID information temporarily stored in the authentication information storage section 38, and the like to the portal server 3 via the communication control section 32 and the network interface 33.

At step SP76, the control section 50 of the portal server 3 receives the call sign, the authentication session ID information and the like from the client terminal 2 via the network interface 53 and the communication control section 52, and supplies the authentication session ID information and the like to the authentication processing section 56.

The authentication processing section 56 under the control of the control section 50 performs a user authentication process. In the user authentication process, the authentication processing section 56 compares the authentication session ID information and the like received from the client terminal 2 with those temporarily stored in the authentication information storage section 57.

As a result, if the authentication processing section 56 authenticates the user, who transmits the call sign using the client terminal 2, as a legitimate user, the control section 50 proceeds to step SP77. In this case, since the authentication session ID information and the like received from the client terminal 2 have not expired yet, the authentication processing section 56 authenticates the user as a legitimate user.

At step SP77, the control section 50 performs, based on the call sign from the client terminal 2, a retrieving process in which the control section 50 retrieves a piece of URL information corresponding to the call sign from among a plurality of pieces of ULR information stored in the URL storage section 59.

The control section 50 also extends the period of validity of the authentication session ID information and the like issued to the client terminal 2 using the authentication processing section 56.

The control section 50 subsequently reads the retrieved URL information from the URL storage section 59, and then transmits the URL information, the authentication session ID information having its period of validity extended by the authentication processing section 56, and the like to the client terminal 2 via the communication processing section 52 and the network interface 53.

At step SP78, the control section 23 of the client terminal 2 receives the URL information, the authentication session ID information having its period of validity extended, and the like from the portal server 3 via the network interface 33 and the communication control section 32, and then supplies the authentication session ID information and the like to the authentication processing section 37. The control section 23 of the client terminal 2 also supplies the URL information to the radio broadcasting display control section 39.

The authentication processing section 37 under the control of the control section 23 temporarily stores the authentication session ID information and the like in the authentication information storage section 38. The authentication session ID information and the like, which have their period of validity extended, were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored are updated to those having their period of validity extended.

The radio broadcasting display control section 39 under the control of the control section 23 associates the URL information supplied from the control section 23 with the call sign stored in the storage medium 29, and then temporarily stores them in the storage medium 29 or the like.

Then, the radio broadcasting display control section 39 under the control of the control section 23 transmits a now-on-air information request signal which requests now-on-air information, the service session ID information temporarily stored in the authentication information storage section 38, and the like to the radio broadcast information delivery server SV3 via the communication control section 32 and the network interface 33. In this case, the radio broadcasting display control section 39 transmits, based on the URL information temporarily stored in the storage medium 29 or the like, the now-on-air information request signal. The service session ID information stored in the authentication information storage section 38 was received from the radio broadcast information delivery server SV3.

By the way, in the radio broadcast information distribution service provision process, the process of step SP78 corresponds to the process of step SP10 in FIG. 9. In the process of step SP78, the now-on-air information request signal, the service session ID information and the like are transmitted from the client terminal 2 to the radio broadcast information delivery server SV3.

Accordingly, in the radio broadcast information distribution service provision process, after the process of step SP78, the client terminal 2, the radio broadcast information delivery server SV3 and the portal server 3 performs the same user authentication process as the one made up of step SP11 through SP13 and step SP18 through SP22, and then proceed to step SP79. By the way, the processes of step SP11 through SP13 and step SP18 through SP22 are illustrated in FIG. 9.

At step SP79, the radio broadcasting display control section 39 of the client terminal 2 under the control of the control section 23 re-transmits, based on the URL information temporarily stored in the storage medium 29 or the like, the now-on-air information request signal, the service session ID information temporarily stored in the authentication information storage section 38, and the like to the radio broadcast information delivery server SV3 via the communication control section 32 and the network interface 33. The service session ID information, which was temporarily stored in the authentication information storage section 38, was received from the radio broadcast information delivery server SV3.

At step SP80, the control section 110 of the radio broadcast information delivery server SV3 receives the now-on-air information request signal, the service session ID information and the like from the client terminal 2 via the network interface 113 and the communication control section 112, and then supplies the received authentication session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120.

As a result, if the authentication processing section 115 authenticates the user of the client terminal 2 as a legitimate user, the authentication processing section 115 determines that the request for now-on-air information from the client terminal 2 is legitimate.

After the authentication processing section 115 authenticates the user of the client terminal 2 as a legitimate user, the control section 110 extends the period of validity of the service session ID information and the like issued to the client terminal 2 through the authentication processing section 115, and then proceeds to step SP81.

At step SP81, the control section 110 reads now-on-air information from the now-on-air information storage section 119, and then transmits the now-on-air information, the service session ID information having its period of validity extended by the authentication processing section 115, and the like to the client terminal 2 via the communication control section 112 and the network interface 113.

At step SP82, the control section 23 of the client terminal 2 receives the now-on-air information, the service session ID information having its period of validity extended and the like from the radio broadcast information delivery server SV3 via the network interface 33 and the communication control section 32, and then supplies the service session ID information and the like to the authentication processing section 37. The control section 23 of the client terminal 2 also supplies the now-on-air information to the radio broadcasting display control section 39.

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The radio broadcasting display control section 39 supplies the now-on-air information supplied from the control section 23 to the display section 25 via the display control section 24. The display section 25 therefore displays the now-on-air information relating to the radio program currently received.

After that, in the radio broadcast information distribution service provision process, the client terminal 2 repeats a request process of now-on-air information (step SP79) at a certain interval of time. When receiving the request from the client terminal 2, the radio broadcast information delivery server SV3 sequentially performs the process of step SP80 and SP81.

In this manner, the client terminal 2 can update the now-on-air information displayed on the display section 25 every second. The now-on-air information includes the following items: a title of a radio program currently received by the client terminal 2; a start time of the radio program; an end time of the radio program; an artist name and title of music currently played in the radio program; and a start time of the broadcast of the music.

(1-8) Hardware Circuit Block Configuration of Client Terminal 2

(1-8-1) Circuit Configuration

The hardware configuration of the client terminal 2 will be described using hardware circuit blocks. In the hardware configuration of the client terminal 2 with the hardware circuit blocks, a part of capabilities of the client terminal 2 is a process performed by software modules as described below.

Figure 14:
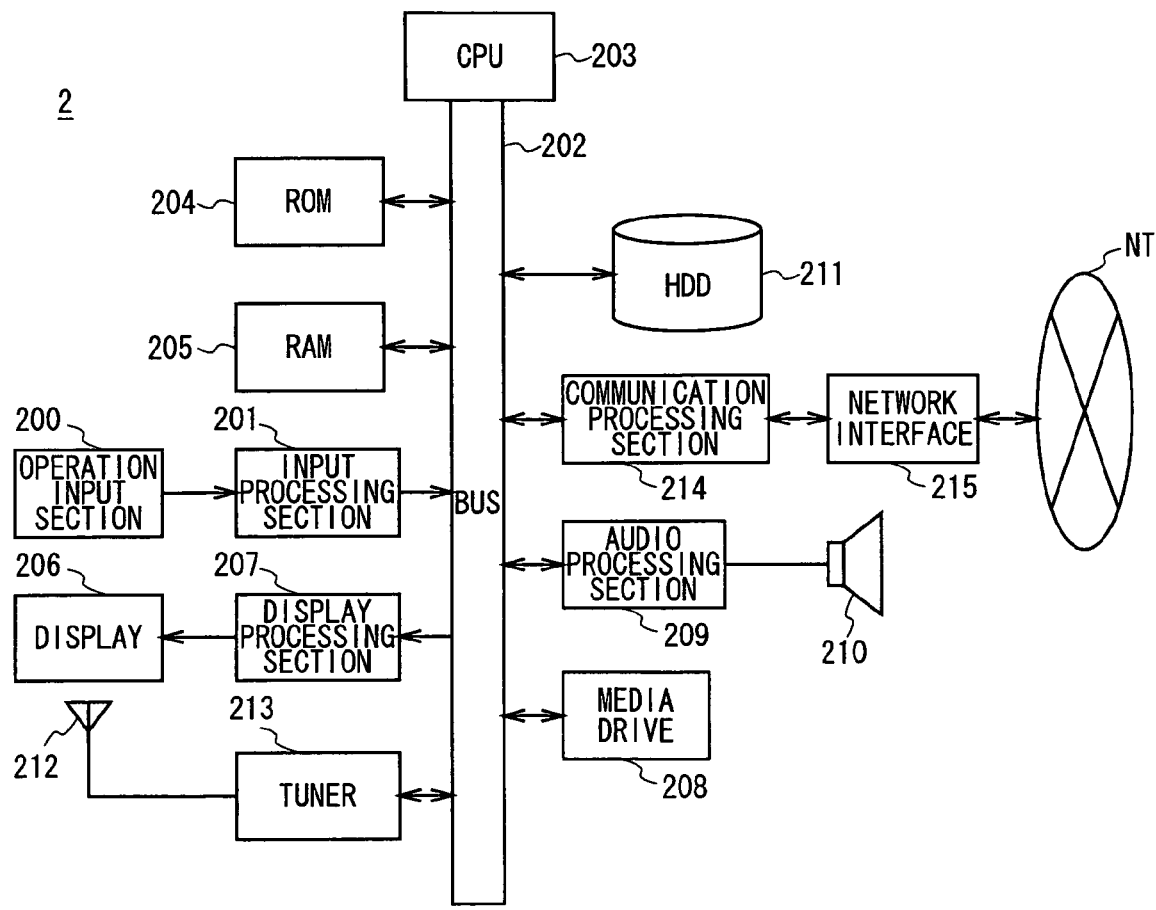
FIG. 14 is a block diagram showing the hardware configuration of a client terminal using hardware circuit blocks.

Referring to FIG. 14, the client terminal 2 has an operation input section 200 on its housing or a remote control (not shown). The operation input section 200 provides various operation buttons. When a user operates the operation input section 200, the operation input section 200 detects the operation and then supplies an operation input signal corresponding to the operation to an input processing section 201.

The input processing section 201 performs a prescribed process to the supplied operation input signal to transform the operation input signal into an operation command. The input processing section 201 then supplies the operation command via a bus 202 to a CPU (Central Processing Unit) 203.

A ROM (Read Only Memory) 204 previously has stored various programs, such as a basic program and an application program. The CPU 203 reads these programs from the ROM 204 via the bus 202, and loads these programs onto a RAM (Random Access Memory) 205. The CPU 203 takes overall control of the client terminal 2 based on the programs, and performs, in response to the operation command supplied from the input processing section 201, a prescribed computation process and various processes.

For example, a display 206 is a display device such as a liquid crystal display. The display 206 may be directly or externally disposed on the housing.

A result of process by the CPU 203 and various video data are supplied to the display 206 via a display processing section 207 as an analog video signal. The display 206 displays an image based on the analog video signal.

For example, CDs and "MEMORY STICK (Registered Trademark of Sony Corporation)" store content data. The MEMORY STICK includes a flash memory covered with an exterior case. A media drive 208, for example, reads the content data from the CD and the "MEMORY STICK (Registered Trademark of Sony Corporation)", and then plays back the content data. Alternatively, the media drive 208 records the content data, which is to be recorded, on the CD or the "MEMORY STICK (Registered Trademark of Sony Corporation)".

When the media drive 208 reads video data (content data) from the CDs or the "MEMORY STICK (Registered Trademark of Sony Corporation)", the media drive 208 supplies the video data to the display processing section 207 via the bus 202.

When the media drive 208 reads audio data (content data) from the CDs or "MEMORY STICK (Registered Trademark of Sony Corporation)", the media drive 208 supplies the audio data to an audio processing section 209.

The display processing section 207 performs digital-to-analog conversion to the video data, which was supplied via the bus 202, to generate an analog video signal. The display processing section 207 then supplies the analog video signal to the display 206. The display 206 displays an image based on the analog video signal.

The audio processing section 209 performs digital-to-analog conversion to the audio data, which was supplied via the bus 202, to generate an analog audio signal. The audio processing section 209 then supplies the analog audio signal to a 2-channel speaker 210 which therefore outputs sound on stereo based on the analog audio signal.

In addition, the CPU 203 is able to supply the content data read by the media drive 208 via the bus 202 to a hard disk drive 211. The hard disk drive 211 stores the content data as content files.

The CPU 203 manages the content data stored in the hard disk drive 211 using the directory configuration illustrated by FIG. 3.

Also, the CPU 203 is capable of reading the content files from the hard disk drive 211 as content data.

When the CPU 203 reads video data (content data) from the hard disk drive 211, the CPU 203 supplies the video data to the display processing section 207 via the bus 202.

When the CPU 203 reads audio data (content data) from the hard disk drive 211, the CPU 203 supplies the audio data to the audio processing section 209.

An antenna 212 receives radio broadcast waves from radio stations. The antenna 212 then supplies the radio broadcast waves to a tuner 213 equivalent to an AM/FM tuner.

For example, a user selects a certain radio station through the operation input section 200. The tuner 213 under the control of the CPU 203 extracts, from the radio broadcast waves received by the antenna 212, a radio broadcast signal of the broadcast frequency corresponding to the selected radio station. The tuner 213 then performs a prescribed reception process to the radio broadcast signal to generate audio data, and then supplies the audio data via the bus 202 to the audio processing section 209.

The audio processing section 209 transforms the audio data supplied from the tuner 213 into an analog audio signal, and then supplies the analog audio signal to the speaker 210 which therefore outputs sound of a radio program broadcast from a radio station. This allows a user to listen to sound of the radio program.

The CPU 203 also may supply the audio data obtained by the tuner 213 to the hard disk drive 211 to record them on the hard disk drive 211. In this manner, the CPU 203 is able to record sound of radio programs.

The CPU 203 connects with a network NT via a communication processing section 214 and a network interface 215. The CPU 203 therefore can access the portal server 3 and other servers SV1 through SV4 on the network NT, and interchange various data with the portal server 3 and other servers SV1 through SV4.

(1-8-2) Configuration of Program Modules

Figure 15:
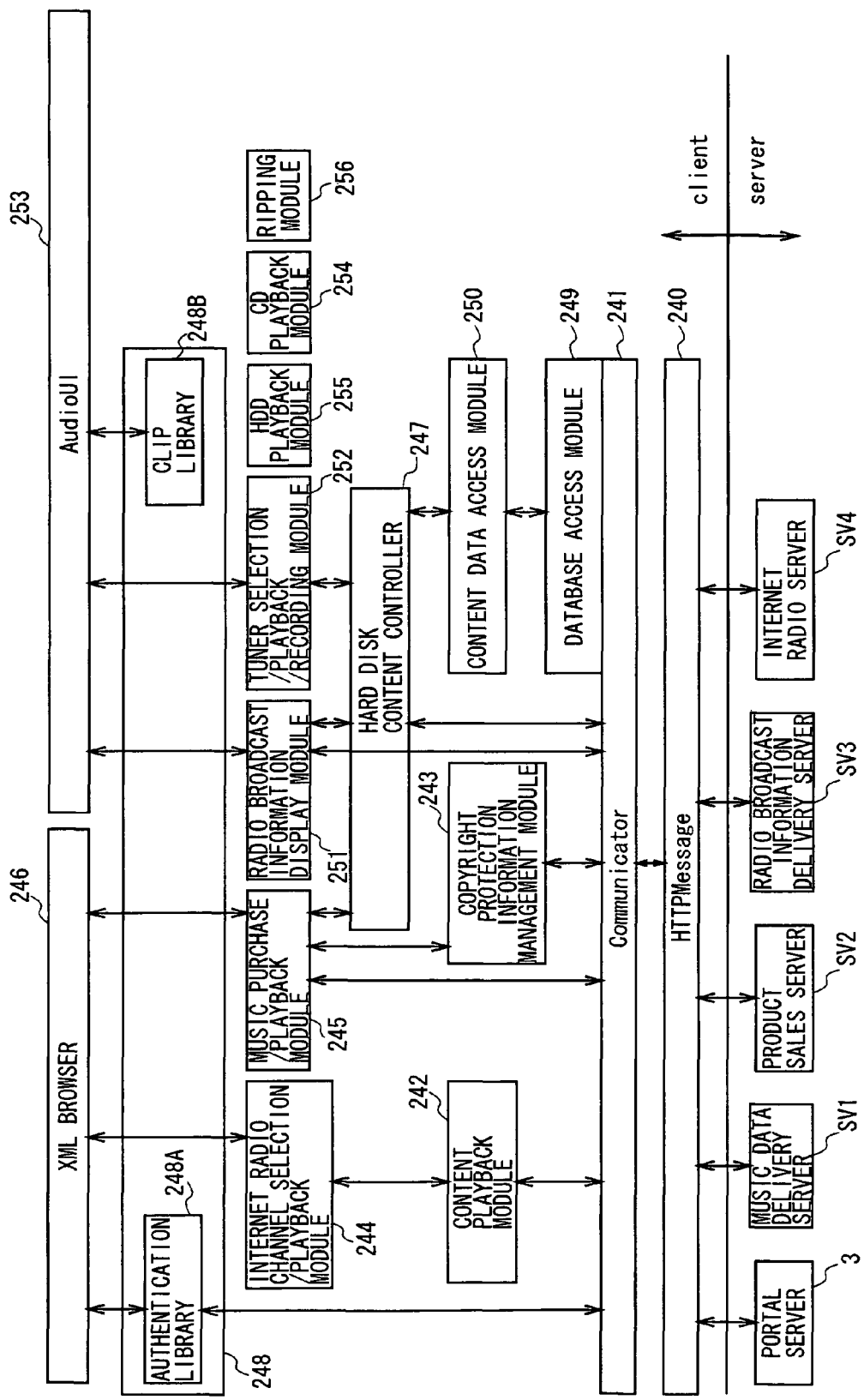
FIG. 15 is a schematic diagram showing program modules of the client terminal.

Program modules are applied to the client terminal 2 that has the hardware configuration described by the hardware circuit blocks shown in FIG. 14. As shown in FIG. 15, the program modules operate on OS, and interchanges with the portal server 3 and other servers SV1 through SV4.

An HTTP (Hyper Text Transfer Protocol) message program 240 interchanges with the portal server 3 and other servers SV1 through SV4 in HTTP communication. A communicator program 241 interchanges data with the HTTP message program 240.

A content playback module 242 and a copyright protection information management module 243 are disposed above the communicator program 241. The content playback module 242 interprets the codec of contents, and reproduces them. The copyright protection information management module 243 deals with information relating to copyright protection. An Internet radio channel selection/playback module 244 and a music purchase/playback module 245 are disposed on the content playback module 242 and the copyright protection information management module 243 respectively. The Internet radio channel selection/playback module 244 selects channels of Internet radio and plays the selected channels. The music purchase/playback module 245 controls the purchase of music and the playback of demo music.

The Internet radio channel selection/playback module 244 and the music purchase/playback module 245 perform playback process to generate audio data. The audio data is transferred to the audio processing section 209 to output audio from the speaker 210.

A XML browser 246 is disposed above the Internet radio channel selection/playback module 244 and the music purchase/playback module 245. The XML browser 246 interprets XML files received from various servers, and then displays images on the display 206.

For example, a user selects a piece of music using the XML browser 246. The music purchase/playback module 245 therefore performs purchasing processes for purchasing the piece of music. The purchased piece of music is supplied via a hard disk content controller 247 to the hard disk drive 211 to stores it on the hard disk drive 211.

The communicator program 241 connects with an authentication library 248A of a library 248. The authentication library 248A performs various kinds of authentication processes in association with the portal server 3 and the like.

A database access module 249, a content data access module 250, and the hard disk content controller 247 are disposed above the communicator program 241.

The database access module 249 accesses various kinds of databases disposed in the hard disk drive 211. The content data access module 250 accesses content data stored in the hard disk drive 211. The hard disk content controller 247 manages content data stored in the hard disk drive 211.

A radio broadcast information display module 251 and a tuner selection/playback/recording module 252 are disposed above the hard disk content controller 247. The radio broadcast information display module 251 performs processes for displaying a title and artist name of music broadcast from radio stations. The tuner selection/playback/recording module 252 selects radio stations. The tuner selection/playback/recording module 252 also records content data (music) received from a radio station on the hard disk drive 211.

For example, a user selects a radio station using an audio user interface (UI) 253 to receive music from the radio station. The received music is supplied via the content data access module 250 to the hard disk drive 211 to stores it in the hard disk drive 211.

The tuner selection/playback/recording module 252 performs playback processes to generate audio data (content data). The audio data is supplied to the audio processing section 209 to output audio from the speaker 210.

The radio broadcast information display module 251 uses the tuner selection/playback/recording module 252 to receive radio broadcast information from the radio broadcast information delivery server SV3 via the HTTP message program 240. For example, the received radio broadcast information is now-on-air information about a title and artist name of music currently broadcast by a radio station. The radio broadcast information display module 251 then transmits the information via the audio user interface (UI) 253 to the display 206 which displays the information.

The radio broadcast information, which was transmitted via the audio user interface 253 and displayed on the display 206, may be temporarily stored in a clip library 248B of the library 248. In response to user's instruction, the radio broadcast information is finally transferred via the database access module 249 to the hard disk drive 211 to be recorded on the hard disk drive 211.

A CD playback module 254 controls the media drive 208 to play back CDs.

Audio data played back from CDs by the CD playback module 254 are transferred to the audio processing section 209 to output audio from the speaker 210.

A HDD playback module 255 connects with the hard disk content controller 247 and the copyright protection information management module 243 (the connection is not shown here).

The HDD playback module 255 under the control of the hard disk content controller 247 reads audio data (content data) from the hard disk drive 211. The HDD playback module 255 then reproduces the audio data based on copyright management information supplied from the copyright protection information management module 243.

Audio data (music data), which was played by the HDD playback module 255 based on the copyright management information, is supplied to the external storage and playback device through the external device interface 216. The external storage and playback device then records the audio data (music data) on a MD and the like.

In addition, audio data, which was played by the HDD playback module 255 based on the copyright management information, is supplied to the audio processing section 209 which then outputs audio from the speaker 210.

A ripping module 256 connects with the hard disk content controller 247 and the copyright protection information management module 243 (the connection is not shown here).

The ripping module 256 controls the CD playback module 254, the copyright protection information management module 243, and the hard disk content controller 247 to store (i.e., rip) audio data played back from CDs by the CD playback module 254 and its copyright management information in the hard disk drive 211. Specifically, the copyright management information is supplied from the copyright protection information management module 243 to control the audio data. The storage process of the audio data and copyright management information is also controlled by the hard disk content controller 247.

As for the program modules described above, the HTTP message program 240 and the communicator program 241 can provide the same function as the communication control section 32 of the client terminal 2 (FIG. 2) does.

The content playback module 242 can provide the same function as the encoder/decoder section 34 of the client terminal 2 (FIG. 2) does.

The copyright protection information management module 243 can provide the same function as the copyright management section 35 of the client terminal 2 (FIG. 2) does.

The Internet radio channel selection/playback module 244 can provide the same function as the control section 23 and audio control section 26 of the client terminal 2 (FIG. 2) do.

The music purchase/playback module 245 can provide the same function as the control section 23 and audio control section 26 of the client terminal 2 (FIG. 2) do.

The XML browser 246 can provide the same function as the input processing section 21 and page information generation section 36 of the client terminal 2 (FIG. 2) do.

The hard disk content controller 247, the database access module 249, and the content data access module 250 can provide the same function as the control section 23 of the client terminal 2 (FIG. 2) does.

The authentication library 248A of the library 248 can provide the same function as the authentication processing section 37 and the authentication information storage section 38 of the client terminal 2 (FIG. 2) do.

The clip library 248B of the library 248 can provide the same function as the control section 23 of the client terminal 2 (FIG. 2) does.

The radio broadcast information display module 251 can provide the same function as the radio broadcasting display control section 39 of the client terminal 2 (FIG. 2) does.

The tuner selection/playback/recording module 252 can provide the same function as the control section 23, audio control section 26 and tuner section 31 of the client terminal 2 (FIG. 2) do.

The audio user interface 253 can provide the same function as the input processing section 21, control section 23 and display control section 24 of the client terminal 2 (FIG. 2) do.

The CD playback module 254 can provide the same function as the audio control section 26 and external recording media recording and reproducing section 28 of the client terminal 2 (FIG. 2) do.

The HDD playback module 255 can provide the same function as the control section 23 and audio control section 26 of the client terminal 2 (FIG. 2) do.

The ripping module 256 can provide the same function as the control section 23, external recording media recording and reproducing section 28 and encoder/decoder section 34 of the client terminal 2 (FIG. 2) do.

Accordingly, the client terminal 2 illustrated by FIG. 14 (which has the hardware configuration of hardware circuit blocks) can perform the same processes as the client terminal 2 illustrated by FIG. 2 (which has the hardware configuration of functional circuit blocks) does, as the CPU 203 performs processes based on the above-noted program modules.

In addition, the CPU 203 of the client terminal 2, which includes the hardware configuration by the hardware circuit blocks, performs music data acquisition process according to the present invention, in accordance with various program modules in a procedure of music purchase process described below.

The client terminal 2, which includes the hardware configuration by the functional circuit blocks, includes the functional circuit blocks corresponding to the capabilities supported by various program modules. Therefore, by the functional blocks, the client terminal 2 can perform the music data acquisition process according to the present invention.

(1-9) Hardware Circuit Block Configuration of Servers

The hardware configuration of the hardware circuit blocks of the portal server 3, music data delivery server SV1, product sales server SV2, radio broadcast information delivery server SV3, and fee-charging server SV5 will be described.

When the portal server 3, music data delivery server SV1, product sales server SV2, radio broadcast information delivery server SV3, and fee-charging server SV5 are configured by the hardware circuit blocks, the configuration of the servers can be the same because software can provide various capabilities.

Accordingly, with reference to FIG. 16, the basic hardware configuration of the hardware circuit blocks of a server, which can be applied to the portal server 3, music data delivery server SV1, product sales server SV2, radio broadcast information delivery server SV3, and fee-charging server SV5, will be described.

The server includes a CPU 270 that takes overall control of the server. The CPU 270 loads various programs, such as basic programs and application programs, from a ROM 271 or a hard disk drive 272 to a RAM 274 through a bus 273 to perform various processes.

The hard disk drive 272 can permanently or temporarily store various data and information, such as content data and page information to be published on the network. The database can be installed in the hard disk to register various kinds of registration information such as customer information.

In addition, the CPU 270 reads out various data, information and various kinds of registration information from the hard disk drive 272, and performs various processes using the various data, information and various kinds of registration information.

The network interface 275 can be connected to the client terminal 2 and the other servers through the network NT to transmit and receive various data and information.

In addition, basically, the CPU 270 of the server performs various processes in accordance with various programs stored in the ROM 271 or the hard disk drive 272.

Therefore, the CPU 270A of the server can perform the same functions as the control section 50, communication control section 52, and authentication processing section 56 of the portal server 3 illustrated by FIG. 4, if the programs stored in the ROM 271A or the hard disk drive 272A are selected properly in dependence upon the functions provided by the portal server 3 (FIG. 4). And this server's hard disk drive 272A can work in the same way as the customer database section 54, page information storage section 55, authentication information storage section 57, frequency information storage section 58, and URL storage section 59 of the portal server 3 (FIG. 4). By the way, the portal server 3 illustrated by FIG. 4 includes functional circuit blocks.

In addition, the CPU 270B of the server can perform the same functions as the control section 70, communication control section 72, authentication processing section 75, retrieval section 79, license generation section 80 and acquisition usage file generation section 81 of the music data delivery server SV1 illustrated by FIG. 5, if the programs stored in the ROM 271B or the hard disk drive 272B are selected properly in dependence upon the functions provided by the music data delivery server SV1 (FIG. 5). And this server's hard disk drive 272B can work in the same way as the customer database section 74, page information storage section 76, authentication information storage section 77, and music data storage section 78 of the music data delivery server SV1 (FIG. 5). By the way, the music data delivery server SV1 illustrated by FIG. 5 includes functional circuit blocks.

By the way, as mentioned above, the music data delivery server SV1 includes three functions: a provision function of the acquisition usage file, a provision function of music data and provision function of the license data.

The music data delivery server SV1 may have all the three functions. Alternatively, there may be three different servers each of which includes one of the three functions.

Accordingly, if the common programs for the three functions and specific programs for the provision function of the acquisition usage file are installed on the ROM 271B or the hard disk drive 272B, the CPU 270BA of the server can perform in the way as the control section 70, communication control section 72, authentication processing section 75, and acquisition usage file generation section 81 of the music data delivery server SV1. And this server's hard disk drive 272BA can work in the same way as the customer database section 74, page information storage section 76, and authentication information storage section 77 of the music data delivery server SV1.

And, if the common programs for the three functions and the specific programs for the provision function of music data are installed on the ROM 271BB or the hard disk drive 272BB, the CPU 270BB of the server can perform in the way as the control section 70, communication control section 72, authentication processing section 75, and retrieval section 79 of the music data delivery server SV1. And this server's hard disk drive 272BB can work in the same way as the customer database section 74, page information storage section 76, authentication information storage section 77 and music data storage section 78 of the music data delivery server SV1.

Furthermore, if the common programs for the three functions and the specific programs for the provision function of the license data are installed on the ROM 271BC or the hard disk drive 272BC, the CPU 270BC of the server can perform in the way as the control section 70, communication control section 72, authentication processing section 75, and license generation section 80 of the music data delivery server SV1. And this server's hard disk drive 272BC can work in the same way as the customer database section 74, page information storage section 76, and authentication information storage section 77 of the music data delivery server SV1.

Furthermore, the CPU 270C of the server can perform the same functions as the control section 90, communication control section 92, authentication processing section 95, and retrieval section 99 of the product sales server SV2 illustrated by FIG. 6, if the programs stored in the ROM 271C or the hard disk drive 272C are selected properly in dependence upon the functions provided by the product sales server SV2 (FIG. 6). And this server's hard disk drive 272C can work as the customer database section 94, page information storage section 96, authentication information storage section 97, and package media information storage section 98 of the product sales server SV2 (FIG. 6). By the way, the product sales server SV2 illustrated by FIG. 6 includes functional circuit blocks.

Furthermore, the CPU 270D of the server can perform the same functions as the control section 110, communication control section 112, authentication processing section 115, and retrieval section 118 of the radio broadcast information delivery server SV3 illustrated by FIG. 7, if the programs stored in the ROM 271D or the hard disk drive 272D are selected properly in dependence upon the functions provided by the radio broadcast information delivery server SV3 (FIG. 7). And this server's hard disk drive 272D can work in the same way as the customer database section 114, page information storage section 116, on-air-list information storage section 117, now-on-air information storage section 119 and authentication information storage section 120 of the radio broadcast information delivery server SV3 (FIG. 7). By the way, the radio broadcast information delivery server SV3 illustrated by FIG. 7 includes functional circuit blocks.

By the way, the fee-charging server SV5 has not been described in detail. However, the CPU 270E can perform in the same way as the functional circuit blocks that can perform the fee-charging process, if the programs stored in the ROM 271E or the hard disk drive 272E are selected properly in dependence upon the functions provided by the fee-charging server SV5. And the hard disk drive 272E can work in the same way as a storage section storing various kinds of information such as fee-charging information to be used to charge.

In this manner, if the programs to be stored in the ROM 271 or the hard disk drive 272 of the server are properly selected, all the functions of the portal server 3, music data delivery server SV1, product sales server SV2, radio broadcast information delivery server SV3, and fee-charging server SV5 with the hardware configuration of the functional circuit blocks can also be performed by the hardware configuration of the hardware circuit blocks.

In the above-noted embodiments, radio broadcasting is applied to as a kind of broadcasting the client terminal 2 can receive. However the present invention is not limited to this. The client terminal 2 may receive television broadcasting from television stations, and acquire various kinds of information related to the television programs from a server on the network NT.

By the way, in the above embodiment, in the portal server 3, music data delivery server SV1, and fee-charging server SV5 with the hardware configuration of the hardware circuit blocks, the CPUs 272A, 270B and 270E loads various programs onto the RAMs 274A, 274B and 274E through the buses 273A, 273B and 273E to perform various processes in line with the procedure of the music purchase process described below.

By the way, in the procedure of the music purchase process described below, to clearly describe the three functions of the music data delivery server SV1, the music data delivery server SV1 will be described as three servers: a server SV11 (FIG. 16) of providing the acquisition usage file (also referred to as an acquisition usage file provision server), a server SV12 (FIG. 16) of providing music data (also referred to as a music data provision server), and a server SV13 (FIG. 16) of providing license data (also referred to as a license provision server).

By the way, the portal server 3, music data delivery server SV1 (the acquisition usage file provision server SV11, the music data provision server SV12 and the license provision server SV13), and fee-charging server SV5 with the hardware configuration of the functional circuit blocks includes functional circuit blocks corresponding to the capabilities supported by various programs. Therefore, the portal server 3, music data delivery server SV1 (the acquisition usage file provision server SV11, the music data provision server SV12 and the license provision server SV13), and fee-charging server SV5 with the hardware configuration of the functional circuit blocks can perform various processes in line with the procedure of the music purchase process described below by the functional blocks.

Figure 17:
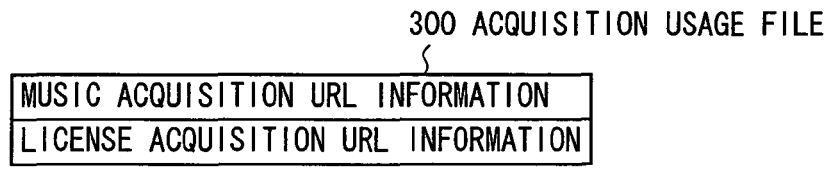
FIG. 17 is a schematic diagram showing the configuration of an acquisition usage file.

To perform the procedure of the music purchase process, the CPU 270BA of the acquisition usage file provision server SV11 generates, when a user of the client terminal 2 requests to purchase music, an acquisition usage file 300 as shown in FIG. 17.

The acquisition usage file 300 includes the following items for each piece of music: URL information (also referred to as music acquisition URL information) to be accessed to acquire music data corresponding to the music requested by a user for purchase, including an address on the network NT; and URL information (also referred to as license acquisition URL information) to be accessed to acquire the license data that makes the music data available.

By the way, the acquisition usage file 300 includes the music acquisition URL information and the license acquisition URL information. In addition, the acquisition usage file 300 may include content ID information of the music data corresponding to the music such that it is associated with the music's music acquisition URL information and license acquisition URL information.

Figure 18:
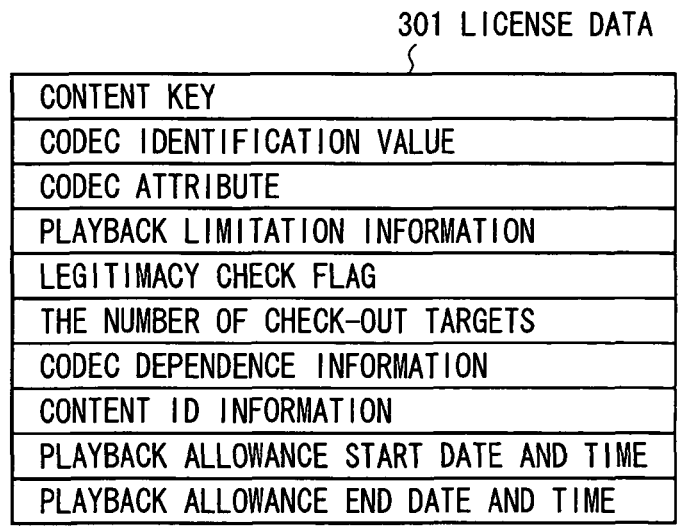
FIG. 18 is a schematic diagram showing the configuration of license data.
Figure 19:
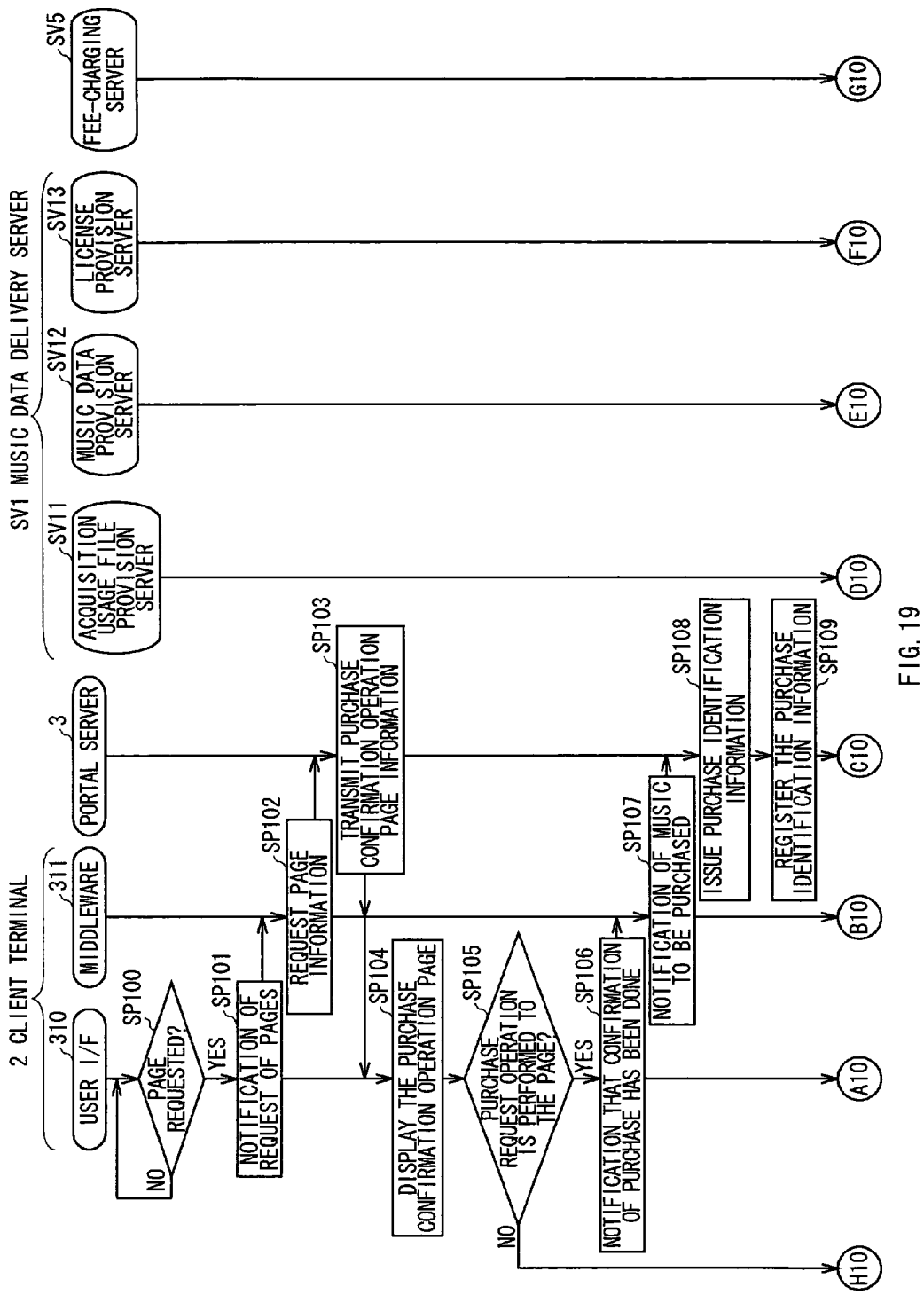
FIG. 19 is a sequence chart illustrating a procedure of a normal music purchase process (1).
Figure 20:
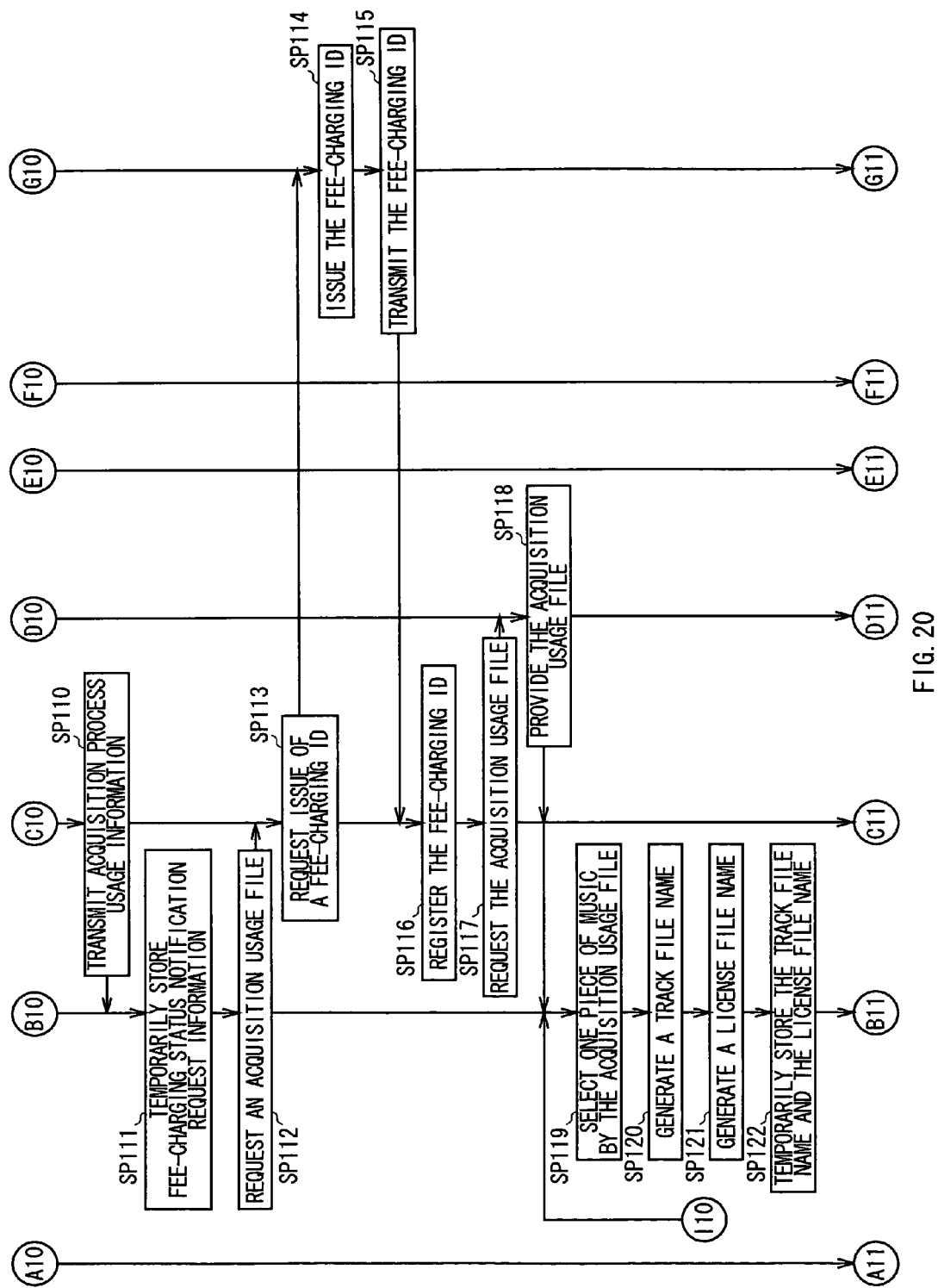
FIG. 20 is a sequence chart illustrating a procedure of a normal music purchase process (2).
Figure 21:
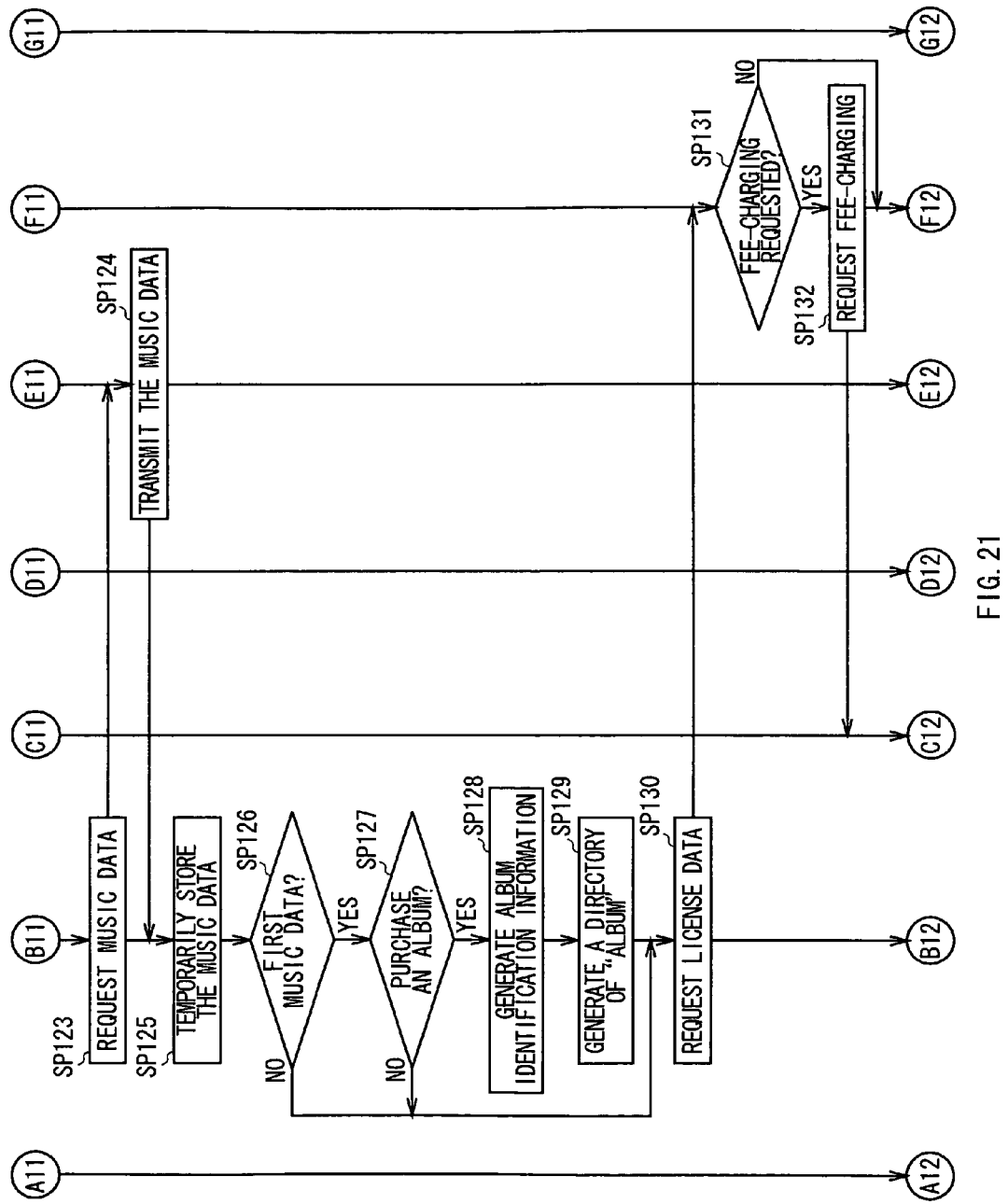
FIG. 21 is a sequence chart illustrating a procedure of a normal music purchase process (3).
Figure 22:
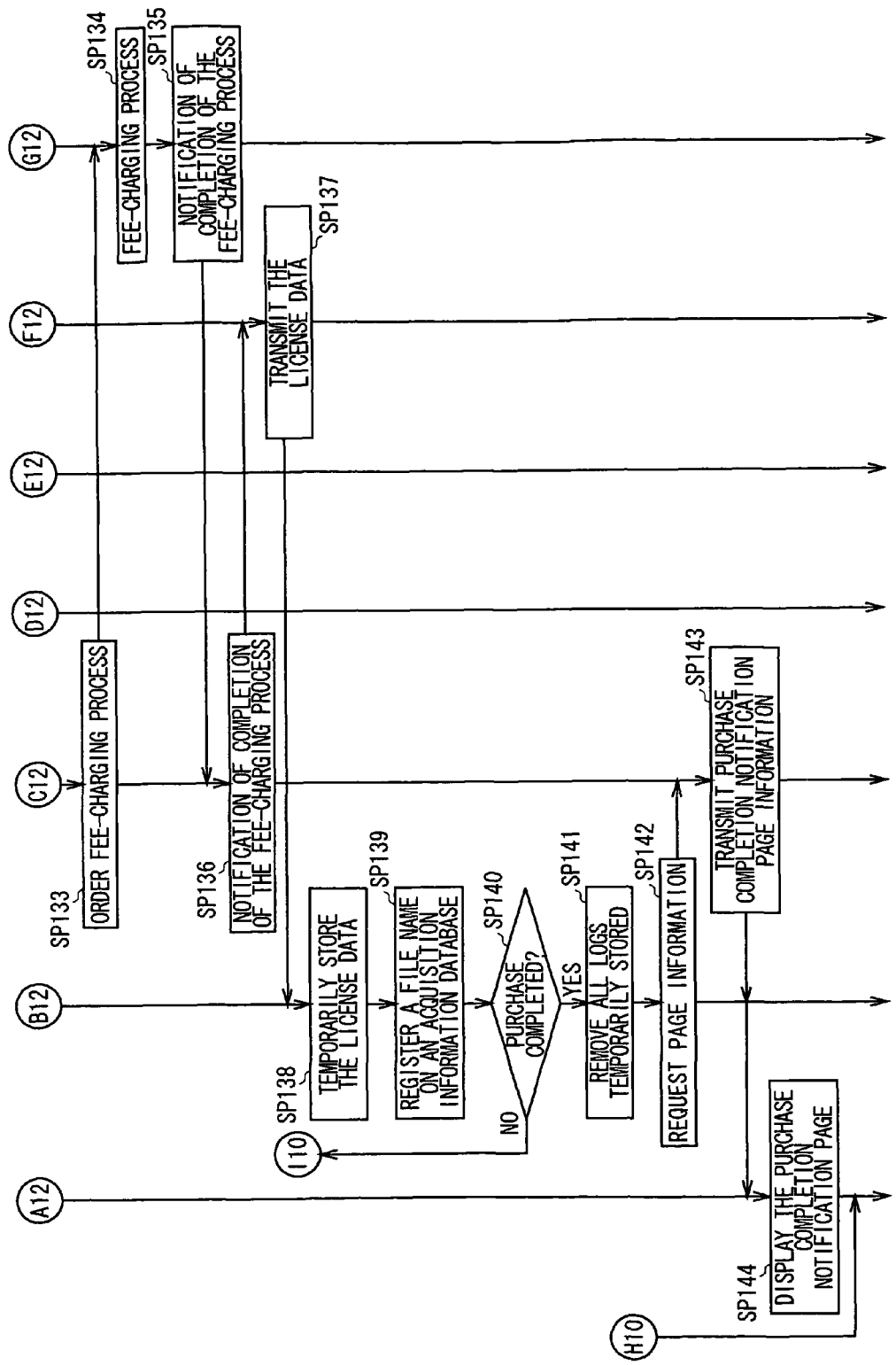
FIG. 22 is a sequence chart illustrating a procedure of a normal music purchase process (4).

In addition, to perform the procedure of the music purchase process, the CPU 270BC of the license provision server SV13 generates, when a user of the client terminal 2 requests to purchase music, license data 301 that makes the music data corresponding to the requested music available as shown in FIG. 18.

The license data 301 includes the following information as the usage allowance information that makes the corresponding music data available: a content key to be used to decipher the music data by the client terminal 2; a codec identification value and codec attribute to be used to decode the compressed and coded music data after deciphering; playback limitation information showing how many times the music data can be played back, which is determined as a usage right of the music data; a legitimacy check flag to be used to check whether the music data is legitimate; check-out numbers which shows how many times the music data can be copied and recorded on an external recording medium; codec dependence information; content ID information of the corresponding music data; and playback allowance start date and time and playback allowance end date and time showing a period of time when the music data can be played back, which is determined as a usage right of the music data.

In this manner, the license data 301 includes the usage allowance information which is necessary to decipher and decode the music data to play back it and the like.

Accordingly, the CPU 270BC of the license provision server SV13 prevents third parties, even if they have got the downloadable music data, from improperly using the music data.

(2) Procedure of Music Purchase Process

The procedure of the music purchase process, which is performed between the client terminal 2, the portal server 3, the music data delivery server SV1 (the acquisition usage file provision server SV11, the music data provision server SV12 and the license provision server SV13) and the fee-charging server SV5, will be described.

By the way, in the procedure of the music purchase process, the CPU 203 of the client terminal 2 performs the music data acquisition process in the procedure of the music purchase process in accordance with an user interface 310 and middleware 311: the user interface 310 is equivalent to the XML browser 246 which is one of the program modules described in FIG. 15, and the middleware 311 is equivalent to the HTTP message program 240, the communicator program 241, the copyright protection information management module 243, the music purchase/playback module 245, the authentication library 248A, the hard disk content controller 247, the content data access module 250 and the database access module 249.

However, for ease of explanation, in the procedure of the music purchase process, the user interface 310 and the middleware 311 will be described like hardware circuit blocks.

In addition, in the procedure of the music purchase process described below, the client terminal 2, the portal server 3, the acquisition usage file provision server SV11, the music data provision server SV12, the license provision server SV13 (i.e. the music data delivery server SV1) and the like perform various authentication process, such as the user authentication process that authenticates a user of the client terminal 2, before performing their own unique process.

However, for ease of explanation, the authentication processes will not be described in the procedure of the music purchase process.

By the way, in the procedure of the music purchase process, between the client terminal 2 and the server such as the portal server 3, the acquisition usage file provision server SV11, the music data provision server SV12, and the license provision server SV13, or between the portal server 3 and the server such as the acquisition usage file provision server SV11, the music data provision server SV12, and the license provision server SV13, a file like Cookie may be interchanged including the authentication session ID for the authentication process, the service session ID information, the authentication ticket, and the like.

(2-1) Procedure of Normal Music Purchase Process

With reference to sequence charts shown in FIGS. 19 to 22, a procedure of a normal music purchase process, which is performed when the client terminal 2 purchases the music requested by a user for purchase as the music data and the license data 301, will be described.

The client terminal 2 acquires, by using the middleware 311, the music data delivery page information from one of the servers (the acquisition usage file provision server SV11, the music data provision server SV12 and the license provision server SV13). And then the client terminal 2 displays the music data delivery page on the display 206 by the user interface 310, and then starts the music data acquisition process in the procedure of the normal music purchase process.

The music data delivery server SV1, which is equivalent to the acquisition usage file provision server SV11, the music data provision server SV12 and the license provision server SV13, delivers two kinds of the downloadable music data: it delivers one piece of music as single music data or a bunch of pieces of music data as album music data. Therefore, one or plurality of pieces of the music data can be purchased by selecting album or single.

Therefore, the music data delivery page includes a list where music names of the music data that can be purchased (i.e. downloadable music data) and the like are listed. The music data delivery page is configured such that one piece or plurality of pieces of music data can be selected from the list as album or single for purchasing and then the selected music data can be purchased.

In addition, the music data delivery page includes the content ID information of the music data corresponding to the music name listed in the list such that it is associated with the music name.

Accordingly, after the client terminal 2 starts the music data acquisition process, the user interface 310 at step SP310 waits until a user selects the music he/she wants to purchase through the music data delivery page on the display 206, and requests the purchase of the selected music.

When the music the user wants to purchase is selected and the purchase of the selected music is requested through the page, the user interface 310 proceeds to next step SP101.

At step SP101, the user interface 310 obtains, from the music data delivery page, the content ID information of the music data corresponding to the music the user requested to purchase. The user interface 310 then supplies the obtained content ID information to the middleware 311, and orders the middleware 311 to request the purchase confirmation operation page information where the user can confirm whether the music has been purchased.

At step SP102, the middleware 311 transmits the page information acquisition request signal to the portal server 3 via the communication processing section 214 and the network interface 215 to request the purchase confirmation operation page information.

Figure 16:
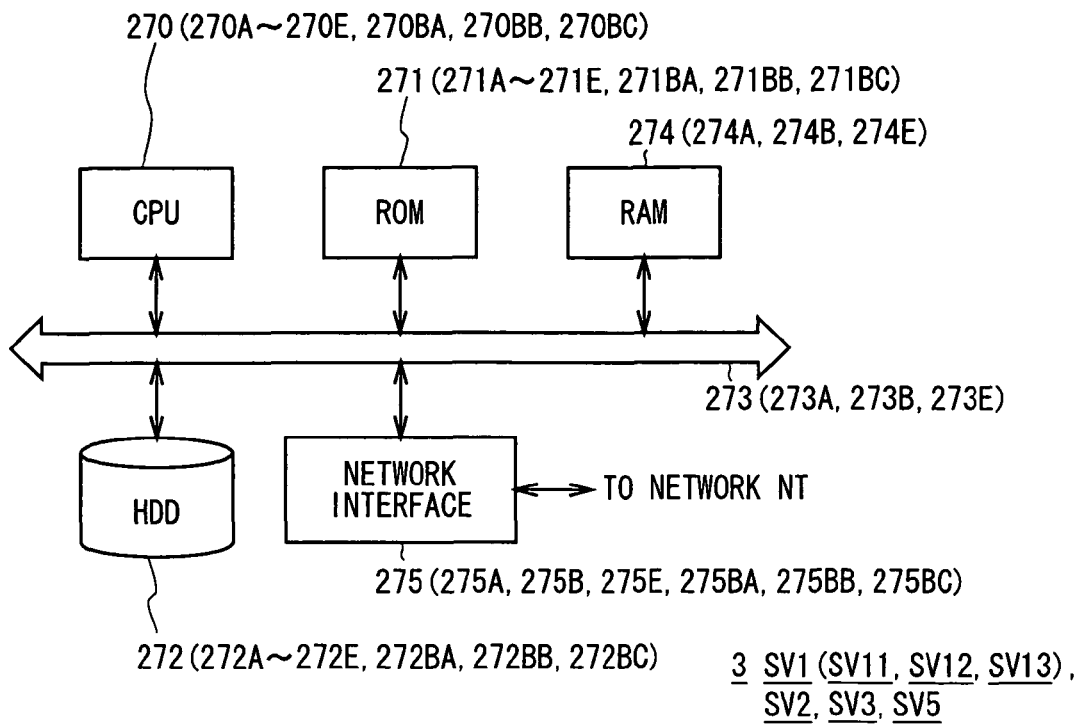
FIG. 16 is a block diagram showing the hardware configuration of servers using hardware circuit blocks.

At step SP103, the CPU 270A of the portal server 3 receives the page information acquisition request signal from the client terminal 2 via the network interface 275A (FIG. 16). In response to the page information acquisition request signal, the CPU 270A transmits the purchase confirmation operation page information to the client terminal 2 through the network interface 275A.

At step SP104, the middleware 311 of the client terminal 2 receives the purchase confirmation operation page information from the portal server 3 through the network interface 215 and the communication processing section 214, and then supplies the purchase confirmation operation page information to the user interface 310.

Figure 23:
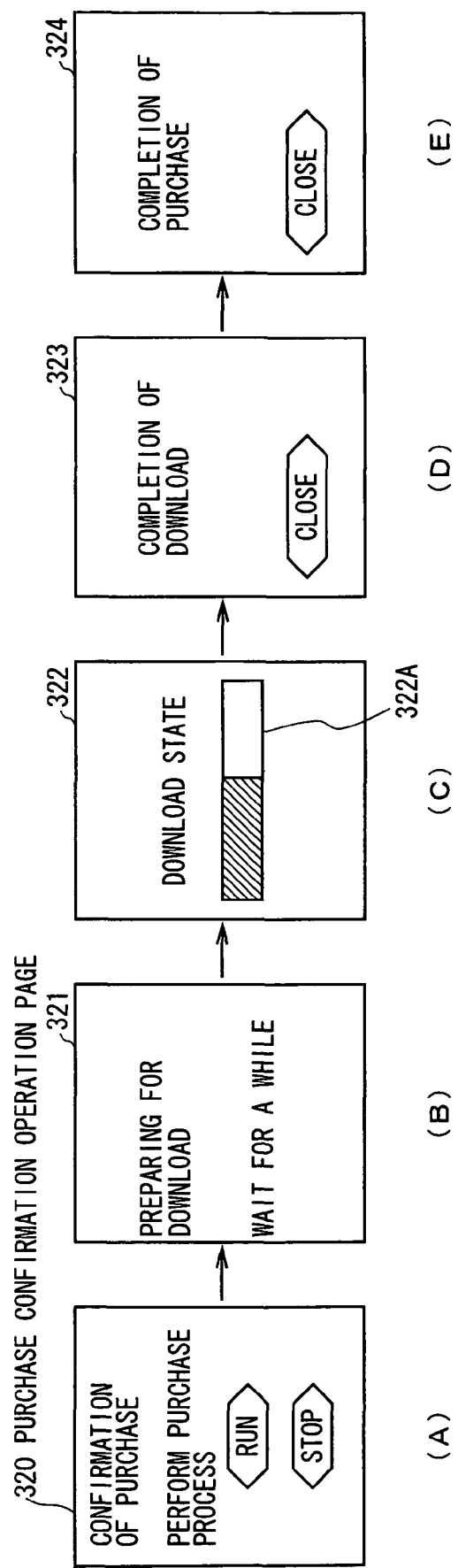
FIG. 23 is a schematic diagram illustrating a page and screen notifying of the progress of a music data acquisition process.

The user interface 310 therefore supplies the purchase confirmation operation page information to the display 206 via the display processing section 207 to display a purchase confirmation operation page 320 on the display 206 as shown in FIG. 23(A).

The purchase confirmation operation page 320 is a page where the user can operate to input information to make a final request of purchase after determining purchasing the music or not.

Accordingly, at step SP105, the user interface 310 checks whether the user has performed a purchase request operation through the purchase confirmation operation page 320 displayed on the display 206. When the purchase request operation is detected, the user interface 310 proceeds to next step SP106.

By the way, at step SP105, if it is detected that the user operates the purchase confirmation operation page 320 to quit purchasing, the user interface 310 ends the music data acquisition process.

At step SP106, the user interface 310 notifies the middleware 311 of the fact that the user has confirmed the music to be purchased.

At step SP107, the middleware 311 generates a purchase request signal including the content ID information of the music data corresponding to the music to notify of the music that the user has requested to purchase, the user ID information and password information. The middleware 311 then transmits the purchase request signal to the portal server 3 through the communication processing section 214 and the network interface 215.

At step SP108, the CPU 270A of the portal server 3 receives the purchase request signal from the client terminal 2 through the network interface 275. In response to the purchase request signal, the CPU 270A issues purchase identification information, such as a serial number to be used to identify the music purchase process related to the user who has requested to purchase the music, and then proceeds to next step SP109.

At step SP109, the CPU 270A identifies, based on the user ID information and password information in the purchase request signal, the customer information of the user who has requested to purchase the music from the customer database in the hard disk. The CPU 270A subsequently associates the identified customer information with the purchase identification information and the content ID information that has been stored in the purchase request signal and corresponds to the music that the user requested to purchase, and registers them, and then proceeds to next step SP110.

At step SP110, the CPU 270A generates acquisition process usage information to be used to perform the music data acquisition process for the user's purchase request of the music, and transmits it to the client terminal 2 through the network interface 275A.

The acquisition process usage information includes the acquisition usage file request information to be used to acquire the acquisition usage file 300, fee-charging status notification request information to be used to request, when the stopped music data acquisition process restarts on the client terminal 2, the notification of fee-charging status of the user, and the like.

The acquisition usage file request information includes ULR information (also referred to as file acquisition URL information) on the network NT to be used by the client terminal 2 to access the address to acquire the acquisition usage file 300.

The fee-charging status notification request information includes: the URL information (also referred to as retry URL information) to be accessed to request the notification of fee-charging status of the user when the client terminal 2 restarts the music data acquisition process to retry the acquisition of the music data and the license data 301; the purchase identification information, issued at step SP108, to be presented to a communication opponent (i.e. the portal server 3) when accessing the retry URL information; post data; and a request code showing a type of request.

At step SP111, the middleware 311 of the client terminal 2 receives the acquisition process usage information from the portal server 3 through the network interface 215 and the communication processing section 214.

The middleware 311 then, as shown in FIG. 24, temporarily stores the fee-charging status notification request information obtained based on the acquisition process usage information, along with acquisition process type information that shows a type of the current music data acquisition process (which shows the normal purchase in this case, for example), in the hard disk of the hard disk drive 211 for example, as first process progress information (also referred to as a first log) showing the progress of the current music data acquisition process (i.e. which shows the start of the music data acquisition process). The middleware 311 subsequently proceeds to next step SP112.

At step SP112, the middleware 311 accesses the file acquisition URL information which has been included in the acquisition usage file request information obtained based on the acquisition process usage information, and request the acquisition usage file 300 from the portal server 3.

At step Sp113, the CPU 270A of the portal server 3 transmits, in response to the request for the acquisition usage file 300 from the client terminal 2, a fee-charging ID information issue request signal that requests issue of fee-charging ID information which is to be used to identify a fee-charging process for the user who has requested purchase of the music, to the fee-charging server SV5 through the network interface 275A.

At step SP114, the CPU 270E of the fee-charging server SV5 receives the fee-charging ID information issue request signal from the portal server 3 through the network interface 275E (FIG. 16). The CPU 270E then issues, in response to the fee-charging ID information issue request signal, the fee-charging ID information, and then proceeds to next step SP115.

At step SP115, the CPU 270E transmits the fee-charging ID information to the portal server 3 through the network interface 275E.

At step SP116, the CPU 270A of the portal server 3 receives the fee-charging ID information from the fee-charging server SV5 through the network interface 275A. The CPU 270A then registers the fee-charging ID information on the customer database in the hard disk such that this fee-charging ID information is associated with the purchase identification information which has been already registered at step SP109.

In addition, at the same time, the CPU 270A registers the fee-charging status notification information, which shows that the fee for the music has not been charged yet to the user who requested purchase of the music, in the customer database such that it is associated with the purchase identification information which has been already registered at step SP109, and then proceeds to next step SP117.

At step SP117, the CPU 270A stores the content ID corresponding to the music that has been requested by the user for purchase, and then generates a file request signal to request the acquisition usage file 300 to be used to acquire the music data and the license data 301 to the client terminal 2 of the user. The CPU 270A subsequently transmits the file request signal to the acquisition usage file provision server SV11 through the network interface 275A.

At step SP118, the CPU 270BA of the acquisition usage file provision server SV11 receives the file request signal from the portal server 3 through the network interface 275BA (FIG. 16). The CPU 270BA for example issues, in response to the file request signal, the music acquisition URL information and the license acquisition URL information, and generates the acquisition usage file 300 where the issued music acquisition URL information and license acquisition URL information of each piece of music are listed in a predetermined order.

By the way, at step SP118, the CPU 270BA of the acquisition usage file provision server SV11 issues the music acquisition URL information and the license acquisition URL information. Alternatively, the CPU 270BB of the music data provision server SV12 may issue the music acquisition URL information while the CPU 270BC of the license provision server SV13 may issue the license acquisition URL information. And then the CPU 270BA of the acquisition usage file provision server SV11 may generate the acquisition usage file 300 by using the music acquisition URL information and the license acquisition URL information.

Accordingly, the CPU 270BA transmits the acquisition usage file 300 to the client terminal 2 via the network interface 275BA and the portal server 3. By the way, the CPU 270BA of the acquisition usage file provision server SV11 shares data provision usage information, which includes the contents of the generated acquisition usage file 300, the content ID information that is supplied from the portal server 3 and corresponds to the music requested by the user for purchase, and the purchase identification information associated with the user, with the music data provision server SV12 and the license provision server SV13.

At step SP119, the middleware 311 of the client terminal 2 receives the acquisition usage file 300 from the acquisition usage file provision server SV11 through the portal server 3, the network interface 215 and the communication processing section 214, and then temporarily stores the received acquisition usage file 300 for example in the RAM 205.

The middleware 311 then selects one piece of music acquisition URL information, out of one or plurality of pieces of the music acquisition URL information stored in the acquisition usage file 300, in accordance with the order of these pieces of information listed. The middleware 311 subsequently proceeds to next step SP120.

At step SP120, the middleware 311 generates a track file name that is to be used to identify a "track" file when the music data downloaded from the selected music acquisition URL information is stored in the hard disk as the "track" file, and then proceeds to next step SP121.

At step SP121, the middleware 311 generates a license file name that is to be used to identify a license file when the license data 301 (which makes the music data available) downloaded along with the music data corresponding to the music acquisition URL information selected at step SP120 is stored in the hard disk as the license file, and then proceeds to next step SP122.

At step SP122, as shown in FIG. 24, for example, the middleware 311 temporarily stores the track file name and license file name generated at step SP120 and SP121 in the hard disk of the hard disk drive 211 as second process progress information (also referred to as a second log) showing the progress of the music data acquisition process, and then proceeds to next step SP123.

At step SP123, the middleware 311 accesses the music acquisition URL information, which is selected at step SP119 from the acquisition usage file 300, and requests download of the music data from the music data provision server SV12.

By the way, the middleware 311 reads out, in response to the progress of the music data acquisition process, various kinds of screen data indicating the progress of the music data acquisition process from the hard disk or the like, and supplies them to the user interface 310.

In addition, for example, even at step SP123, the middleware 311 supplies screen data for notification of preparation of download to the user interface 310 while requesting download of the music data from the music data provision server SV12.

Accordingly, the user interface 310 supplies the screen data, which is supplied from the middleware 311, to the display 206 through the display processing section 207. Therefore, the display 206 displays a download preparation notification screen 321 as shown in FIG. 23(B) until the download of the music data starts to notify the user of the progress of the music data acquisition process.

On the other hand, the CPU 270BB of the music data provision server SV12 associates, when the data provision usage information is shared with the acquisition usage file provision server SV11, the content ID information corresponding to the music requested by the user for purchase with the music acquisition URL information described in the acquisition usage file 300 which has been provided to the user's client terminal 2.

Accordingly, at step SP124, the CPU 270BB of the music data provision server SV12 retrieves, in response to a download request for the music data from the client terminal 2, out of the plurality of pieces of music data stored in the hard disk, the music data of the content ID information associated with the music acquisition URL information accessed by the client terminal 2 this time.

The CPU 270BB subsequently transmits the retrieved music data to the client terminal 2 through the network interface 275BB (FIG. 16).

At step SP125, the middleware 311 of the client terminal 2 temporarily stores, while receiving the music data from the music data provision server SV12 through the network interface 215 and the communication processing section 214, the music data in the hard disk as the "track" file whose name has been determined at above step SP120, and then proceeds to next step SP126.

By the way, the middleware 311, for example, has already acquired the data size of the music data corresponding to the music requested by the user to purchase, along with the acquisition usage file 300, from the acquisition usage file provision server SV11 (this is not clearly illustrated by any Figures).

At step SP125, the middleware 311 compares, while downloading the music data from the music data provision server SV12, the acquired data size with the size of the received music data. And the middleware 311 sequentially updates the contents of the screen data based on the result of comparing, and then supplies it to the user interface.

Therefore, the user interface 310 supplies the screen data, which is supplied from the middleware 311, to the display 206 through the display processing section 207. The display 206 displays, as shown in FIG. 23(C), a download status notification screen 322.

By the way, because a progress bar 322A of the download status notification screen 322 changes in accordance with the progress of downloading the music data, the user interface 310 can notify the user of the progress of downloading the music data in real time.

When the middleware 311 has completed download of the music data from the music data provision server SV12, the middleware 311 supplies, in response to that, screen data to the user interface 310.

At this time, the user interface 310 supplies the screen data, which is supplied from the middleware 311, to the display 206 through the display processing section 207. The display 206 displays, instead of the download status notification screen 322, a download completion notification screen 323 as shown in FIG. 23(D). In this manner, the user interface 310 can notify the user of the progress of downloading the music data in concert with the middleware 311.

By the way, the header part of the music data provided from the music data provision server SV12 includes purchase type notification information as attribute information of the music data, indicating whether the data has been prepared for purchasing a bunch of pieces of music as an album or a piece of music as a single.

Accordingly, at step SP126, the middleware 311 determines whether the music data that has been temporarily stored in the hard disk is first one downloaded from the music data provision server SV12 by this music data acquisition process.

If the affirmative result is obtained at step SP126, this means that the music data that has been temporarily stored in the hard disk is first one downloaded from the music data provision server SV12 regardless of which type the user has chosen to purchase music (album or single). At this time, the middleware 311 proceeds to next step SP127.

At step SP127, the middleware 311 determines, based on the purchase type notification information stored in the music data temporarily stored in the hard disk, whether the music data is one that should be purchased as a part of an album.

If the affirmative result is obtained at step SP127, this means that the user has requested a bunch of pieces of music as an album to purchase (i.e. a bunch of pieces of music stored in an album have been requested to purchase). At this time, the middleware 311 proceeds to next step SP128.

At step SP128, the middleware 311 generates album identification information (a path, for example) that can identify an "album" directory to be used to manage the "track" file and the license file: the "album" directory can identify the "track" file corresponding to the music data currently acquired in response to the purchase request for the album of music; and the license file of the license data 301 that makes the music data available.

By the way, the album identification information is identification information to be used to identify only the music data and the license data 301 that the client terminal 2 acquires this time. That is to say, even if the client terminal 2 has already ripped the same music data from CDs or the like to the hard disk, the album identification information identifies only the music data acquired from the music data provision server SV12.

As shown in FIG. 24, for example, the middleware 311 temporarily stores the album identification information in the hard disk of the hard disk drive 211 as third process progress information (also referred to as a third log) showing the progress of the music data acquisition process, and then proceeds to next step SP129.

At step SP129, the middleware 311 creates an new "album" directory that is to be indicated by the album identification information generated at step SP128 on the hard disk, and then proceeds next step SP130.

By the way, if the negative result is obtained at above step SP126, this means that the music data that has been temporarily stored in the hard disk is subsequent one downloaded from the music data provision server SV12 regardless of which type the user has chosen to purchase music (album or single). At this time, the middleware 311 proceeds to next step SP130.

In addition, if the negative result is obtained at above step SP127, this means that the user has requested one or plurality of pieces of music as a single.

By the way, each time a bunch of pieces of music is requested as an album, the middleware 311 generates, as mentioned above (step SP128 and SP129), a new "album" directory on the hard disk.

However, the hard disk has already contained a directory to be used to manage single-type music data and the license data 301 that makes the music data available.

By the way, the middleware 311 uses, out of the plurality of hierarchical "album" directories illustrated by FIG. 3, one or some of them to manage singly-type music data and the license data 301.

Accordingly, if the negative result is obtained at step SP127 because the user requested one or plurality of pieces of music as a single, the middleware 311 does not generate any directories to manage the single-type music data and the license data 301, and then proceeds to step SP130.

At step SP130, the middleware 311 selects, from the acquisition usage file 300, the file acquisition URL information corresponding to the music acquisition URL information selected at above step SP119.

The middleware 311 then accesses the selected file acquisition URL information to request download of the license data 301 from the license provision server SV13.

The license provision server SV13 shares the data provision usage information with the acquisition usage file provision server SV11 and the music data provision server SV12.

Therefore the license provision server SV13 has a list of the file acquisition URL information or the like to be used to provide the client terminal 2 with content IDs of the music data and the license data 301 that makes the music data available.

The list includes the purchase identification information to be used to identify the music purchase process which is performed for the user who now tries to acquire the license data 301 along with the music data. On the list, the content ID, the file acquisition URL information and the like of each piece of music are associated with one another, and they are described in order of download of music data to the client terminal 2.

In addition, on the list, out of one or plurality of pieces of the file acquisition URL information, only the top file acquisition URL information (which is the file acquisition URL information the client terminal 2 accesses first during the music data acquisition process to get the license data 301) is associated with a flag that means that the user will be charged when the client terminal 2 accesses this file acquisition URL information.

That is to say, in the procedure of the normal music purchase process, even if the user has requested music in a single or album form, the fee-charging process for all the requested pieces of music is performed when the user's client terminal 2 requests download of first license data 301.

Accordingly, at step SP131, the CPU 270BC of the license provision server SV13 determines, in response to the download request for the license data 301 from the client terminal 2, whether it should charge the user of the client terminal 2 based on the list.

If the affirmative result is obtained at step SP131, this means that the file acquisition URL information currently accessed by the client terminal 2 is the first file acquisition URL information the client terminal 2 accesses to acquire the first license data 301 on this normal music purchase process. At this time, the CPU 270BC proceeds to next step SP132.

At step SP132, the CPU 270BC stores the purchase identification information, which is associated with the list, and transmits, to the portal server 3 through the network interface 275BC (FIG. 16), a fee-charging request signal to request fee-charging from the user of the client terminal 2 currently requesting download of the license data 301 for a fee for purchase of the music.

At step SP133, the CPU 270A of the portal server 3 receives the fee-charging request signal from the license provision server SV13 through the network interface 275A. The CPU 270A identifies, based on the purchase identification information stored in the fee-charging request signal, the customer information of the user who has requested the music, from the customer database in the hard disk.

The CPU 270A then stores the fee-charging ID information of the user who has requested the music (this information being included in the identified customer information), and the content ID information corresponding to all the pieces of music requested for purchase, and then generates a fee-charging process execution order signal to order the fee-charging server SV5 to execute fee-charging process. The CPU 270A therefore, transmits the fee-charging process execution order signal to the fee-charging server SV5 through the network interface 275A.

At step SP134, the CPU 270E of the fee-charging server SV5 receives the fee-charging process execution order signal from the portal server 3 through the network interface 275E. The CPU 270E subsequently identifies, based on the fee-charging ID information and the content ID information in the fee-charging process execution order signal, various kinds of information such as fee-charging information to be used to charge the user who has requested purchase of the music, and performs, by using the information such as the identified fee-charging information, a fee-charging process for the user.

After completing the fee-charging process, the CPU 270E at step SP135 stores the fee-charging ID, and then supplies a fee-charging completion notification signal to the portal server 3 through the network interface 275E to notify the portal server 3 of the completion of the fee-charging process.

At step SP136, the CPU 270A of the portal server 3 receives the fee-charging completion notification signal from the fee-charging server SV5 through the network interface 275A.

The CPU 270A identifies, based on the fee-charging ID information stored in the fee-charging completion notification signal, the purchase identification information of the user out of the customer database in the hard disk, and updates the fee-charging status notification information, which has been registered along with the purchase identification information and showing that the fee is not still charged, such that it shows the fee-charging process has completed based on the notification by the fee-charging completion notification signal. The CPU 270A subsequently transmits a fee-charging completion signal, which shows the completion of the fee-charging process of the user, to the license provision server SV13 through the network interface 275A.

At step SP137, the CPU 270BC of the license provision server SV13 receives the fee-charging completion signal from the portal server 3 through the network interface 275BC. In response to that, the CPU 270BC recognizes the completion of the fee-charging process of the user.

The CPU 270BC subsequently creates, based on the content ID information associated with the file acquisition URL information accessed by the client terminal 2 at step SP130 and the like, the license data 301. The CPU 270BC therefore transmits the license data 301 to the client terminal 2 through the network interface 275BC.

By the way, if the negative result is obtained at above step SP131, this means the file acquisition URL information currently accessed by the client terminal 2 is one the client terminal 2 accesses to acquire second or subsequent license data 301 on this normal music purchase process.

That is to say, that negative result means that the fee-charging process to the user has already been completed. In this case, the CPU 270BC proceeds to step SP137.

At step SP138 the middleware 311 of the client terminal 2 sequentially receives the license data 301 from the license provision server SV13 through the network interface 215 and the communication processing section 214, and temporarily stores the license data 301 in the hard disk as the license file whose license name was created at above step SP121, and then proceeds to next step SP139.

In a case in which the user has requested music in an album form, the middleware 311 at step SP139 registers the album identification information generated at above step SP128 in an acquisition information database installed in the hard disk.

In addition, the middleware 311 registers, as a lower layer of the album identification information registered in the acquisition information database, the track file name of the music data downloaded at above step SP125, and the license file name of the license data 301 downloaded at above step SP138 in the acquisition information database such that they are associated with one another.

By the way, once the middleware 311 has registered the album identification information in the acquisition information database, the middleware 311 adds, each time the music data and the license data 301 are downloaded, their track file names and license file names to the album identification information stored in the acquisition information database.

By contrast, at step SP139, in a case in which the user has requested music in a single form, the middleware 311 registers, as a lower layer of the single identification information that has been already registered in the acquisition information database and is unique to a directory which is used to manage single-type music, the track file name of the music data downloaded at above step SP125, and the license file name of the license data 301 downloaded at above step SP138 in the acquisition information database such that they are associated with one another.

The middleware 311 therefore makes it possible to manage, by using the "album" directory or the directory for single-type music in the same structure as that of FIG. 3, the following items downloaded form the music data provision server SV12 and the license provision server SV13: the "track" file of the music data, and the license file of the license data 301. The middleware 311 then permanently stores the music data and the license data 301, which were temporarily stored.

As a result, the middleware 311 identifies, by using the album identification information or the single identification information, the music data and the corresponding license data 301 which were downloaded from the music data provision server SV12 and the license provision server SV13 respectively. The middleware 311 then makes the music data available in accordance with the contents of the license data 301, and proceeds to next step SP140.

At step SP140, the middleware 311 determines whether it has downloaded all the music data and corresponding license data 301 requested this time (i.e. whether it has purchased all the music requested).

If the negative result is obtained at step SP140, this means that there is a plurality of pieces of music requested by the user this time, and it has not downloaded all the music data and the corresponding license data 301 yet. In this case, the middleware 311 returns to step SP119.

Therefore, the middleware 311 repeats a process of step SP199 to SP140 until it obtains the affirmative result at step SP140 to download, from the music data provision server SV12 and the license provision server SV13, the music data and the corresponding license data 301 requested by the user in accordance with the contents of the acquisition usage file 300.

If the affirmative result is obtained at step SP140, this means that it has downloaded all the music data and corresponding license data 301 requested by the user this time, and registered them in the acquisition information database. In this case, the middleware 311 proceeds to next step SP141.

At step SP141, for example, the middleware 311 removes the first to third logs, which were temporarily stored in the hard disk during the music data acquisition process, from the hard disk, and then proceeds to next step SP142.

At step SP142, the middleware 311 accesses the URL information that is obtained based on the acquisition process usage information, and transmits a page information acquisition request signal to the portal server 3 through the communication processing section 214 and the network interface 215.

At step SP143, the CPU 270A of the portal server 3 receives the page information acquisition request signal from the client terminal 2 through the network interface 275A. The CPU 270A then transmits the purchase completion notification page information corresponding to the URL information accessed by the client terminal 2 to the client terminal 2 through the network interface 275A.

At step SP144, the middleware 311 of the client terminal 2 receives the page information from the portal server 3 through the network interface 215 and the communication processing section 214, and supplies it to the user interface 310.

Accordingly, the user interface 310 supplies the page information, which is supplied from the middleware 311, to the display 206 through the display processing section 207. The display 206 then displays a purchase completion notification page 234 as shown in FIG. 23(E).

Therefore, through the purchase completion notification page 324, the user interface 310 notifies the user of the completion of purchase of the music requested this time, and ends the music data acquisition process for the purchase request of the music.

(2-2) Procedure of Retry Music Purchase Process

For example, when power supply to the client terminal 2 is stopped after the user mistakenly disconnects its outlet, or when the communication is broken after the user mistakenly disconnects its network cable, the music data acquisition process is stopped.

Figure 25:
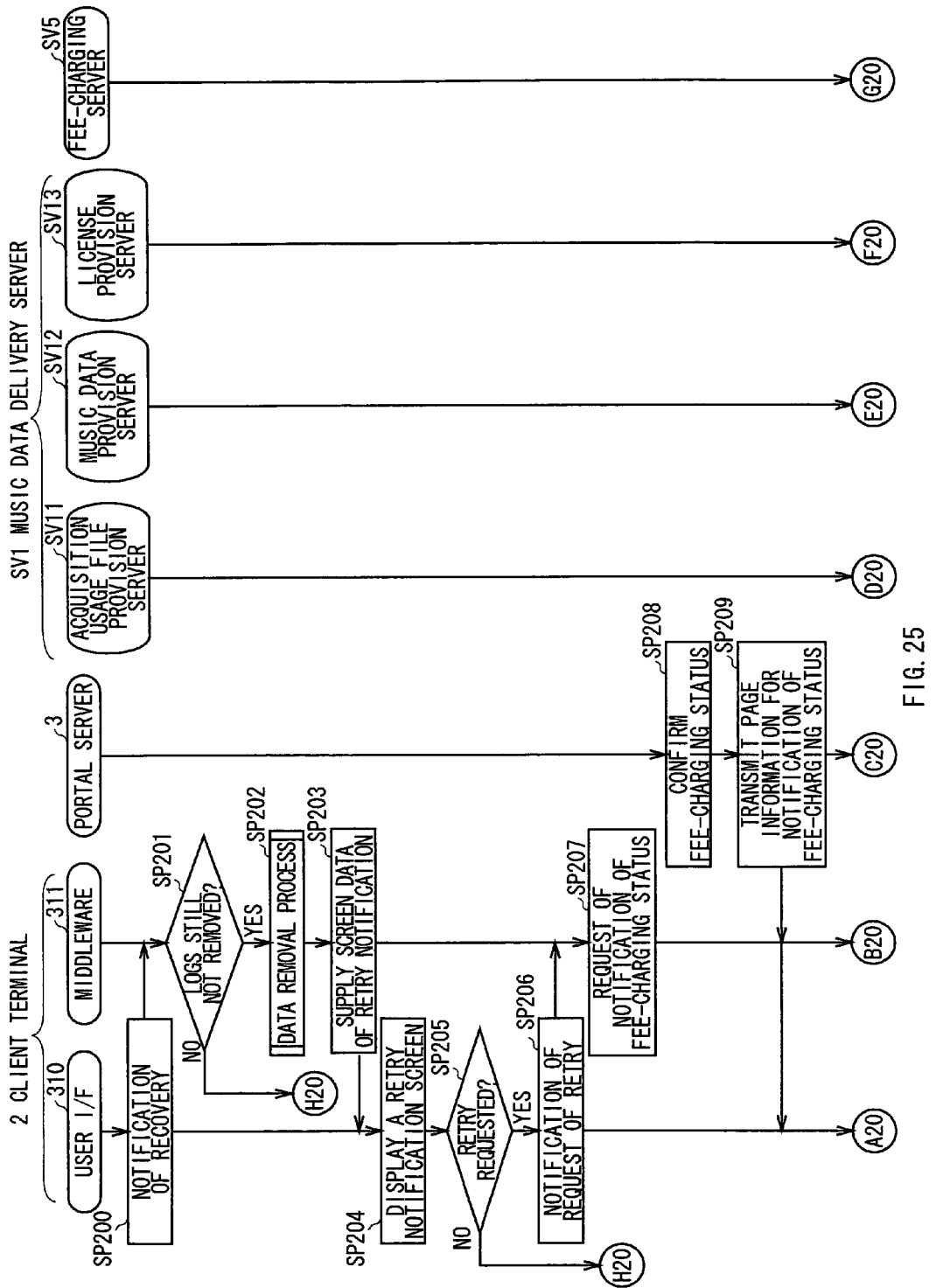
FIG. 25 is a sequence chart illustrating a procedure of a retry music purchase process (1).
Figure 26:
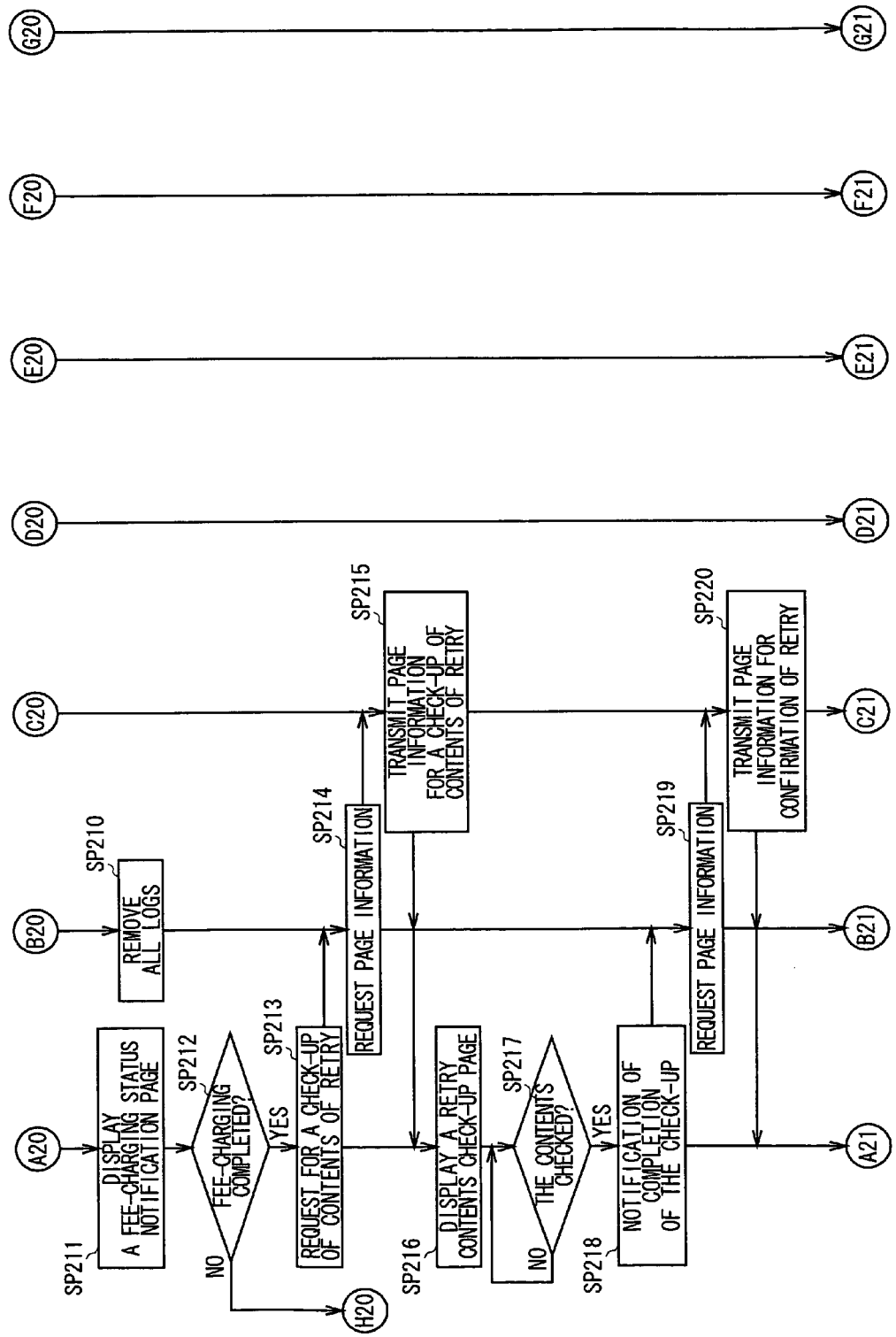
FIG. 26 is a sequence chart illustrating a procedure of a retry music purchase process (2).
Figure 27:
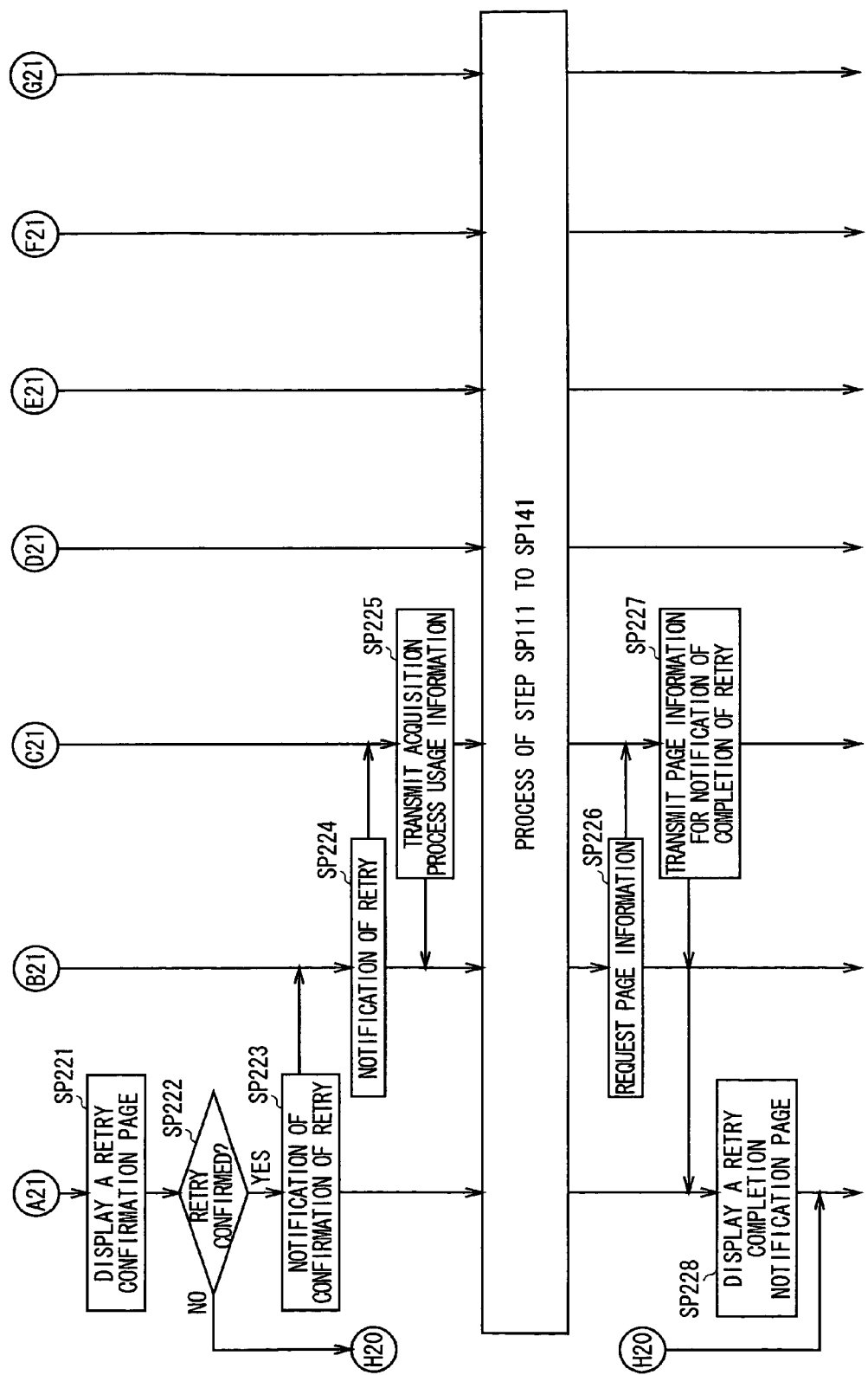
FIG. 27 is a sequence chart illustrating a procedure of a retry music purchase process (3).

With reference to sequence charts shown in FIGS. 25 to 27 (the parts of FIGS. 25 to 27 have been designated the same reference numerals or marks as the corresponding parts of FIGS. 19 to 22), a procedure of retry music purchase process, which is performed when the client terminal 2 restarts the music data acquisition process after it is rebooted or connected again to the network NT, will be described.

After it is rebooted or connected again to the network NT, the client terminal 2 starts a music data re-acquisition process in the procedure of retry music purchase process.

After starting the music data re-acquisition process, the user interface 310 at step SP200 notifies the middleware 311 of the fact that the client terminal 2 has been recovered and the network NT is available, and then proceeds to next step SP201.

At step SP201, the middleware 311 for example determines whether the first, second and third logs, which were temporarily stored in the hard disk during the previous music data acquisition process (which is the process performed by the client terminal 2 before it was recovered to be able to use the network NT) have been still left.

If the negative result is obtained at step SP201, this means that there are not the first to third logs on the hard disk because the stop of power supply or the disconnection to the network NT happened while the client terminal 2 was not performing the music data acquisition process (for the purchase request of the music).

Accordingly, the middleware 311 notifies the user interface 310 of the fact that the music data acquisition process had never been performed before it was recovered to be able to use the network NT. In this case, the middleware 311 ends the music data re-acquisition process in the procedure of retry music purchase process By contrast, if the affirmative result is obtained at step SP201, this means that, while the client terminal 2 was performing the music acquisition process, the music data acquisition process was stopped due to the stop of power supply or the disconnection to the network NT. That is to say, the affirmative result means that there are the first, second or third logs left on the hard disk (at least the first log). In this case, the middleware 311 proceeds to next step SP202.

Figure 28:
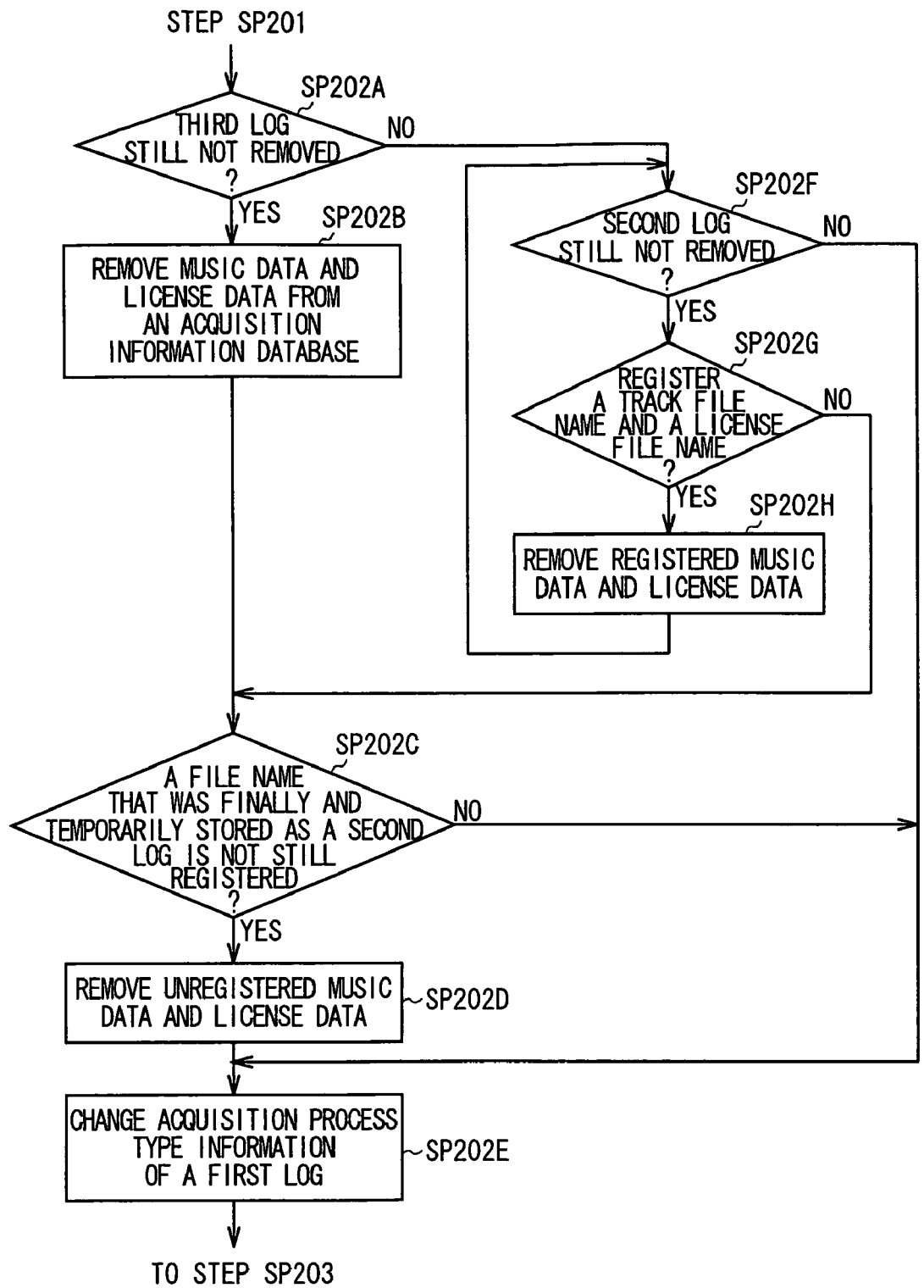
FIG. 28 is a flowchart illustrating a routine of a data removal process.

At step SP202, the middleware 311 starts a routine of data removal process (FIG. 28) as a subroutine of the music data acquisition process.

After starting the routine of data removal process, the middleware 311 at step SP202A checks whether the third log (i.e. the album identification information) has been left on the hard disk.

If the affirmative result is obtained at step SP202A, this means that the client terminal 2 has already downloaded at least one piece of music data from the music data provision server SV12 until the music data acquisition process, which was performed for the purchase request of the album type music, was stopped. In this case, the middleware 311 proceeds to next step SP202B.

At step SP202B, the middleware 311 removes, if the album identification information, which is the third log left, has been registered on the acquisition information database, the album identification information from the acquisition information database.

After removing the album identification information from the acquisition information database, the middleware 311 also removes, from the acquisition information database, the track file name and license file name which had been registered along with the album identification information.

In addition, the middleware 311 also removes the music data which had been stored in the hard disk as the "track" file of the track file name removed from the acquisition information database, and the license data 301 which had been stored in the hard disk as the license file of the license file name removed from the acquisition information database, and then proceeds to next step SP202C.

By the way, if the middleware 311 did not register the album identification information, which is left as the third log, in the acquisition information database before the music data acquisition process, which was performed for the purchase request of album type music, was stopped, the middleware 311 might have temporarily stored one track file name and one license file name as the second log.

In addition, if the middleware 311 temporarily stored, during the previous music data acquisition process, one track file name and one license file name as the second log, the middleware 311 might have temporarily stored at least a part of the music data corresponding to the track file name on the hard disk.

However, if the middleware 311 did not associate the track file name with the album identification information on the acquisition information database, the middleware 311 cannot automatically remove the music data corresponding to the track file name along with the album identification information in the above-noted manner.

Therefore, at step SP202B, if the album identification information, which is left as the third log, was not registered in the acquisition information database before the previous music data acquisition process was stopped, the middleware 311 does not anything even if the music data (and the license data 301) is left on the hard disk, and proceeds to next step SP202C.

At step SP202C, the middleware 311 checks whether the track file name and license file name, which was finally temporarily stored as the second log, were not registered in the acquisition database before the previous music data acquisition process was stopped.

If the affirmative result is obtained at step SP202C, this means that the process of above step SP202B has removed, using the removal of the album identification information, the music data and the license data 301 from the hard disk, however there may be a part or whole of the music data corresponding to at least the track file name out of the track file name and license file name which were finally temporarily stored as the second log. In this case, the middleware 311 proceeds to next step SP202D.

Accordingly, at step SP202D, if the hard disk stores the music data and license data 301 that respectively corresponds to the track file name and license file name which were finally and temporarily stored as the second log, the middleware 311 identifies, in accordance with the track file name and the license file name, the corresponding music data and license data 301 to remove them from the hard disk.

By the way, depending on the progress of the previous music data acquisition process, the middleware 311 may not have downloaded the license data 301, which corresponds to the license file name out of the track file name and license file name which were finally and temporarily stored as the second log, from the license provision server SV13 at all (i.e. the hard disk does not temporarily store it).

The middleware 311 may have temporarily stored a part of the music data corresponding to the trunk file name in the hard disk. Alternatively, the middleware 311 may have temporarily stored the whole music data corresponding to the track file name and a part of the license data 301 that makes the music data available in the hard disk.

Even if a part of the music data or license data 301 has been temporarily stored in the hard disk, the middleware 311 at step SP202D identifies, in accordance with the remaining second log, the remaining part of the music data and license data 301 to remove it.

After removing all the music data and license data 301 which were stored in the hard disk by the previous music data acquisition process, the middleware 311 proceeds to next step SP202E.

At step SP202E, the middleware 311 changes the contents of the acquisition process type information temporarily stored as the first log: the acquisition process type information is changed from one indicating the normal purchase to one indicating the data deletion that means that the middleware 311 has deleted the whole music data and license data a part of which had been already acquired from the music data provision server SV12 and the license server SV13 due to the stop of the music data acquisition process. The middleware 311 then gets out of the routine of the data removal process, and proceeds to step SP203 (FIG. 25)

In this manner, after data in the hard disk and the contents of the acquisition information database are restored to the original status, which is one before the previous music data acquisition process stopped, by removing the music data and the license data 301, the middleware 311 changes the contents of the acquisition process type information.

Therefore, even if the current music data re-acquisition process is again stopped due to the stop of power supply during a period of time from when it removes the music data and the license data 301 until it retries to acquire the music data and the license data 301, the middleware 311 can recognize, after being recovered to restart the music data acquisition process, the progress of the previous process in accordance with the acquisition process type information included in the first log.

Accordingly, in a case in which the music data acquisition process is stopped twice, if the music data and the license data 301 is completely removed at the first recovery, the middleware 311 at the second recovery, for example, confirms the deletion in accordance with the contents of the acquisition process type information, and avoids performing the same deletion process again, and then retries to acquire data. In this manner, the middleware 311 properly perform various processes in accordance with situation after recovery and the number of times it has recovered.

By the way, if the negative result is obtained at above step SP202A, this means that the previous music data acquisition process, which was started based on the purchase request for album-type music, was stopped before temporarily storing the album identification information as the third log, or that the music data acquisition process, which was started based on the purchase request for single-type music, was stopped. In this case, the middleware 311 proceeds to step SP202F.

At step SP202F, the middleware 311 checks whether there is the second log (the track file name and the license file name) left on the hard disk.

If the affirmative result is obtained at step SP202F, this means that, regardless of whether it is the purchase request for album-type music or single-type music, the previous process had already started downloading at least the first music data before the music data acquisition process was stopped. In this case, the middleware 311 proceeds to next step SP202G.

At step SP202G, the middleware 311 checks whether the track file name and license file name, which was temporarily stored as the second log, has been already registered in the acquisition information database.

If the affirmative result is obtained at step SP202G, this means that the previous process had already downloaded at least one music data and the corresponding license data 301 and then registered them in the acquisition information data base before the music data acquisition process, which was started based on the purchase request for single-type music, was stopped. In this case, the middleware 311 proceeds to next step SP202H.

At step SP202H, the middleware 311 removes all the track file name and license file name that were registered in the acquisition information database before the music data acquisition process, which was started based on the purchase request for single-type music, was stopped.

In addition, the middleware 311 also removes the music data which was stored in the hard disk as "track" file whose track file name was removed from the acquisition information database, and the license data 301 which was stored in the hard disk as license file whose license file name was removed from the acquisition information database, and then returns to step SP202F.

By the way, if the negative result is obtained at above step SP202G, this means that the previous process had temporarily stored only the first track file name and license file name as the second log before the music data acquisition process, which was started based on the purchase request for album-type music, was stopped, however, it did not start downloading first music data; otherwise, it had temporarily stored the first track file name and license file name as the second log and then downloaded at least a part of the first music data which was then temporarily stored in the hard disk.

In addition, if the negative result is obtained at step SP202G, this means that the previous process had temporarily stored the first track file name and license file name as the second log before the music data acquisition process, which was started based on the purchase request for single-type music, was stopped, however, it could not complete a process of temporarily storing the license data 301 corresponding to the first music data in the hard disk.

Furthermore, if the negative result is obtained at step SP202G, this means that the previous process had already registered at least the first track file name and license file name in the acquisition information database before the music data acquisition process, which was started based on the purchase request for single-type music, was stopped, however, the process of above step SP202H removed the track file name and license file name from the acquisition information database and the corresponding music data and license data 301 from the hard disk. In this case, the middleware 311 proceeds to next step SP202C.

At this time, at step SP202C, in the same way as the above one, the middleware 311 checks whether the track file name and license file name, which were finally and temporarily stored as the second log, were not registered in the acquisition information database before the previous music data acquisition process was stopped.

If the affirmative result is obtained at step SP202C, this means that the process of above step SP202H had already removed the music data and license data, which correspond to the track file name and license file name registered in the acquisition information database, from the hard disk, however, there is a part or whole of the music data, which corresponds to at least the track file name that was finally and temporarily stored as the second log, left on the hard disk.

In addition, if the affirmative result is obtained at step SP202C, this means that, during the previous music data acquisition process that was started based on the purchase request for single-type or album-type music, there had been at least a part of the first music data left on the hard disk. In this case, the middleware 311 proceeds to next step SP202D.

Accordingly, at step SP202D, the middleware 311, in the same way as the above one, removes the remaining music data (i.e. it removes the music data, or the music data and the corresponding license data 301) from the hard disk.

By contrast, if the negative result is obtained at step SP202C, this means that, regardless of whether it is based on the purchase request for album-type or single-type music, the previous music data process was stopped when a part of the music data and license data 301 was temporarily stored in the hard disk; otherwise, the process of above step SP202B and 202H completely removed the music data and the license data 301 from the hard disk. In this case, the middleware 311 proceeds to step SP202E.

In addition if the negative result is obtained at above step SP202F, this means that, regardless of whether it is based on the purchase request for album-type or single-type music, the previous music data acquisition process was stopped before the first track file name and license file name was temporarily stored as the second log, and therefore the music data and the license data 301 was not temporarily stored in the hard disk at all. In this case, the middleware 311 proceeds to step SP202E.

In this manner, the middleware 311 gets out of the routine of the data removal process to proceed to step SP203. And then, because the previous music data acquisition process was stopped halfway, the middleware 311 reads out screen data for notification of the retry from the hard disk and then supplies it to the user interface 310. The middleware 311 subsequently proceeds to step SP204.

Figure 29:
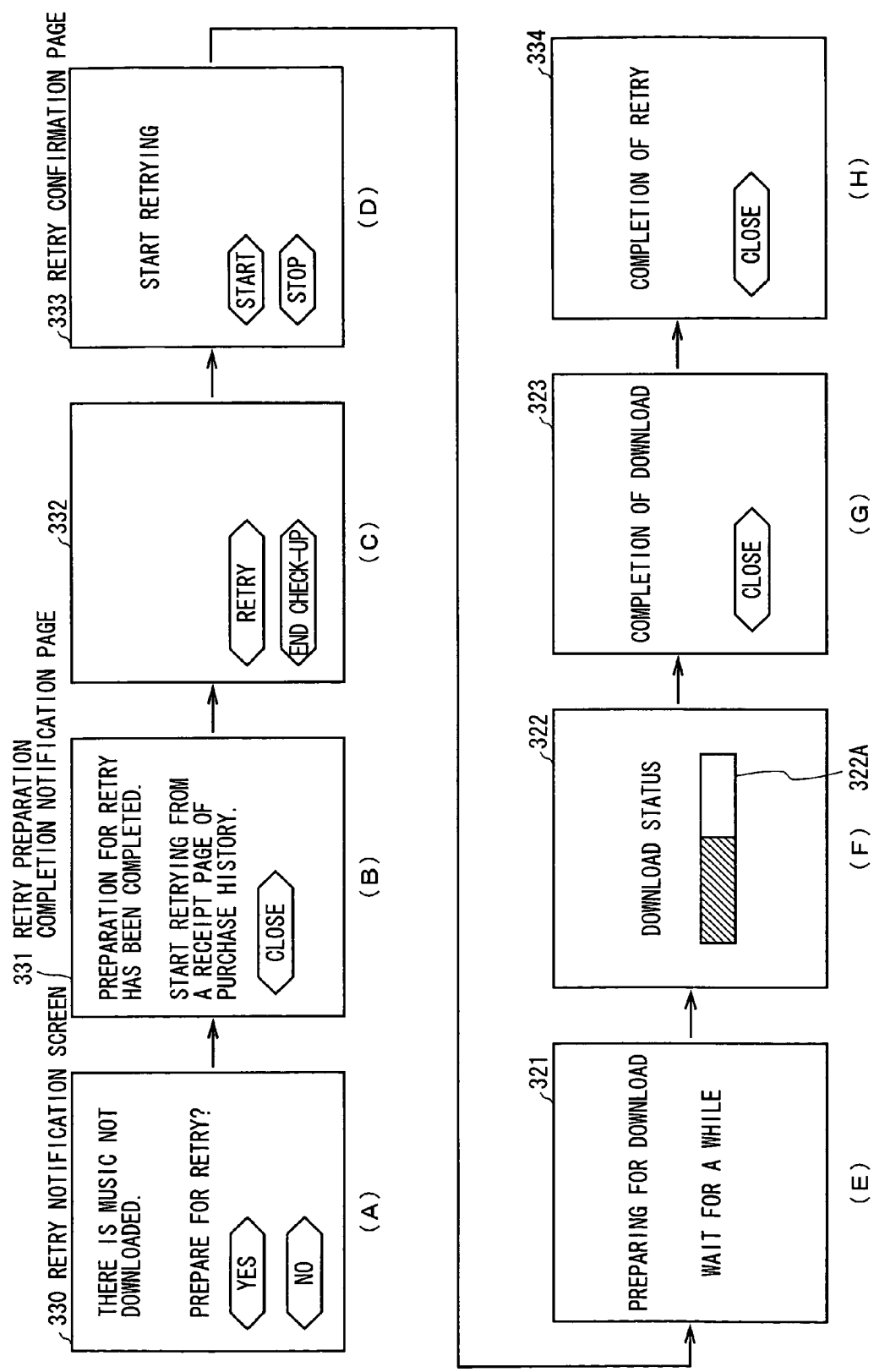
FIG. 29 is a schematic diagram illustrating a page and screen notifying the progress of a music data re-acquisition process.

At step SP204, the user interface 210 supplies the screen data, which is supplied from the middleware 311, to the display 206 through the display processing section 207. The display 206 therefore displays a retry notification screen 330 as shown in FIG. 29(A).

Accordingly, using the retry notification screen 330, the user interface 310 notifies the user of the fact that the previous music data acquisition process was stopped, and it could not download all the music data and license data 301, and, without notifying the portal server 3 of his/her desired music, it can retry to acquire the music data and the license data 301. The user interface 310 subsequently proceeds to step SP205.

At step SP205, the user interface 310 checks whether the retry notification screen 330 has been operated to request retry of acquiring the music data and the license data 301.

If the user does not request the retry of acquiring data, the user interface 310 ends the music data re-acquisition process in the procedure of the retry music purchase process.

If the user requests the retry of acquiring data, the user interface 310 proceeds to next step SP206 to notify the middleware 311 of the request of retry.

At step SP207, in response to the notification from the user interface 310, the middleware 311 accesses the retry URL information included in the fee-charging status notification request information temporarily stored in the hard disk as the first log. Accessing the retry URL information, the middleware 311 transmits the purchase identification information, which is included in the fee-charging status notification request information, to the portal server 3 through the communication processing section 214 and the network interface 215, along with the post data, request code and the like.

At step SP208, the CPU 270A of the portal server 3 receives the purchase identification information and the like from the client terminal 2 through the network interface 275A. The CPU 270A then retrieves, based on the purchase identification information, the user's fee-charging status notification information from the customer database in the hard disk, and confirms the user's fee-charging status based on the retrieved fee-charging status notification information, and then proceeds to next step SP209.

At step SP209, the CPU 270A transmits page information for notification of the user's fee-charging status confirmed to the client terminal 2 through the network interface 275A.

At step SP210, the middleware 311 of the client terminal 2 receives the page information from the portal server 3 through the network interface 215 and the communication processing section 214.

In response to the page information received, the middleware 311 removes all the first to third logs from the hard disk (i.e. it removes the first to third log which were temporarily stored by the previous music data acquisition process). In addition, the middleware 311 supplies the page information received from the portal server 3 to the user interface 310.

Accordingly, at step SP211, the user interface 310 supplies the page information, which was received from the portal server 3, to the display 206 through the display processing section 207. The display 206 therefore displays a page as video based on the page information, and then proceeds to next step SP212.

At step SP212, the user interface 310 checks, in accordance with the fee-charging status notification information embedded for example by the portal server 3 in the page displayed on the display 206, whether the fee-charging process to the user has been already completed.

At step SP212, the user interface 310 displays, on the display 206, a page (not shown) indicating the user is not still charged, and detects, based on the page, that the user is not still charged, and then ends the music data re-acquisition process in the procedure of the retry music purchase process.

By the way, if the fee-charging process to the user has already been completed at the previous music data acquisition process, the user interface 310 at step SP212 for example displays a retry preparation completion notification page 331 on the display 206 as shown in FIG. 29(B).

In this case, the retry preparation completion notification page 331 is supplied from the portal server 3 to the client terminal 2 to be displayed if the fee-charging process to the user has been already completed on the previous music data acquisition process.

The retry preparation completion notification page 311 includes a function to order the client terminal 2 to delete all remaining logs when the client terminal 2 receives its source information, or the page information.

Accordingly, the retry preparation completion notification page 311 can notify the user of the fact that the fee-charging process to the user has been already completed during the previous music data acquisition process and that, since the all logs have been removed, it has finished preparation for retrying the acquisition of data.

Therefore, at step SP212, the user interface 310 displays the retry preparation completion notification page 311 on the display 206, and detects, based on the retry preparation completion notification page 311, that the fee-charging process to the user has been already completed, and then proceeds to next step SP213.

At step SP213, when the user for example closes the retry preparation completion notification page 311 on the display 206, the user interface 310 orders the middleware 311 to check which data it will retry to acquire.

At step SP214, the middleware 311, in response to the notification from the user interface 310, accesses the URL information included in the acquisition process usage information acquired by the previous music data acquisition process, and then transmits a page information acquisition request signal to the portal server 3 through the communication processing section 214 and the network interface 215.

At step SP215, the CPU 270A of the portal server 3 receives the page information acquisition request signal from the client terminal 2 through the network interface 275A. The CPU 270A then transmits page information for checking the contents of retry, which corresponds to the URL information accessed by the client terminal 2, to the client terminal 2 through the network interface 275A.

At step SP216, the middleware 311 of the client terminal 2 receives the page information from the portal server 3 through the network interface 215 and the communication processing section 214, and then supplies it to the user interface 310.

Accordingly, the user interface 310 supplies the page information, which was received from the portal server 3, to the display 206 through the display processing section 207. The display 206 therefore displays a retry contents check page 332 as shown in FIG. 29(C).

In this case, the retry contents check page 332 indicates the fact that, because the fee-charging process to the user has been completed even though the music data has not been acquired completely by the previous music data acquisition process, the music data has been purchased (this point is not shown in Figures).

Accordingly, the user interface 310 allows the user to check the music data he/she will purchase this time by the retry process through the retry contents check page 332, and then proceeds to next step SP217.

At step SP217, the user interface 310 waits until the user operates the retry contents check page 332 to request the retry of acquiring data. If the user requests the retry of acquiring data, the user interface 310 proceeds to next step SP218 to notify the middleware 311 of the user's request.

At step SP219, in response to the notification from the user interface 310, the middleware 311 accesses the URL information included in the acquisition process usage information acquired by the previous music data acquisition process, and transmits a page information acquisition request signal to the portal server 3 through the communication processing section 214 and the network interface 215.

At step SP220, the CPU 270A of the portal server 3 receives the page information acquisition request signal from the client terminal 2 through the network interface 275A. The CPU 270A subsequently transmits page information for confirming retry, which corresponds to the URL information accessed by the client terminal 2, to the client terminal 2 through the network interface 275A.

At step SP221, the middleware 311 of the client terminal 2 receives the page information from the portal server 3 through the network interface 215 and the communication processing section 214, and then supplies it to the user interface 310.

Accordingly, the user interface 310 supplies the page information, which was received from the portal server 3, to the display 206 through the display processing section 207. The display 206 therefore displays a retry confirmation page 333 as shown in FIG. 29(D), and then proceeds to next step SP222.

At step SP222, the user interface 310 checks whether the retry confirmation page 333 has been operated by the user to really request the retry of acquiring data.

If the user does not request the retry of acquiring data, the user interface 310 ends the music data re-acquisition process in the procedure of the retry music purchase process.

By contrast, if the user requests the retry of acquiring data, the user interface 310 proceeds to next step SP223 to notify the middleware 311 of the fact that the user has requested the retry of acquiring data.

Accordingly, at step SP224, the middleware 311 generates a retry notification signal to notify of the fact that the user has requested the retry of acquiring data. The middleware 311 then accesses the retry URL information included in the acquisition process usage information acquired by the previous music data acquisition process, and transmits the retry notification signal to the portal server 3 through the communication processing section 214 and the network interface 215.

At step SP225, the CPU 270A of the portal server 3 receives the retry notification signal from the client terminal 2 through the network interface 275A. The CPU 270A subsequently generates the acquisition process usage information including the purchase identification information issued by the previous music data delivery process, which is similar to that of above step SP110. The CPU 270A then transmits the acquisition process usage information to the client terminal 2 through the network interface 275A.

By the way, at this time, in a case in which the file acquisition URL information to be used to acquire the acquisition usage file 300 and other URL information to be used to acquire various kinds of page information are updated, the CPU 270A generates the new acquisition process usage information including them to be supplied to the client terminal 2.

The client terminal 2, the portal server 3 and other servers SV11, SV12, and SV13 perform process of step SP111 to SP114 in the above normal music purchase process. In this manner, the client terminal 2 acquires the acquisition usage file 300 again through the portal server 3. The client terminal 2 also acquires, in concert with the portal server 3 and other servers SV11, SV12, and SV13, all the music data and license data 301 that should have been acquired by the previous music data acquisition process. By the way, the fee-charging server SV5 does not perform anything in this retry process because it has completed the fee-charging process to the user during the previous music data acquisition process.

If the affirmative result is obtained at step SP141 (i.e. all the logs were removed after acquiring all the music data and license data 301 requested to purchase), the middleware 311 of the client terminal 2 proceeds to next step SP226.

At step SP226, the middleware 311 accesses the URL information included in the acquisition process usage information, and transmits a page information acquisition request signal to the portal server 3 through the communication processing section 214 and the network interface 215.

At step SP227, the CPU 270A of the portal server 3 receives the page information acquisition request signal from the client terminal 2 through network interface 275A. The CPU 270A subsequently transmits page information for notification of completion of the retry, which corresponds to the URL information accessed by the client terminal 2, to the client terminal 2 through the network interface 275A.

At step SP228, the middleware 311 of the client terminal 2 receives the page information from the portal server 3 through the network interface 215 and the communication processing section 214, and then supplies it to the user interface 310.

Accordingly, the user interface 310 supplies the page information supplied from the middleware 311 to the display 206 through the display processing section 207. The display 206 therefore displays a retry completion notification page 334 on the display 206 as shown in FIG. 29(H).

In this manner, through the retry completion notification page 334, the user interface 310 notifies the user of the fact that it has acquired all the music data and license data 301 that should have been acquired by the previous music data acquisition process. After notifying the user of the completion of the retry of acquiring data, the user interface 310 ends the music data re-acquisition process, which corresponds to the retry request of acquiring data.

(3) Operation and Effect

In the music related service system 1 with the above configuration, the client terminal 2 starts, in response to the user's request for purchasing music, the music data acquisition process, and then temporarily stores the fee-charging status notification request information in the hard disk as the first log. The client terminal 2 then acquires, from the acquisition usage file provision server SV11 through the portal server 3, the acquisition usage file 300 to be used to acquire the requested music data and the license data 301 that makes the music data available.

After acquiring the acquisition usage file 300 from the portal server 3, the client terminal 2 generates a track file name for the "track" file to store and manage the music data requested. At the same time the client terminal 2 generates a license file name for the license file to store and manage the license data 301 that makes the music data available. The client terminal 2 subsequently temporarily stores the generated track file name and license file name in the hard disk as the second log.

The client terminal 2 then downloads, in accordance with the contents of the acquisition usage file 300, the music data from the music data provision server SV12, and temporarily stores it as "track" file with that track file name in the hard disk. After that the client terminal 2 downloads, in accordance with the contents of the acquisition usage file 300, the license data 301, which makes the music data available, from the license provision server SV13, and temporarily stores it as license file with that license file name.

After downloading the music data and the license data 301, the client terminal 2 registers the track file name and license file name, which correspond to the downloaded music data and license data 301, in the acquisition information database inside the hard disk, and makes the music data available based on the license data 301. After downloading all the requested music data and license data 301 and registering them in the acquisition information database, the client terminal 2 ends the music data acquisition process after removing all the temporarily-stored logs.

By the way, if the client terminal 2 is recovered after stopping the music data acquisition process halfway, the client terminal 2 checks whether there are the first and second logs left on the hard disk. If there are the first and second logs left, the client terminal 2 removes, in accordance with the second log, all the music data and license data 301 stored in the hard disk by the previous music data acquisition process, and then retries to acquire the music data and license data 301 that should have been acquired by the previous music data acquisition process.

The above configuration makes this possible: the client terminal 2 starts, in response to the user's request for purchasing music, the music data acquisition process, and then temporarily stores the fee-charging status notification request information as the first log. The client terminal 2 subsequently generates a track file name to store the music data requested. At the same time the client terminal 2 generates a license file name to store the license data 301 that makes the music data available. The client terminal 2 subsequently temporarily stores the generated track file name and license file name as the second log. The client terminal 2 then downloads the music data from the music data provision server SV12, and temporarily stores it as "track" file with that track file name in the hard disk. After that the client terminal 2 downloads the license data 301, which makes the music data available, from the license provision server SV13, and temporarily stores it as license file with that license file name. After downloading all the acquisition-target music data and license data 301 and registering them in the acquisition information database, the client terminal 2 removes all the first and second logs. If the client terminal 2 is recovered after stopping the music data acquisition process halfway, the client terminal 2 checks whether there are the first and second logs left on the hard disk. If there are the first and second logs left, the client terminal 2 removes, in accordance with the second log, all the music data and license data 301 stored in the hard disk by the previous music data acquisition process, and then retries to acquire the music data and license data 301 that should have been acquired by the previous music data acquisition process.

Accordingly, after recovering the communication connection to the network NT, if there is the first log left, the client terminal 2 detects that the music data acquisition process was stopped halfway due to the disconnection of the network NT.

The client terminal 2 downloads the music data and the license data 301 after temporarily storing their track file names and license file names as the second log during the music data acquisition process. Accordingly, if it is detected that there are also the second log left as well as the first log when the communication to the network NT is recovered, the client terminal 2 can properly detect the music data and license data 301 that have been already downloaded and stored, and the music data and license data 301 a part of which have been already downloaded and stored, in accordance with the remaining second log.

Accordingly, before retrying the acquisition of data, the client terminal 2 can remove, in accordance with the second log, all the music data and license data 301 downloaded and stored in the hard disk, regardless of the progress of the download. As a result, this prevents the client terminal 2 from downloading and storing in the hard disk again the same music data and license data. This prevents the storage space of the hard disk from being wasted. Thus, when retrying the acquisition of data, the client terminal 2 avoids a shortage of hard disk space required to store the music data and the license data 301, and this make sure that the music data and the license data 301 are acquired.

In addition, when a bunch of pieces of music is requested to purchase as an album, the client terminal 2 generates, during the music data acquisition process, the album identification information identifying the music data and license data 301 that will be downloaded, and temporarily stores it as the third log. And each time the music data and license data 301 are downloaded, the client terminal 2 registers their track file name and license file name in the acquisition information database such as they are associated with the album identification information, as a lower layer of the album identification information. After downloading all the acquisition-target music data and license data 301 and registering their track file names and license file names in the acquisition information database such that they are associated with the album identification information, the client terminal 2 removes all the logs. Accordingly, if there is the album identification information left as the third log when retrying the acquisition of data, the client terminal 2 removes the album identification information from the acquisition information database to delete all the music data and license data 301 that can be identified by the album identification information. This restores the storage space of the hard disk to the original condition where the music data and license data 301 are not recorded. This allows the client terminal 2 to acquire the music data and the license data 301 again efficiently.

After removing the album identification information from the acquisition information database, the client terminal 2 identifies, based on the track file names and license file names left on the hard disk as the second log, the remaining part of the music data and license data 301 to remove them from the hard disk. This restores the storage space of the hard disk to the original condition where the music data and license data 301 are not recorded. The client terminal 2 avoids a shortage of hard disk space required to store the music data and the license data 301 during the process of acquiring the music data and the license data 301 again.

In addition, when the client terminal 2 retries the acquisition of data, the portal server 3 notifies the client terminal 2 of the progress of the fee-charging process to the user during the previous music data acquisition process. This prevents the user who requested to purchase music from not retrying the acquisition of data and losing money, even though the fee-charging process to the user has been already completed by the previous music data acquisition process.

Furthermore, if there are the first to third logs left when the client terminal 2 recovers after the music data acquisition process was stopped halfway, the client terminal 2 removes, based on the second and third logs, all the music data and license data 301 acquired by the previous music data acquisition process. Accordingly, even if the music data acquisition process is stopped halfway after just acquiring the license data 301 and not completing fee-charging process to the user, that prevents the owner of copyright of the music data from being damaged.

Furthermore, when retrying the acquisition of data, the client terminal 2 acquires again the acquisition usage file 300 from the portal server 3 to be used to acquire the music data and the license data 301 again. Accordingly, even if the expiration data and the like are set to the acquisition usage file 300, the user does not have to pay attention to that, and he/she can retry the acquisition of data anytime. This improves the usability of the client terminal 2.

Figure 30:
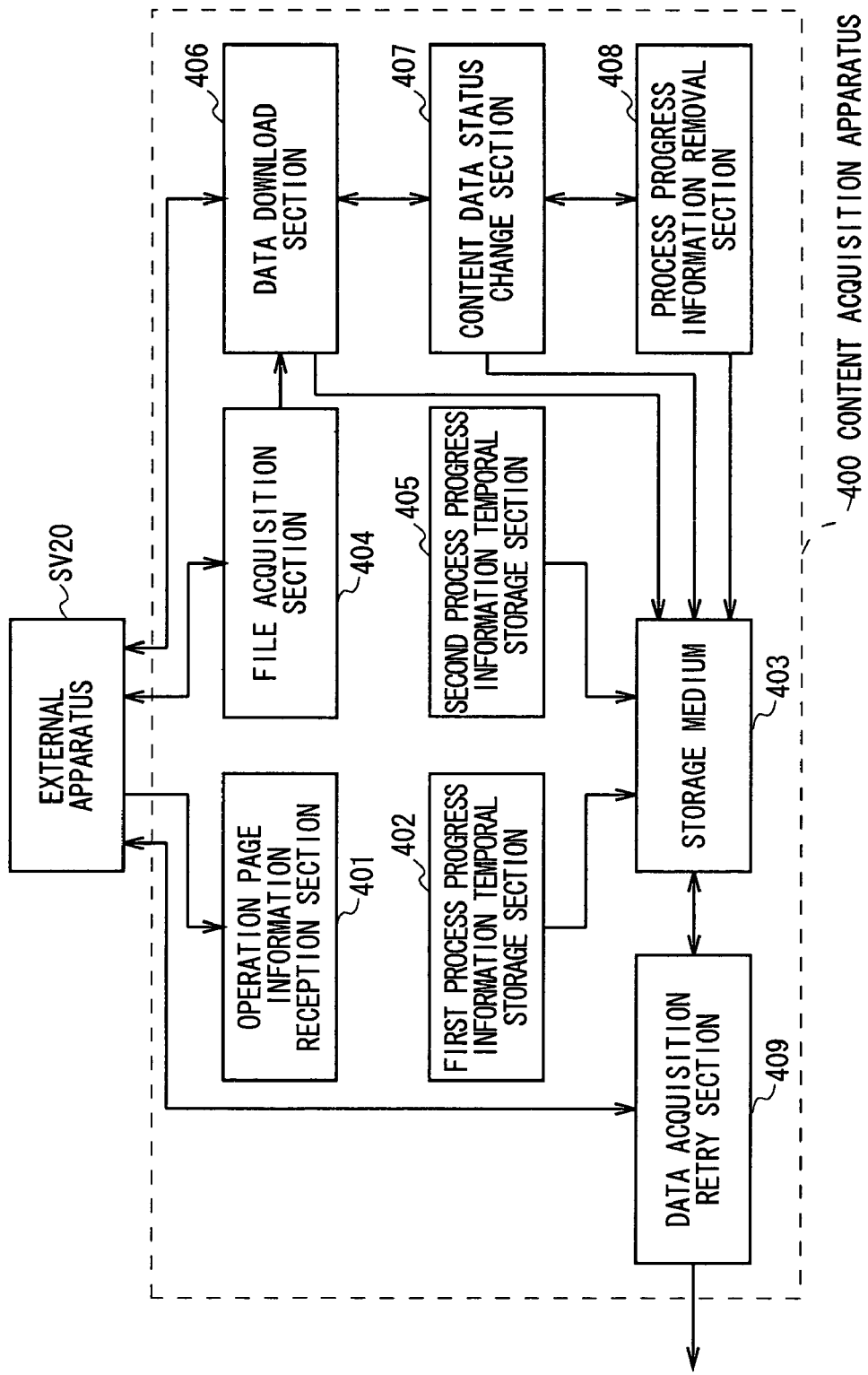
FIG. 30 is a block diagram showing the hardware configuration of a content acquisition apparatus according to a second embodiment of the present invention using functional circuit blocks.

[2] Second Embodiment (1) Functional Circuit Block Configuration of Content Acquisition Apparatus FIG. 30 shows the hard ware configuration of a content acquisition apparatus 400 according to the second embodiment of the present invention using functional circuit blocks.

In the content acquisition apparatus 400, an operation page information reception section 401 receives operation page information, the operation page information being transmitted from an external apparatus SV20 capable of providing content data and usage allowance data that makes the content data available and being operated to request acquisition of the content data.

In this case, for example, the content acquisition apparatus 400 displays the operation page information received by the operation page information reception section 401 on a display section (not shown), and accepts, through an operation section (not shown), operation of the operation page information displayed on the display, such as requesting acquisition of the content data.

A first process progress information temporal storage section 402 detects operation of the operation page information received by the operation page information reception section 401 for requesting acquisition of the content data, and, in response to the detection of the operation for requesting the acquisition, temporarily stores, in a storage medium 403, address information on the network that is to be accessed when data acquisition is retried during a content acquisition process, as first process progress information indicating progress of the content acquisition process.

A file acquisition section 404 acquires, from the external apparatus SV20, an acquisition usage file to be used to acquire content data that is requested by the operation of the operation page information and the usage allowance data that makes the content data available.

A second process progress information temporal storage section 405 temporarily stores, in the storage medium 403, content identification information that corresponds to the content data requested by the operation of the operation page information and usage allowance data identification information that corresponds to the usage allowance data that makes the content data available, as second process progress information indicating progress of the content acquisition process.

A data download section 406 receives, from the file acquisition section 404, the acquisition usage file acquired by the file acquisition section 404. The data download section 406 then downloads, in accordance with contents of the acquisition usage file acquired by the file acquisition section 404, the content data requested by the operation of the operation page information from the external apparatus SV20 and temporarily stores the content data in the storage medium 403, and also downloads the usage allowance data that makes the content data available and temporarily stores the usage allowance data in the storage medium 403.

A content data status change section 407 registers the content data downloaded by the data download section 406 and the usage allowance data that makes the content data available in a database in the storage medium 403 to make the content data available based on the usage allowance data.

A process progress information removal section 408 removes, after all the content data requested by the operation of the operation page information and the corresponding usage allowance data that make the content data available have been registered in the database in the storage medium 403, the first and second process progress information from the storage medium 403.

A data acquisition retry section 409 removes, if it is detected that the first and/or second process progress information are left on the storage medium 403 when the stopped content acquisition process restarts, the content identification information that is equivalent to the second process progress information, the content data corresponding to the usage allowance data identification information and the usage allowance data from the storage medium 403, and then retries to acquire data by accessing the address information that is equivalent to the first process progress information.

In this manner, the content acquisition apparatus 400 removes all the content data and usage allowance data, if, when the stopped content acquisition process recovers, there are the remaining content data and usage allowance data that was stored in the storage medium 403 by the stopped content acquisition process. Accordingly, this prevents the content acquisition apparatus 400, which starts retrying to acquire data from the external apparatus SV20, from storing the same content data and usage allowance data as those already stored in the storage medium 403 again to efficiently use the storage space of the storage medium 403.

By the way, in the above second embodiment, the address information, which is temporarily stored in the storage medium 403 as the first process progress information by the first process progress information temporal storage section 402, may be included in the operation page information received by the operation page information reception section 401, or may be previously kept by the content acquisition apparatus 400.

In addition, the file acquisition section 404 may acquire the acquisition usage file from the external apparatus SV20 to store the acquisition usage file in an internal storage section of the file acquisition section 404. Alternatively, the file acquisition section 404 may acquire the acquisition usage file from the external apparatus SV20 to store the acquisition usage file in the storage medium 403.

Furthermore, in a case in which the content data status change section 407 registers, in the database in the storage medium 403, the content data downloaded by the data download section 406 and the usage allowance data that makes the content data available, the content data status change section 407 may receive notification from the data download section 406 each time the content data and the usage allowance data are downloaded, and register, in response to the notification, the content data and the usage allowance data in the database. Alternatively, the content data status change section 407 may detect whether the content data and usage allowance data downloaded by the data download section 406 are temporarily stored in the storage medium 403, and, if the content data and the usage allowance data are temporarily stored, register the content data and the usage allowance data in the database.

Furthermore, in a case in which the process progress information removal section 408 removes the first and second process progress information from the storage medium 403, the process progress information removal section 408 may receive, from the content data status change section 407, notification of completion of registration each time each content data and usage allowance data are registered, and receive, after being notified of completion of downloading all the content data and usage allowance data by the data download section 406, the notification of completion of registration of the content data and the usage allowance data from the content data status change section 407, and recognize that this means completion of registering all the content data and usage allowance data, and then remove the first and second process progress information from the storage medium 403. Alternatively, the process progress information removal section 408 may detect, based on the contents of the acquisition usage file acquired by the file acquisition section 404 and the registration status of the content data and usage allowance data on the database of the storage medium 403, completion of registering all the content data and usage allowance data, and then remove the first and second process progress information from the storage medium 403.

By the way, in the second embodiment, a network, which is to be used to retry acquiring data during the content acquisition process, may be the Internet, a local area network with wireless or wired devices, and the like. The content data, which is acquired from the external apparatus SV20, may be music data, video data, text data, other kinds of data, and various programs such as game or computer programs. In the second embodiment where the music data is applied to as the content data, the external apparatus SV20 is for example equivalent to the portal server 3 and music data delivery server SV1 of the above-noted first embodiment; and the content acquisition apparatus 400 is for example equivalent to the client terminal 2 illustrated by FIG. 2.

In addition, the operation page information reception section 401 is for example equivalent to the communication control section 32 and network interface 33 of the client terminal 2 illustrated by FIG. 2. The first process progress information temporal storage section 402 is for example equivalent to the control section 23 of the client terminal 2. The storage medium 403 is for example equivalent to the storage medium 29 of the client terminal 2. The file acquisition section 404 is for example equivalent to the control section 23, communication control section 32, network interface 33 and storage medium 29 of the client terminal 2.

Furthermore, the second process progress information temporal storage section 405 is for example equivalent to the control section 23 of the client terminal 2. The data download section 406 is for example equivalent to the control section 23, communication control section 32 and network interface 33 of the client terminal 2. The content data status change section 407 is for example equivalent to the control section 23 of the client terminal 2. The process progress information removal section 408 is for example equivalent to the control section 23 of the client terminal 2. The data acquisition retry section 409 is for example equivalent to the control section 23 of the client terminal 2.

(2) Operation and Effect

In the content acquisition apparatus 400 with the above configuration, the operation page information reception section 401 receives the operation page information from the external apparatus SV20. In the content acquisition apparatus 400, when the first process progress information temporal storage section 402 detects operation of the operation page information for requesting the acquisition, the first process progress information temporal storage section 402 temporarily stores, in the storage medium 403, the address information on the network which is to be accessed when the content acquisition process retries the acquisition of data, as the first process progress information.

In the content acquisition apparatus 400 with this situation, the file acquisition section 404 acquires, from the external apparatus SV20, the acquisition usage file that is to be used to acquire the content data requested by the operation of the operation page information and the corresponding usage allowance data. In addition, in the content acquisition apparatus 400, the second process progress information temporal storage section 405 temporarily stores the content identification information that corresponds to the requested content data, and the usage allowance data identification information that corresponds to the usage allowance data that makes the content data available in the storage medium 403 as the second process progress information. In the content acquisition apparatus 400, the data download section 406 downloads, in accordance with the contents of the acquisition usage file, the requested content data from the external apparatus SV20, and temporarily stores it in the storage medium 403, and also downloads the usage allowance data corresponding to the content data and then temporarily stores it in the storage medium 403.

At this time, in the content acquisition apparatus, 400, the content data status change section 407 registers the downloaded content data and the corresponding usage allowance data in the database of the storage medium 403 to make the content data available based on the usage allowance data. In the content acquisition apparatus 400, after the process status information removal section 408 has registered all the requested content data and the corresponding usage allowance data in the database in the storage medium 403, the process status information removal section 408 removes the first and second process progress information from the storage medium 403.

In this manner, the content acquisition apparatus 400 acquires the content data and the corresponding usage allowance data from the external apparatus SV20. However, in a case in which the content data acquisition process for the content data is stopped, if it is detected that the first and/or second process progress information are left on the storage medium 403 when the stopped content acquisition process recovers, the data acquisition retry section 409 removes the content identification information that is equivalent to the second process progress information, the content data corresponding to the usage allowance data identification information, and the usage allowance data from the storage medium 403, and then retries acquiring data by accessing the address information that is equivalent to the first process progress information.

The above configuration makes this possible: the content acquisition apparatus 400 temporarily stores, in response to the detection of the operation of the operation page information acquired from the external apparatus SV20 for requesting the acquisition, the address information on the network that is to be accessed when the content acquisition process retries the acquisition of data in the storage medium 403 as the first process progress information; the content acquisition apparatus 400 subsequently acquires, from the external apparatus SV20, the acquisition usage file to be used to acquire the requested content data and the usage allowance data that makes the content data available; the content acquisition apparatus 400 subsequently temporarily stores, in the storage medium 403, the content identification information that corresponds to the requested content data and the usage allowance data identification information that corresponds to the usage allowance data that makes the content data available, as second process progress information; the content acquisition apparatus 400 subsequently downloads, in accordance with contents of the acquisition usage file, the requested content data from the external apparatus SV20 and temporarily stores the content data in the storage medium 403, and also downloads the usage allowance data corresponding to the content data and temporarily stores the usage allowance data in the storage medium 403; the content acquisition apparatus 400 subsequently registers the downloaded content data and the usage allowance data in the database in the storage medium 403 to make the content data available based on the usage allowance data; the content acquisition apparatus 400 subsequently removes, after all the requested content data and the corresponding usage allowance data have been registered, the first and second process progress information from the storage medium 403; the content acquisition apparatus 400 subsequently removes, if it is detected that the first and/or second process progress information are left on the storage medium 403 when the stopped content acquisition process restarts, the content identification information that is equivalent to the second process progress information, the content data corresponding to the usage allowance data identification information and the usage allowance data from the storage medium, and then retries to acquire data by accessing the address information that is equivalent to the first process progress information.

In this manner, the content acquisition apparatus 400 removes, when the stopped content acquisition process restarts, all the content data and usage allowance data that was stored in the storage medium 403 by the stopped content acquisition process. This prevents the content acquisition apparatus 400, when retrying to acquire data, from storing the same content data and usage allowance data in the storage medium 403, and therefore this allows efficient use of the storage medium 403. As a result, the content acquisition apparatus 400 can acquire the content data without fail.

[3] Other Embodiment

By the way, in the above-noted first embodiment, the music data acquisition process generates, after generating a track file name, a license file name. However the present invention is not limited to this. It can generate the license file name anytime, and then generate the track file name.

In addition, in the above-noted first embodiment, a user selects album-type or single-type music to purchase. However the present invention is not limited to this. The user may select both the album-type and the single-type music to purchase. In this case when both the album-type and the single-type music are requested, the music data acquisition process may check, each time the music data is downloaded for example, which type of music it is, and this result will affect the registration of the track file name and license file name on the acquisition information database.

Furthermore, in the above-noted first embodiment, when the client terminal 2 downloads the single-type music data and license data 301, the client terminal 2 registers the track file name and the license file name such that they are associated with the previously-prepared single identification information. However the present description is not limited to this. When the client terminal 2 downloads the single-type music data and license data 301, the client terminal 2 may generate, as a log, the single identification information that can be removed.

Accordingly, in the same way as the above method with the album identification information, the client terminal 2 can easily remove all the single-type music data and license data 301 by removing the single identification information from the acquisition information database when it retries to acquire data.

By the way, the identification information, which is capable of identifying the music data downloaded from the music data provision server SV12 and the license data 301 downloaded from the license provision server SV13, may include not only the album identification information and single identification information, but other types of identification information capable of providing the similar capability: one set for a bunch of pieces of music purchased one time, or one set for each piece of music.

Furthermore, in the above-noted first embodiment, even if the client terminal 2 recognizes, at the time when it retries the data acquisition of the stopped music data acquisition process, that the fee-charging process to the user has been already completed by the stopped music data acquisition process, the client terminal 2 allows the user to decide whether the data acquisition should be retried or not. However the present invention is not limited to this. The client terminal 2 may automatically retry the data acquisition if the fee-charging process to the user was completed before the stopped music data acquisition process restarts.

This prevents the client terminal 2 from putting the user at a disadvantage of not acquiring the music data and license data even though the fee-charging process has been completed.

Furthermore, in the first embodiment, the first to third logs indicating the progress of the music data acquisition process are temporarily stored. However the present invention is not limited to this. At least the second log (i.e. the track file name and the license file name) may be temporarily stored. In this case, it is also possible to remove, in accordance with the second log, the music data and the license data 301 from the hard disk when the music data re-acquisition process retries to acquire data.

Furthermore, in the above-noted second and third embodiments, the content acquisition apparatus according to the present invention is applied to the client terminal 2 and content acquisition apparatus 400 illustrated by FIGS. 1 to 30. However the present invention is not limited to this. Various kinds of content acquisition apparatus can be applied, such as information processing apparatus (like personal computers, mobile phones, PDA (Personal Digital Assistance)), CD players, and DVD (Digital Versatile Disc) players.

By the way, in the above-noted first embodiment, the client terminal 2 is equipped with the hardware circuit blocks, the functional circuit blocks and the program modules. Other terminals such as mobile phones and personal computers may be equipped with them. The terminals with the hardware circuit blocks, the functional circuit blocks and the program modules can perform the same process as those of the above client terminal 2.

Furthermore, in the above-noted first embodiment, the content acquisition program according to the present invention is applied to a group of program modules stored in the ROM 204 of the client terminal 2, including the HTTP message program 240, the communicator program 241, the copyright protection information management module 243, the music purchase/playback module 245, the XML browser 246, the hard disk content controller 247, the authentication library 248A, the database access module 249, and the content data access module 250. The CPU 203 of the client terminal 2 performs, in accordance with the content acquisition program, the above music data acquisition process in the procedure of music purchase process (FIGS. 19 to 22, and 25 to 27). However the present invention is not limited to this. The content acquisition program with other configurations may be applied. A program storage medium storing the content acquisition program may be installed on the client terminal 2 to perform the music data acquisition process.

Furthermore, in the above-noted first and second embodiments, the content data acquired from the external device is the music data. However the present invention is not limited to this. The content data may be various data such as video data and text data, and various programs such as game programs and computer programs.

Furthermore, in the above-noted first and second embodiments, as operation page information reception means for receiving the operation page information that is transmitted from the external apparatus and being operated for requesting the acquisition of content data, the communication processing section 214 and network interface 215 of the client terminal 2, the communication control section 32 and network interface 33, or the operation page information reception section 401 of the content acquisition apparatus 400 are applied to receive the purchase confirmation operation page information as shown in FIGS. 1 to 30. However the present invention is not limited to this. Based on the methods of communicating with the external apparatus, various kinds of operation page information reception means may be applied.

Furthermore, in the above-noted first and second embodiments, as first process progress information temporal storage means that detects operation of the operation page information received by the operation page information reception means for requesting acquisition of the content data and, in response to the detection of the operation for requesting the acquisition, temporarily stores, in a storage medium, the address information on the network that is to be accessed when data acquisition is retried during the content acquisition process as first process progress information indicating progress of the content acquisition process, the CPU 203 of the client terminal 2 illustrated by FIGS. 1 through 30, the control section 23, and the first process progress information temporal storage section 402 of the content acquisition apparatus 400 are applied. However the present invention is not limited to this. Various kinds of first process progress information temporal storage means, such as a temporal storage circuit with hardware circuit configuration capable of temporarily storing the first process progress information in a storage medium like hard disks and semiconductor memories, may be applied.

Furthermore, in the above-noted first and second embodiments, as file acquisition means that acquires, from the external apparatus, the acquisition usage file to be used to acquire content data that is requested by the operation of the operation page information and the usage allowance data that makes the content data available, the CPU 203 of the client terminal 2 illustrated by FIGS. 1 to 30, the communication processing section 214, the network interface 215, the hard disk drive 211, the control section 23, the communication control section 32, the network interface 33, the storage medium 29, and the file acquisition section 404 of the content acquisition apparatus 400 are applied. However the present invention is not limited to this. Various kinds of file acquisition means, such as a file acquisition circuit with hardware circuit configuration capable of acquiring the acquisition usage file, may be applied.

Furthermore, in the above-noted first and second embodiments, as second process progress information temporal storage means that temporarily stores, in the storage medium, the content identification information that corresponds to the content data requested and the usage allowance data identification information that corresponds to the usage allowance data that makes the content data available as second process progress information indicating progress of the content acquisition process, the CPU 203 of the client terminal 2 illustrated by FIGS. 1 to 30, the control section 23, the second process progress information temporal storage section 405 of the content acquisition apparatus 400 are applied. However the present invention is not limited to this. Various kinds of second process progress information temporal storage means, such as a temporal storage circuit with hardware circuit configuration capable of temporarily storing the second process progress information in a storage medium like hard disks and semiconductor memories, may be applied.

Furthermore, in the above-noted first and second embodiments, as the content identification information corresponding to the requested content data, a track file name illustrated by FIGS. 1 to 30 is applied. However the present invention is not limited to this. Various kinds of content identification information, such as unique content ID information and content name capable of identifying the content data, may be applied.

Furthermore, in the above-noted first and second embodiments, as the usage allowance data identification information corresponding to the usage allowance data that makes the content data available, the license file name illustrated by FIGS. 1 to 30 is applied. However the present invention is not limited to this. Various kinds of usage allowance data identification information, such as the ID information or name unique to the usage allowance data capable of identifying the usage allowance data, may be applied.

Furthermore, in the first and second embodiments, as data download means that downloads, in accordance with contents of the acquisition usage file acquired by the file acquisition means, the requested content data from the external apparatus and temporarily stores the content data in the storage medium, and also downloads the usage allowance data that makes the content data available and temporarily stores the usage allowance data in the storage medium, the CPU 203 of the client terminal 2 illustrated by FIGS. 1 to 30, the communication processing section 214, the network interface 215, the control section 23, the communication control section 32, the network interface 33, and the data download section 406 of the content acquisition apparatus 400 are applied. However the present invention is not limited to this. Various kinds of temporal storage download means, such as a download circuit with hardware circuit configuration capable of downloading the content data and the usage allowance data and temporarily storing them in a storage medium like a disc storage medium (such as hard disks and optical magneto discs) and a semiconductor memory, may be applied.

Furthermore, in the above-noted first and second embodiments, as content data status change means that registers the downloaded content data and the usage allowance data that makes the content data available in the database in the storage medium to make the content data available based on the usage allowance data, the CPU 203 of the client terminal 2 illustrated by FIGS. 1 to 30, the control section 23, and the content data status change section 407 of the content acquisition apparatus 400 are applied. However the present invention is not limited to this. Various kinds of content data status change means, such as a data status change circuit with hardware circuit configuration capable of registering the content data and the usage allowance data in a database in a storage medium such as a disc storage medium (such as hard disks and optical magneto discs) and a semiconductor memory, may be applied.

Furthermore, in the above-noted first and second embodiments, as process progress information removal means that removes, after all the requested content data and the corresponding usage allowance data that make the content data available have been registered in the database in the storage medium, the first and second process progress information from the storage medium, the CPU 203 of the client terminal 2 illustrated by FIGS. 1 to 30, the control section 23, and the process progress information removal section 408 of the content acquisition apparatus 400 are applied. However the present invention is not limited to this. Various kinds of process progress information removal means, such as a process progress information removal circuit with hardware circuit configuration capable of removing the first and second process progress information from a storage medium such as hard disks and semiconductor memories, may be applied.

Furthermore, in the above-noted first and second embodiments, as data acquisition retry means that removes, if it is detected that the first and/or second process progress information are left on the storage medium when the stopped acquisition process restarts, the content identification information that is equivalent to the second process progress information, the content data corresponding to the usage allowance data identification information and the usage allowance data from the storage medium and then retries to acquire data by accessing the address information, the CPU 203 of the client terminal 2 illustrated by FIGS. 1 to 30, the control section 23, and the data acquisition retry section 409 of the content acquisition apparatus 400 are applied. However the present invention is not limited to this. Various kinds of data acquisition retry means, such as a data acquisition retry circuit with hardware circuit configuration capable of retrying the data acquisition of the stopped content acquisition process, may be applied.

INDUSTRIAL APPLICABILITY

The present invention can be applied to content acquisition apparatus capable of acquiring content data, such as a personal computer, a mobile phone, a game machine and the like.

The invention claimed is:

1. A content acquisition method implemented in a content acquisition system, said method comprising:
   an operation page information reception step of receiving operation page information at said content acquisition system from an external system that is separate from said content acquisition system, said operation page information being operated to request acquisition of content data;
   a first process progress information temporal storage step performed by a processor in said content acquisition system of detecting operation of said operation page information received by said operation page information reception step for requesting said acquisition, and, in response to the detection of the operation for requesting said acquisition, temporarily storing, in a computer readable storage medium at said content acquisition system, address information on a network that is to be accessed when data acquisition is retried during a content acquisition process, as first process progress information indicating progress of said content acquisition process;
   a file acquisition step of acquiring, from said external system, an acquisition usage file to be used to acquire said content data that is requested by said operation of said operation page information and usage allowance data that makes said content data available;
   a second process progress information temporal storage step of temporarily storing, in said storage medium, content identification information that corresponds to said requested content data and usage allowance data identification information that corresponds to said usage allowance data that makes said content data available, as second process progress information indicating progress of said content acquisition process;
   a data download step of downloading, in accordance with contents of said acquisition usage file acquired by said file acquisition step, said requested content data from said external system and temporarily storing said content data in said storage medium, and also downloading said usage allowance data that makes said content data available and temporarily storing said usage allowance data in said storage medium;
   a content data status change step of registering said downloaded content data and said usage allowance data that makes said content data available in a database in said storage medium to make said content data available based on said usage allowance data;

a process progress information removal step of removing, after all said requested content data and all said usage allowance data that make said content data available have been registered in said database, said first and second process progress information from said storage medium; and a data acquisition retry step of removing, if it is detected that said first and/or second process progress information are left on said storage medium when said stopped content acquisition process restarts, said content identification information that is equivalent to said second process progress information, said content data corresponding to said usage allowance data identification information and said usage allowance data from said storage medium, and then retrying to acquire data by accessing said address information.

2. The content acquisition method according to claim 1, wherein said data acquisition retry step includes:

a detection step of detecting, when said stopped content acquisition process restarts, whether said first and/or second process progress information are left on said storage medium;

a data removal step of removing, if it is detected by said detection step that said first and/or second process progress information are left on said storage medium, said content data and usage allowance data that corresponds to said content identification information equivalent to said second process progress information and said usage allowance data identification information and have been temporarily stored in said storage medium, and said content data and usage allowance data registered in said database;

a screen output step of outputting, after said data removal step removes said content data and said usage allowance data, a retry notification screen to notify of retry of said data acquisition;

an access step of accessing, in accordance with input corresponding to the output of said retry notification screen, said address information, a preparation completion notification page information reception step of receiving a preparation completion notification page information notifying of completion of preparation for retrying said content acquisition, said preparation completion notification page information being transmitted from said external system after completing fee-charging for said downloaded content data and usage allowance data as a result of accessing said address information;

a retry process progress information removal step of removing, after said preparation completion notification page information reception step receives said preparation completion notification page information, said first and second process progress information from said storage medium;

a preparation completion notification page information output step of outputting, after said retry process progress information removal step has removed said first and second process progress information, said preparation completion notification page information; and a file re-acquisition step of re-acquiring, in accordance with input corresponding to the output of said preparation completion notification page information, said acquisition usage file from said external system.

3. The content acquisition method according to claim 1, wherein said data download step includes:

a check process of detecting, after said content data downloaded from said external system are temporarily stored in said storage medium, attribute information of said content data to check whether said content data has been requested as an album;

a third process progress information temporal storage step of temporarily storing, after said check step has checked that said content data has been requested as an album, said album of said content data and album identification information capable of identifying said usage allowance data in said storage medium as third process progress information indicating progress of said content acquisition process; and a data temporal storage step of downloading, after creating an album directory that can be identified by said album identification information, said usage allowance data that makes said content data available from said external system and then temporarily storing said usage allowance data in said storage medium.

4. The content acquisition method according to claim 1, wherein:

said external system includes a portal server;

said operation page information reception step receives said operation page information from the portal server;

said file acquisition step acquires said acquisition usage file from said portal server; and said data download step downloads, in accordance with contents of said acquisition usage file, said requested content data from a content delivery server portion of said external system and temporarily stores said content data in said storage medium, and also downloads said usage allowance data that makes said content data available and temporarily stores said usage allowance data in said storage medium.

5. A content acquisition system comprising:

operation page information reception means for receiving operation page information from an external system that is separate from said content acquisition system, said operation page information being operated to request acquisition of content data;

first process progress information temporal storage means for detecting operation of said operation page information received by said operation page information reception means for requesting said acquisition, and, in response to the detection of the operation for requesting said acquisition, temporarily storing, in a computer readable storage medium included in the content acquisition system, address information on a network that is to be accessed when data acquisition is retried during a content acquisition process, as first process progress information indicating progress of said content acquisition process;

file acquisition means for acquiring, from said external system, an acquisition usage file to be used to acquire said content data that is requested by said operation of said operation page information and usage allowance data that makes said content data available;

second process progress information temporal storage means for temporarily storing, in said storage medium, content identification information that corresponds to said requested content data and usage allowance data identification information that corresponds to said usage allowance data that makes said content data available, as second process progress information indicating progress of said content acquisition process;

data download means for downloading, in accordance with contents of said acquisition usage file acquired by said file acquisition means, said requested content data from said external system and temporarily storing said content data in said storage medium, and also downloading said usage allowance data that makes said content data available and temporarily storing said usage allowance data in said storage medium;

content data status change means for registering said downloaded content data and said usage allowance data that makes said content data available in a database in said storage medium to make said content data available based on said usage allowance data;

process progress information removal means for removing, after all said requested content data and all said usage allowance data that make said content data available have been registered in said database, said first and second process progress information from said storage medium; and data acquisition retry means for removing, if it is detected that said first and/or second process progress information are left on said storage medium when said stopped content acquisition process restarts, said content identification information that is equivalent to said second process progress information, said content data corresponding to said usage allowance data identification information and said usage allowance data from said storage medium, and then retrying to acquire data by accessing said address information.

6. A computer readable storage device having instructions stored therein that when executed by a processor in a content acquisition system cause the content acquisition system to execute:

an operation page information reception step of receiving operation page information from an external system that is separate from said content acquisition system, said operation page information being operated to request acquisition of content data;

a first process progress information temporal storage step of detecting operation of said operation page information received by said operation page information reception step for requesting said acquisition, and, in response to the detection of the operation for requesting said acquisition, temporarily storing, in a computer readable storage medium included in the content acquisition system, address information on a network that is to be accessed when data acquisition is retried during a content acquisition process, as first process progress information indicating progress of said content acquisition process;

a file acquisition step of acquiring, from said external system, an acquisition usage file to be used to acquire said requested content data and usage allowance data that makes said content data available;

a second process progress information temporal storage step of temporarily storing, in said storage medium, content identification information that corresponds to said content data that is requested by said operation of said operation page information and usage allowance data identification information that corresponds to said usage allowance data that makes said content data available, as second process progress information indicating progress of said content acquisition process;

a data download step of downloading, in accordance with contents of said acquisition usage file acquired by said file acquisition step, said requested content data from said external system and temporarily storing said content data in said storage medium, and also downloading said usage allowance data that makes said content data available and temporarily storing said usage allowance data in said storage medium;

a content data status change step of registering said downloaded content data and said usage allowance data that makes said content data available in a database in said storage medium to make said content data available based on said usage allowance data;

a process progress information removal step of removing, after all said requested content data and all said usage allowance data that make said content data available have been registered in said database, said first and second process progress information from said storage medium; and a data acquisition retry step of removing, if it is detected that said first and/or second process progress information are left on said storage medium when said stopped content acquisition process restarts, said content identification information that is equivalent to said second process progress information, said content data corresponding to said usage allowance data identification information and said usage allowance data from said storage medium, and then retrying to acquire data by accessing said address information.

* * * * *

UNITED STATES PATENT AND TRADEMARK OFFICE
CERTIFICATE OF CORRECTION

| | | |
|---|---|---|
| PATENT NO. | : 8,079,029 B2 | Page 1 of 1 |
| APPLICATION NO. | : 11/596588 | |
| DATED | : December 13, 2011 | |
| INVENTOR(S) | : Sakoh et al. | |

It is certified that error appears in the above-identified patent and that said Letters Patent is hereby corrected as shown below:

On the title page, Item (87), the PCT Pub. No. is incorrect. Item (87) should read:

--(87)   PCT Pub. No.: WO2005/111827
        PCT Pub. Date: Nov. 24, 2005--

Signed and Sealed this

Seventh Day of February, 2012

David J. Kappos
*Director of the United States Patent and Trademark Office*